United States Patent [19]
Doi et al.

[11] Patent Number: 5,790,690
[45] Date of Patent: Aug. 4, 1998

[54] COMPUTER-AIDED METHOD FOR AUTOMATED IMAGE FEATURE ANALYSIS AND DIAGNOSIS OF MEDICAL IMAGES

[75] Inventors: Kunio Doi, Willowbrook; Xin-Wei Xu, Chicago, both of Ill.; Shigehiko Katsuragawa, Morioka Iwate; Junji Morishita, Sonobe Kyoto, both of Japan

[73] Assignee: Arch Development Corporation, Chicago, Ill.

[21] Appl. No.: 428,867

[22] Filed: Apr. 25, 1995

[51] Int. Cl.$^6$ ............... G06K 9/00; G06K 9/46; H04N 1/40; G06F 15/00
[52] U.S. Cl. ............ 382/128; 358/111; 358/458; 364/413.02; 364/413.16; 382/195; 382/199
[58] Field of Search ............... 382/128, 195, 382/199; 364/413.13, 413.16, 413.02; 358/101, 111, 458

[56] References Cited

U.S. PATENT DOCUMENTS

| | | | |
|---|---|---|---|
| 5,072,384 | 12/1991 | Doi et al. | 364/413.12 |
| 5,224,177 | 6/1993 | Doi et al. | 382/128 |
| 5,260,871 | 11/1993 | Goldberg | 364/413.13 |
| 5,491,627 | 2/1996 | Zhang et al. | 364/413.13 |
| 5,537,488 | 7/1996 | Menon et al. | 382/170 |

OTHER PUBLICATIONS

Gregory F. Powell et al, Localization of inter–rib spaces for lung texture analysis and computer–aided diagnosis in digital chest images, Jul. 1988.

Medical Physics, vol. 17, No. 3, pp. 342–350, May/Jun. 1990, Nobuyuki Nakamori, et al., "Image Feature Analysis and Computer–Aided Diagnosis in Digital Radiography: Automated Analysis of Sizes of Heart and Lung in Chest Images".

RadioGraphics, vol. 10, No. 2, pp. 257–269, Mar. 1990, Shigehiko Katsuragawa, et al., "Quantitative Computer–Aided Analysis of Lung Texture in Chest Radiographs".

Radiology, vol. 177, No. 3, pp. 857–860, Dec. 1990, Naoki Asada, et al., "Potential Usefulness of an Artificial Neural Network for Differential Diagnosis of Interstitial Lung Diseases: Pilot Study".

Medical Physics, vol. 16, No. 1, pp. 38–44, Jan./Feb. 1989, Shigehiko Katsuragawa, et al., "Image Feature Analysis and Computer–Aided Diagnosis in Digital Radiography: Classification of Normal and Abnormal Lungs With Interstitial Disease in Chest Images".

Medical Physics, vol. 15, No. 4, pp. 581–587, Jul./Aug. 1988, Gregory F. Powell, et al., "Localization of Inter-Rib Spaces for Lung Texture Analysis and Computer–Aided Diagnosis in Digital Chest Images".

(List continued on next page.)

Primary Examiner—Andrew W. Johns
Assistant Examiner—Monica S. Davis
Attorney, Agent, or Firm—Oblon, Spivak, McClelland, Maier & Neustadt, P.C.

[57] ABSTRACT

A computerized method for the detection and characterization of disease in an image derived from a chest radiograph, wherein an image in the chest radiograph is processed to determine the ribcage boundary, including lung top edges, right and left ribcage edges, and right and left hemidiaphragm edges. Texture measures including RMS variations of pixel values within regions of interest are converted to relative exposures and corrected for system noise existing in the system used to produce the image. Texture and/or geometric pattern indices are produced. A histogram(s) of the produced index (indices) is produced and values of the histogram(s) are applied as inputs to a trained artificial neural network, which classifies the image as normal or abnormal. In one embodiment, obviously normal and obviously abnormal images are determined based on the ratio of abnormal regions of interest to the total number of regions of interest in a rule-based method, so that only difficult cases to diagnose are applied to the artificial neural network.

27 Claims, 34 Drawing Sheets

OTHER PUBLICATIONS

Medical Physics, vol. 15, No. 3, pp. 311–319, May/Jun. 1988, Shigehiko Katsuragawa, et al., "Image Feature Analysis and Computer–Aided Diagnosis in Digital Radiography: Detection and Characterization of Interstitial Lung Disease in Digital Chest Radiographs".

Investigative Radiology, vol. 21, No. 9, pp. 720–733, Sep. 1986, Charles E. Metz, "Roc Methodology in Radiologic Imaging".

Neural Networks, pp. 142–145, Simon Haykin, "Multilayer Perceptrons".

Digital Image Processing, pp. 134–135, Bernd Jahne, "Edge Detection".

SPIE, vol. 1898, pp. 1670–170, Michael F. McNitt–Gray, et al., "A Pattern Classification Approach to Segmentation of Chest Radiographs".

Investigative Radiology, vol. 25, No. 9, pp. 1012–1016, Sep. 1990, John M. Boone, et al., "Neural Networks in Radiologic Diagnosis".

Radiology, vol. 187, No. 1, pp. 81–87, Apr. 1993, Yuzheng Wu, et al., "Artificial Neural Networks in Mammography: Application to Decision Making in the Diagnosis of Breast Cancer".

Medical Physics, vol. 20, No. 4, pp. 975–982, Jul./Aug. 1993, Xuan Chen, et al., "Automated Selection of Regions of Interest for Quantitiative Analysis of Lung Textures in Digital Chest Radiographs".

Medical Physics, vol. 19, No. 3, pp. 555–560, May/Jun. 1992, Yuzheng Wu, et al., "Computerized Detection of Clustered Microcalcifications in Digital Mammograms: Applications of Artificial Neural Networks".

COMPUTER-AIDED METHOD FOR AUTOMATED IMAGE FEATURE ANALYSIS AND DIAGNOSIS OF MEDICAL IMAGES

The present invention was made in part with U.S. Government support under grant numbers CA 24806 (National cancer Institute), 47043 (NIH), 60187 (Dept. Health and Human Services) DAMD 17-93-J-3021 (U.S. Army) cd. 17-94-H-4676 (U.S. Army). The U.S. Government has certain rights in the invention.

BACKGROUND OF THE INVENTION

1. Field of the Invention

The present invention relates to computer-aided diagnosis techniques for automated detection of abnormalities in chest images and relates to U.S. Pat. Nos. 4,851,984, 4,907,156, 4,839,807, 4,918,534, 5,072,384, 5,133,020, 5,289,374, 5,319,549 and 5,343,390 as well as pending U.S. applications 08/174,175, pending 08/053,345, now U.S. Pat. No. 5,463,548; 07/915,631, now U.S. Pat. No. 5,359,513; 07/981,471, now U.S. Pat. No. 5,349,513; 08/060,531, now U.S. Pat. No. 5,491,627; 08/235,530, now abandoned; 08/159,133, now U.S. Pat. No. 5,638,458; 08/159,136, now abandoned; 08/158,389, now abandoned; and 08/220,917, pending.

2. Discussion of Background

The aim of computer-aided diagnosis (CAD) is to alert the radiologist by indicating potential lesions and/or providing quantitative information as a second opinion. Since the middle of 1980 a number of computerized schemes for CAD have been under development for chest radiography, mammography, angiography, and bone radiography. In chest radiography, several computerized schemes have been applied to the detection and classification of pneumoconioses and other interstitial diseases, the detection of lung nodules, heart size measurement, and the detection of pneumothorax (see U.S. application Ser. No. 08/174,175). However, development of CAD for chest radiography is still at an early stage. Therefore, it is necessary to further improve the performance based on an understanding of image features of normal and abnormal patterns appearing on radiographs.

It is known that diagnosis of interstitial infiltrates in chest radiographs is one of the most difficult problems in diagnostic radiology because of the complexity and the variety of abnormal patterns due to various diseases. Therefore, interpretations by different radiologists may differ because of the subjective criteria used. Even if the same radiologist interprets the same case on different days, different interpretations may result, particularly in the case of subtle abnormalities. If a computerized scheme could provide quantitative information regarding lung texture, the subjectivity of the interpretation would be decreased, thus improving the accuracy of diagnosis.

Since 1987, Katsuragawa et al (see *Med Phys*, Vol. 15 (34), pp 311–319, 1988; *Med Phys*, Vol. 16(1), pp 38–44, 1989; *RadioGraphics*, Vol. 10, pp 257–269, 1990; and *Med Phys*, Vol. 20, pp 975–982, 1993) have been developing a computerized scheme for the detection and characterization of interstitial diseases based on analysis of two texture measures, i.e., the root-mean square (RMS) variation and the first moment of the power spectrum, which correspond to the magnitude and coarseness (or fineness), respectively, of the lung texture. Preliminary results have indicated the potential usefulness of CAD for the detection and classification of interstitial disease. However, the achieved results tend to provide a number of false positive ROIs at high optical densities and also a number of false negative ROIs at low optical densities in digitized chest radiographs. Although the calculated texture measures include not only the lung texture but also noise components associated with the screen-film system and the laser scanner, the effects of these noise components on texture measure have not been well understood. Therefore, a better understanding of the optical-density dependence of the texture measures, due to lung texture and other noise components, is needed.

During the past decade, different computerized methods and techniques have been developed for analysis and detection of various abnormalities in chest radiographs. The ribcage boundary and diaphragm edges of posterior-anterior (PA) chest images provide useful information on the location, shape, and size of lung fields and are required by computer-aided diagnosis (CAD) schemes for automated detection of abnormalities in chest images. The accurate detection of the ribcage boundary and diaphragm edges is very important for these methods to work properly. A number of investigators attempted to develop techniques for automated segmentation of chest images. Although it was relatively simple to characterize lung regions by thresholding chest images according to the gray level histogram, this approach was not useful for the development of CAD schemes due to the low accuracy thus obtained in detecting lung boundaries and complete loss of mediastinal areas. McNitt-Gray et al (SPIE Image Processing 1993; 1988: 160–170) developed a pattern classification technique for automated segmentation of chest images. In their study, 33 normal chest images (17 cases for training and 16 cases for testing) were used. The overall accuracy of their method was about 76%.

Another method for the detection of the ribcage boundary which was initially developed by Powell et al (Med. Phys. 1988; 15: 581–587) and later refined by Nakamori et al (Med. Phys. 1990; 17: 342–350; U.S. Pat. No. 5,072,384) was based on the edge detection from the second derivatives of profiles. With these techniques, one can detect ribcage edges only below the clavicle. The complete ribcage boundary was estimated by polynomial curve fitting of detected right and left ribcage edges. Thus, a part of the ribcage boundary in the top lung area was often incorrect. With this method, ribcage edges were determined by the positions yielding minimum values of the second derivative of horizontal profiles in short segments selected over the right and left ribcages. Since there may be several edge patterns in a profile, the minimum peaks in second derivatives might not result from ribcage edges. This problem can become severe if the image contrast is very low near ribcage areas. Therefore, the use of minimum peak positions in second derivatives was found to have an overall accuracy of about 75% and not to be reliable for the correct detection of ribcage edges.

Further, the detection of diaphragm edges of a chest image is difficult and often inaccurate because of the presence of the complicated patterns of stomach gas structures and the effects of cardiac edges around the left hemidiaphragm area. The stomach gas patterns are irregular in shape, and usually are located close to left hemidiaphragm edges. Furthermore, the optical densities of the stomach gas patterns are similar to those of lung areas. Therefore, simple edge gradient analysis methods are unlikely to work well to detect the left hemidiaphragm edges. An accurate method is needed to detect left hemidiaphragm edges in order to improve the overall accuracy of the delineation of the lung fields of chest images.

SUMMARY OF THE INVENTION

Accordingly, one object of this invention is to provide a new and improved method for automated detection of an accurate ribcage boundary in digital chest images.

Another object is to provide a new and improved method for automated detection of right and left hemidiaphragm edges in digital chest images based on the image feature analysis as well the landmark information derived from the detection of ribcage edges.

A further object is to reduce the effects of noise components associated with the screen-film system and the laser scanner on texture measures.

Yet another object of this invention is to provide a novel method for automated detection and classification of interstitial disease which results in fewer false positive detections with little if any loss in sensitivity to true positive detections.

These and other objects are achieved according to the present invention by providing a novel method for automated determination of a ribcage boundary and diaphragm edges in the computer-aided diagnosis of various abnormalities in chest images, in which the average position of the lung top in a chest image is first determined. Top lung edges and ribcage edges are then determined by comparing the first and second minimum values in second derivatives of horizontal profiles which are selected over the top lung cages and ribcages, respectively. Finally, three polynomial functions are applied separately to produce smooth curves for top lung edges, and right and left ribcage edges. The complete ribcage boundary is then obtained by connecting the three curves through a simple weighted average method. In the process, useful landmark information is obtained, such as the midline, the vertical positions of the lung top and lung bottom, the right and left lung angle lines, and the positions of the lowest right and left ribcage edges which are close to the corresponding costophrenic angles of the right and left lungs, respectively.

Using the landmark information obtained in determining the ribcage boundary, diaphragm edges are then detected. First, the right hemidiaphragm edge in a chest image is determined through the edge gradient analysis of vertical profiles selected over the right hemidiaphragm by incorporating with the landmark information. Then, an initial vertical region of interest (ROI) is placed at the middle of the left hemidiaphragm to determine the left starting points for searching left hemidiaphragm edges based on a manually measured relationship (or "standard rule") between the middle right and left hemidiaphragm edges. The middle right and left hemidiaphragm edges are referred to as the diaphragm edges at the middle of the right and left hemidiaphragms, respectively. Because of the importance of the left starting points, seven categories are used to assess the placement of the initial vertical ROI at the middle of the left hemidiaphragm and the accuracy of the primary left starting point from the initial ROI based on image features derived from the initial ROI, such as the vertical profile, the first derivative of the profile, the ratio of the second minimum to the first minimum in the first derivative, and histogram of the initial ROI. For some categories, it is necessary to select a second left starting point beside the primary one. Thus, for those categories, there are two sets of detected "left hemidiaphragm edges" resulting from the two left starting points. Two parameters are used as measures to eliminate the false left hemidiaphragm edges which are due to an incorrect left starting point. Then, two polynomial functions are applied separately to produce smooth curves for the right and left hemidiaphragm edges, respectively.

Finally, the right and left hemidiaphragm edge curves are connected with the corresponding ribcage edge curves to form a complete delineation of the lung fields in chest image.

According to the present invention, there is also provided a new and improved method to reduce the optical-density dependence of the gradient of film used to produce optical images for automated detection of interstitial infiltrates, including applying a correction factor to the RMS value of each pixel data value to correct for variation of film contrast, and applying a further correction curve which varies as an inverse of an average curve of RMS variations arising due to system noise to correct the data for system noise variations.

In a further development of the present invention, an automated classification method utilizing texture analysis based on the Fourier transform and geometric-pattern feature analysis based on filtering techniques is further developed. The rms variation and the first moment of the power spectrum of lung patterns are determined as measures in the texture analysis. On the other hand, the total area of nodular opacities and the total length of linear opacities are determined as measures in geometric-pattern feature analysis. The automated classification method employs rule-based determination plus artificial neural networks (ANNs), using both texture and geometric-pattern measures for distinction between normal and abnormal lungs with interstitial disease. Obviously normal and obviously abnormal cases are identified first by the rule-based method, and subsequently the ANN is applied for classification of the remaining difficult cases. The rule-based plus ANN method improves classification performance compared with either the rule-based method alone or ANNs alone. In addition, the combined analysis of the texture and geometric-pattern measures can improve the classification performance in comparison with individual analyses. The results indicate that this computerized method can assist radiologists in the diagnosis of interstitial disease in digital chest radiographs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

In FIG. 7(b) the minimum peaks of the second derivative on each side of the midline correspond to the ribcage edges.

In FIG. 10(b), the first and second minimum peaks are used to determined the edge location based on the ratio of the first peak value to the second peak value.

In FIG. 13(b) the middle right hemidiaphragm edge (i.e., the starting point for search of the rest of the right hemidiaphragm edges) is determined by the minimum of the first derivative.

In FIG. 15(b), the middle right hemidiaphragm edge (i.e., the starting point for search of the rest of the right hemidiaphragm edges) is determined by the minimum of the first derivative.

FIGS. 25(a) and 25(b) are graphs illustrating, respectively, optical-density dependence on (a) the RMS variation and (b) the first moment of the power spectrum, which are calculated in terms of pixel value. For simplicity, only 1% of all data are shown for normal (●) and abnormal cases (+).

DETAILED DESCRIPTION OF THE PREFERRED EMBODIMENTS

In deriving the methodology to achieve automated accurate detection of the ribcage boundary and right and left hemidiaphragm edges in digital chest images, approximately 1000 adult postero-anterior (PA) chest radiographs were used. Digital chest images were obtained by digitization of these radiographs with a Konica laser scanner (KFDR-S) with a pixel size of 0.175 mm. All chest images were then subsampled to lk×lk matrix size (effective pixel size of 0.35 mm). The gray scale of the chest images was 10 bits. A DEC VAX 3500 computer was used. The computer output provided ribcage boundaries marked on chest images which were then printed on thermopaper by a Seikosha video printer (VP3500) for subjective evaluation.

Figure 1A:
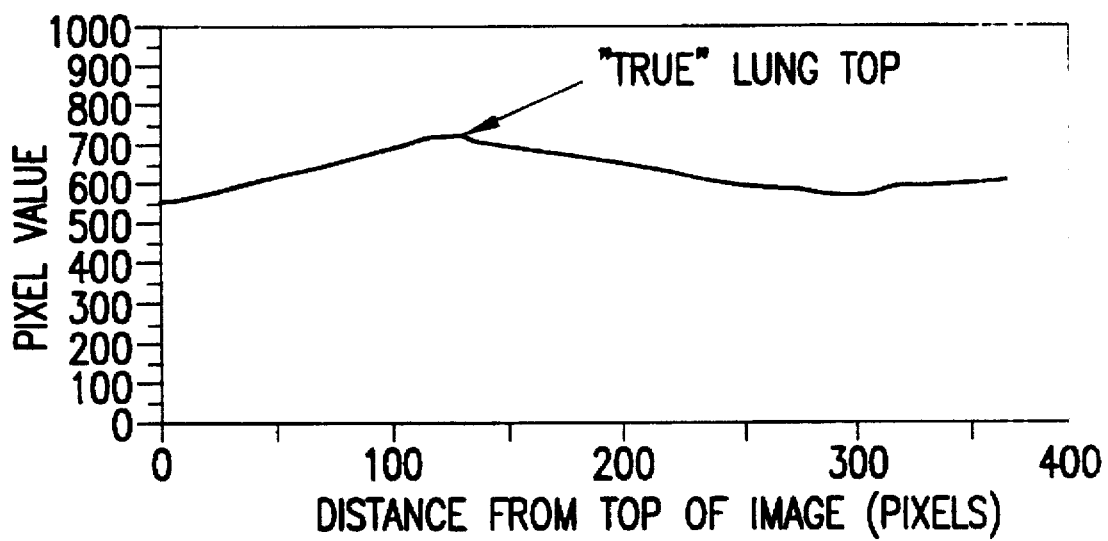
FIGS. 1a and 1b are a vertical profile and its first derivative, respectively, obtained from one half of the image width in the upper central area of a chest image with first and second candidates of the lung top in the image being chosen at positions of zero-crossing with negative slope (starting from the left).
Figure 1B:
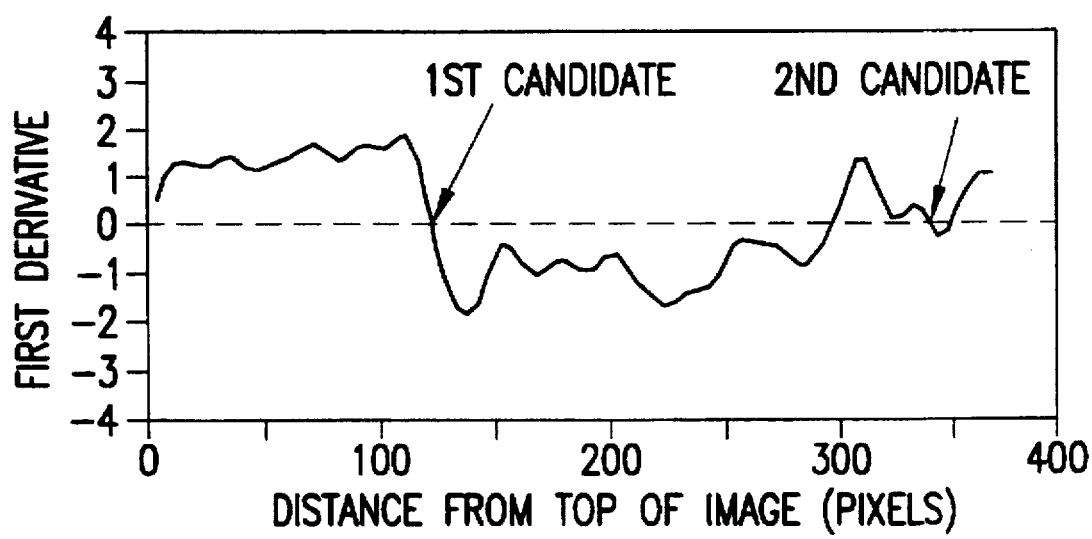
Figure 2:
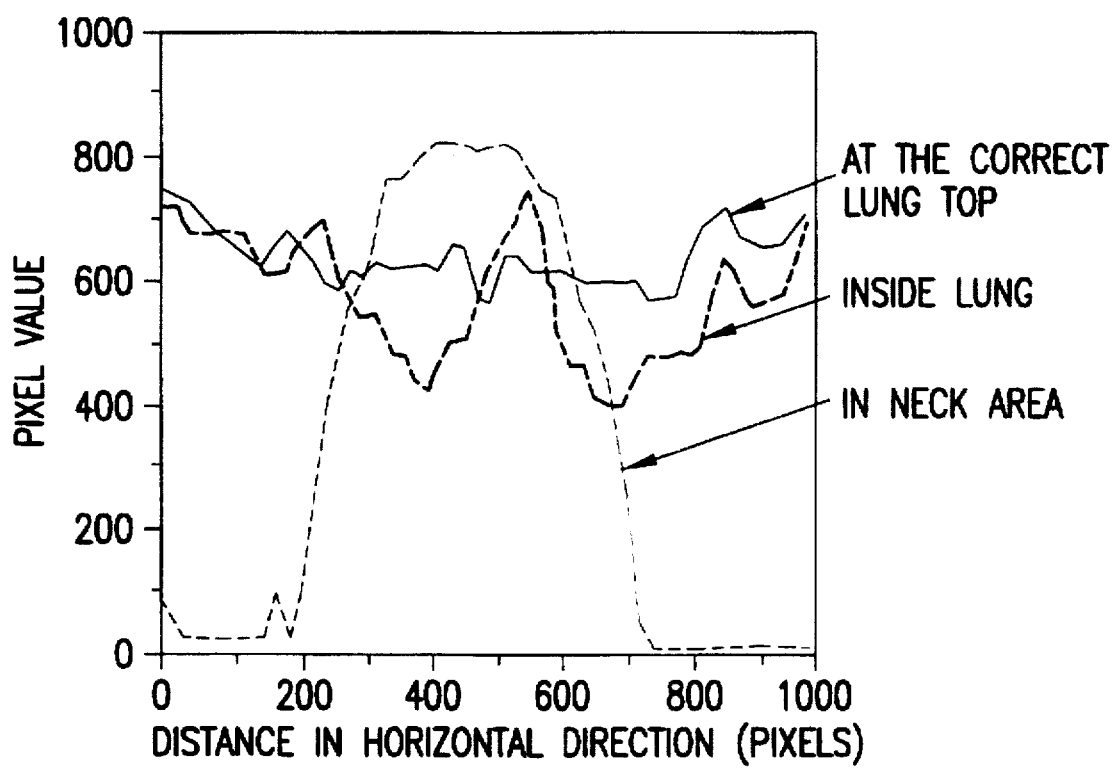
FIG. 2 is a graph illustrating the comparison of horizontal profiles at three candidate positions corresponding to the correct lung top, inside lung, and in neck area, from which the standard deviation and the maximum difference of pixel values along profiles were calculated.
Figure 3A:
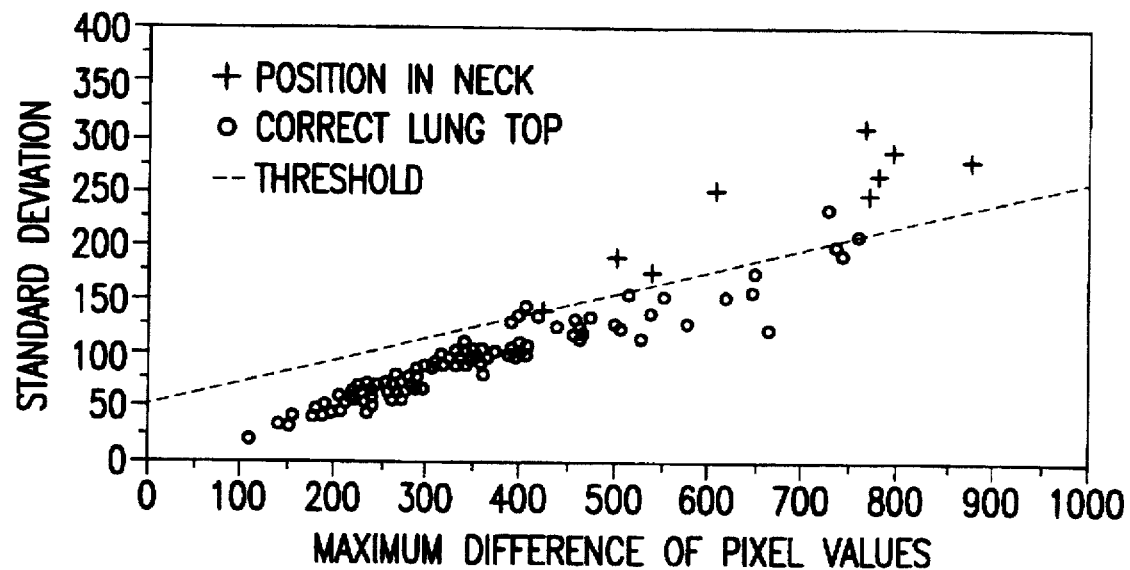
FIGS. 3a and 3b are graphs respectively illustrating the relationship between the standard deviation and the maximum difference of pixel values along horizontal profiles at the position of (a) 1st candidate for the lung top and (b) 2nd candidate for the lung top (120 cases). Data points in FIG. 3b are only those in FIG. 3a with a standard deviation equal to or larger than the threshold level marked by the dotted line.
Figure 3B:
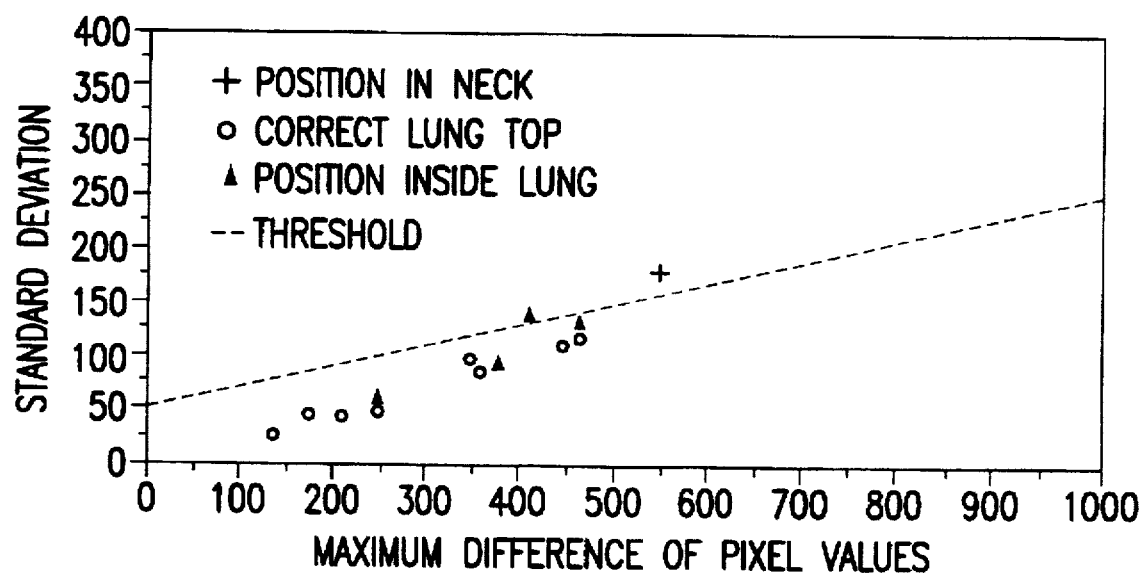

To detect ribcage edges, it is important to detect the average position of the lung top accurately. First, a vertical profile and its first derivative, obtained from one half width of the chest image in the upper central area, are calculated, as shown in FIGS. 1(a) and 1(b). The vertical profile is obtained in the range from the top to the upper ⅛ of the image. The candidate positions of the lung top are chosen at the positions of zero-crossing with negative slopes in the first derivative, as illustrated in FIG. 1(b). It is assumed that it is not possible for the first candidate to be inside the lung area; this assumption is valid, as will be discussed later. In other words, the first candidate may be assumed to be either in the neck area or at the "true" lung top. To verify the locations of the candidate positions, a horizontal profile at each candidate position is then calculated, as shown in FIG. 2. The horizontal profile indicates the distribution of pixel values across the chest image. The standard deviation and the maximum difference of pixel values along the horizontal profile are determined as measures to examine the position of the candidate. The relationships between the standard deviation and the maximum difference at positions of the first and second candidates are shown in FIGS. 3(a) and 3(b), respectively. It is apparent in FIG. 3(a) that the first candidates are likely to correspond to the correct positions of the lung top, if the standard deviations are less than the threshold level marked by the dotted line. This result corresponds to the fact that the horizontal profiles at the correct positions of the lung top are more uniform (or flatter) than those in the neck area, thus resulting in a small standard deviation.

Figure 4:
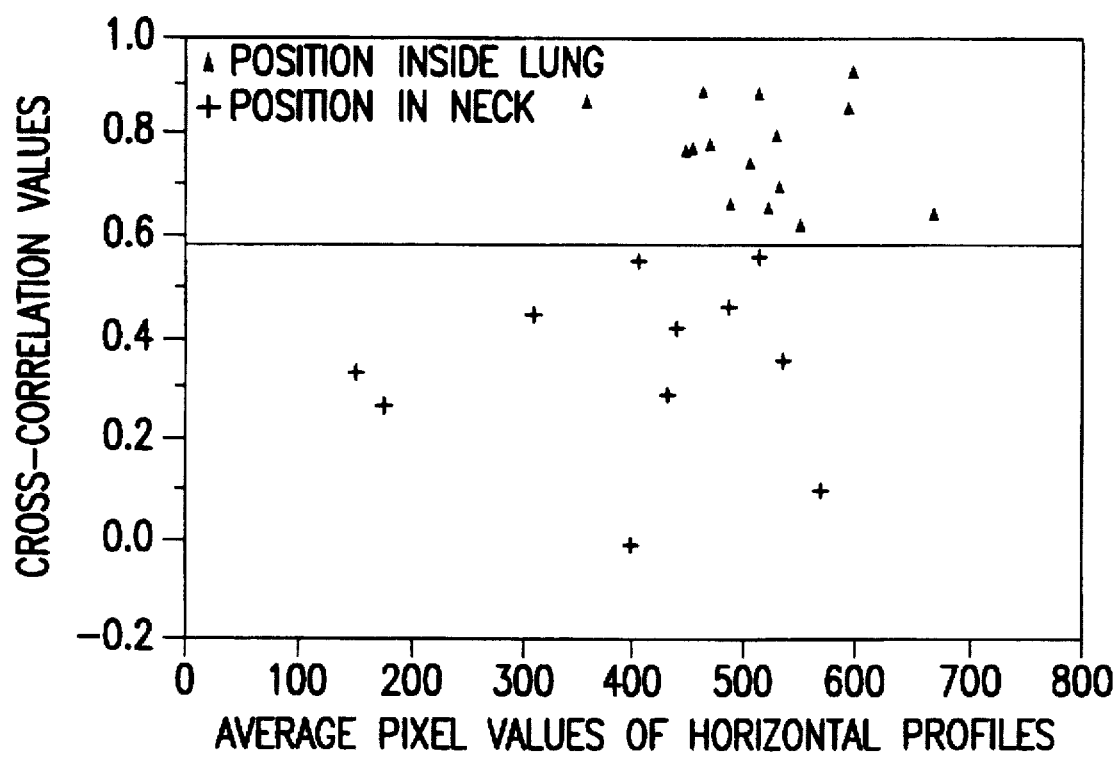
FIG. 4 is a graph illustrating a comparison of cross-correlation values for candidates inside the lung and in the neck area. Cross-correlation values were determined for horizontal profiles at candidate positions with a "typical" horizontal lung profile. The threshold value is 0.58.

If the standard deviation for the first candidate is larger than the threshold level, the candidate might be in the neck area, and then the second candidate needs to be taken into consideration. However, if the previous first candidate is located at the "true" lung top, but with a large standard deviation above the threshold level, then the second candidate must be inside the lung area. FIG. 3(b) shows that the second candidates which are located inside the lung could have either small or large standard deviations. Therefore, in order to distinguish the position of a second candidate inside the lung from two other positions, i.e., at the "true" lung top or in the neck area, the cross-correlation between the horizontal profile at the second candidate position and a "typical" horizontal lung profile is calculated to obtain a measure to examine the similarity between the two profiles. The "typical" horizontal lung profile is obtained at the vertical level of ⅓ of the image, which is usually inside the lung area for adult PA chest images. For the candidate position inside the lung, the horizontal profile would be more similar to the "typical" horizontal lung profile than that in the neck area, and thus it provides a large cross-correlation value. FIG. 4 shows the comparison of cross-correlation values for candidates inside the lung and in the neck area. It is apparent that the cross-correlation values for candidates inside the lung are greater than those in the neck area. Therefore, if the cross-correlation value of the second candidate is greater than a threshold level such as 0.58, which indicates the current second candidate inside the lung, then the previous first candidate is considered as the "true" lung top.

It is clear in FIG. 1(a) that the "true" lung top is located at the candidate position with a larger pixel value in the vertical profile. Based on this general observation, if the standard deviation of the second candidate is less than the threshold level shown in FIG. 3(b), the pixel value at the current second candidate position and the previous first candidate position are compared, and then the candidate position with a larger pixel value is selected as the "true" lung top. The above procedure is applied to subsequent candidates until the standard deviation for the current candidate becomes less than the threshold level shown in FIG. 3.

Figure 5:
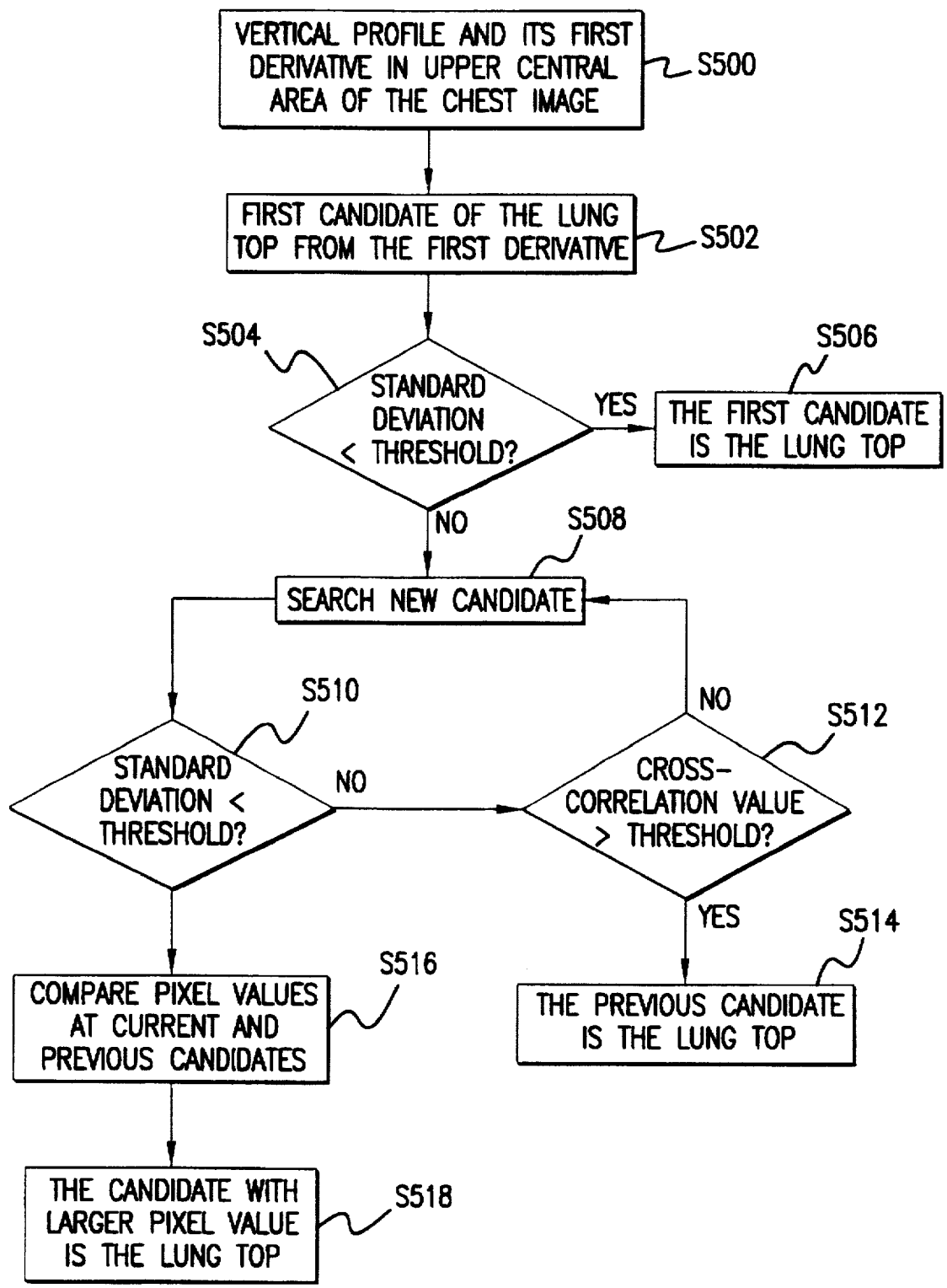
FIG. 5 is a flow chart illustrating an automated computerized scheme for detection of the position of the lung top in a chest image.

FIG. 5 shows the steps of the method which is used for detection of the position of the lung top in chest images. In step 500, a vertical profile and its first derivative in the upper central-area of the chest image are obtained. Next, a first candidate of the lung top is determined from the first derivative, in step 502. In step 504 the standard derivation of the first candidate is compared with a threshold, and if less than the threshold, in step 506 the first candidate is then detected as the "true" lung top. The second or subsequent candidates need to be searched in step 508 and compared with the standard deviation in step 510. If larger than the threshold level, in step 512 the cross-correlation value is calculated for the second or subsequent candidate in order to prevent the incorrect detection of the lung top which may actually be located inside the lung. If the cross-correlation value is greater than the threshold shown in FIG. 4, in step 514 it is determined that the previous candidate is the lung top. If not, a new search candidate is obtained in step 508 and step 510 is repeated. If in step 510 it is determined that the standard deviation of the new search candidate is less than the threshold, in step 516 the pixel values at the current and previous candidates are compared, and in step 518 the candidate with the larger pixel value is determined to be the lung top.

Based on the steps shown in FIG. 5, the positions of the lung top determined by a computer were compared with direct measurements on films for 120 chest images. The comparison indicated that the computer detected position of the lung top were quite close to the measured position.

Next, the lung bottom position is determined.

Figure 6A:
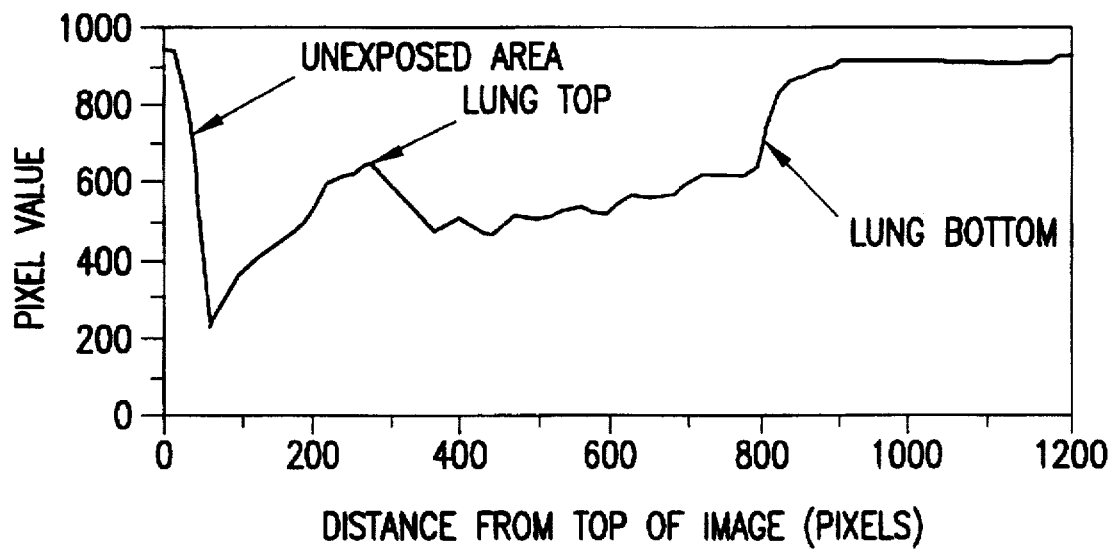
FIG. 6(a) and 6(b) are, respectively, graphs illustrating vertical profile and its first derivative obtained from 1/12 of the image width through the center of the right lung. The position of the lung bottom is defined by the position of the minimum peak in the 1st derivative in the lower lung area.
Figure 6B:
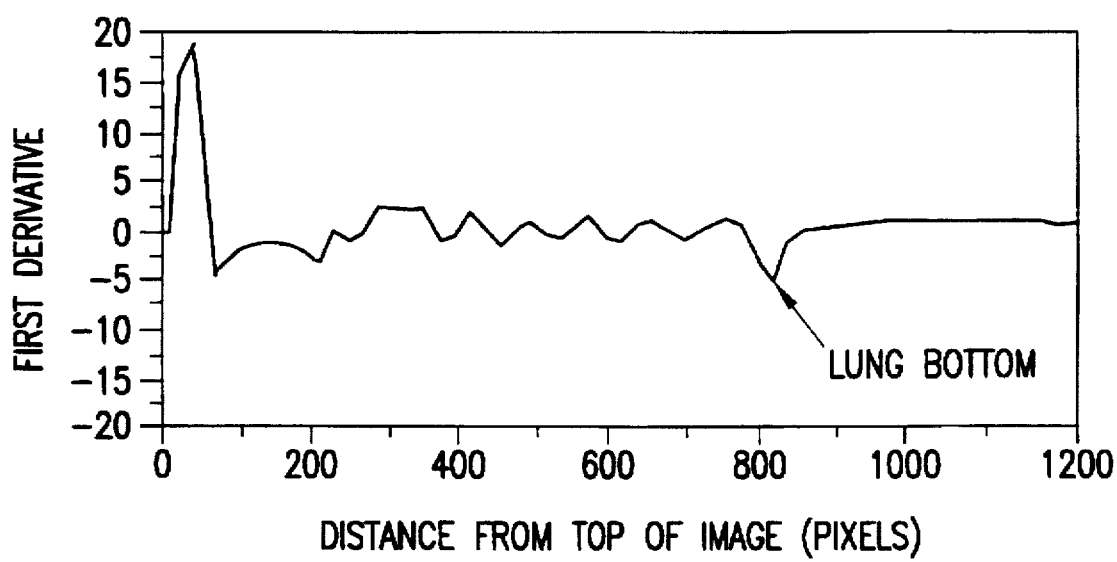

A vertical profile and its first derivative through the center of the right lung are used to locate the position of the lung bottom, as shown in FIGS. 6(a) and 6(b). The right diaphragm area is generally free of the effects of stomach gas, cardiac edges, and other complicated structures. Because the image contrast between the right lung area and the diaphragm area is usually high, the vertical profile in this range indicates a clear edge pattern, as illustrated in FIG. 6(a). The first derivative of the vertical profile is shown in FIG. 6(b). The lung bottom position of the chest image can be detected by the minimum peak position in the first derivative in the lower half of the vertical profile. The lung length is then determined as the vertical distance between the lung top and the lung bottom. Various additional landmarks, such as lung angle lines and top lung edge starting points are determined, and search ranges established, as next described.

Figure 7A:
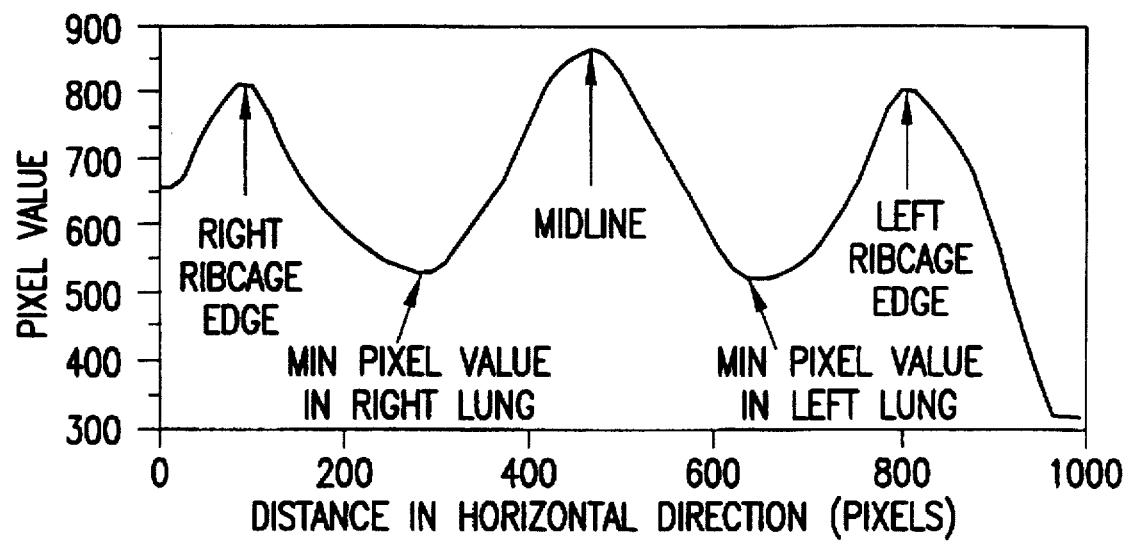
FIGS. 7(a) and 7(b) are, respectively, graphs illustrating a horizontal profile and its second derivative at the vertical level of the upper lung 1/5 of the lung.
Figure 7B:
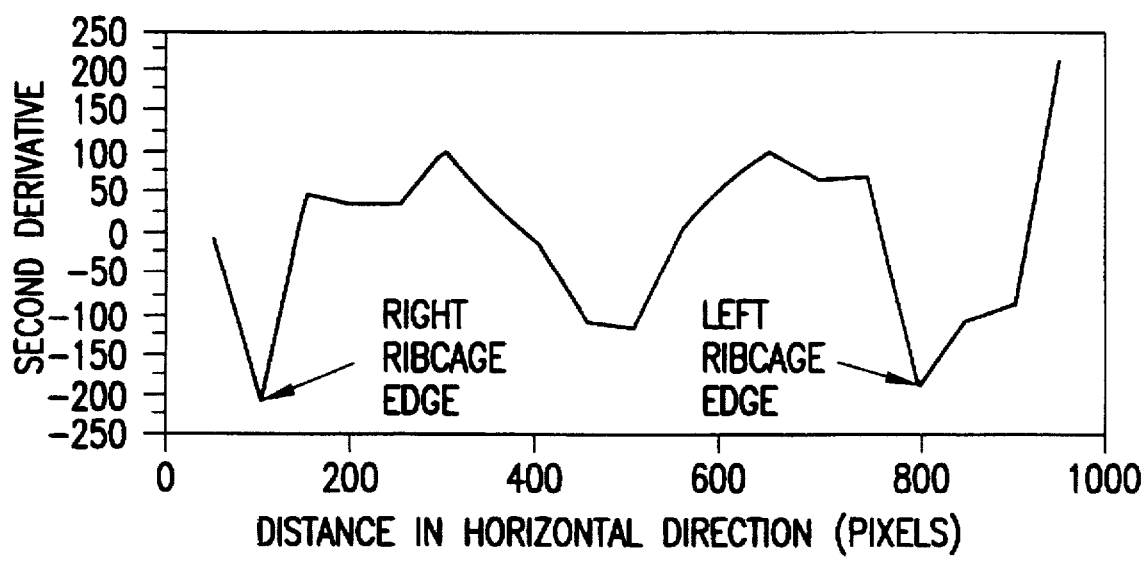
Figure 8:
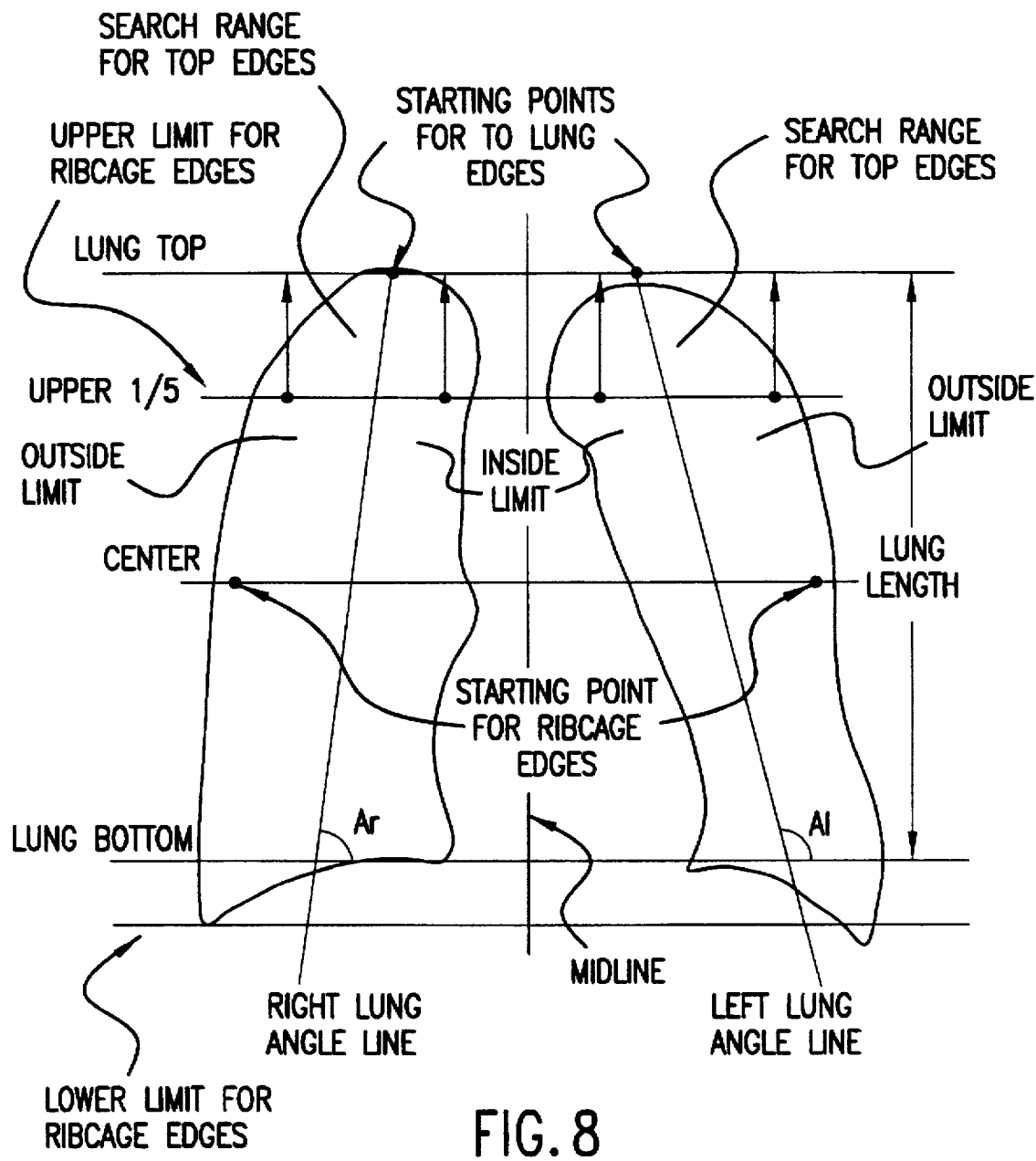
FIG. 8 is an illustration of landmark information including lung angle lines, starting points, and search ranges for search of top lung edges and ribcage edges and other landmark information in lung fields.

Two horizontal profiles, each with a width of ⅛ of the lung length, are calculated at two vertical positions, i.e., the upper ⅕ and the center of the lung. FIG. 7 shows the horizontal profile and its second derivative at the upper ⅕ level, which are generally similar to those at the center of the lung. The midline in the chest image is assumed to be located at the largest pixel value near the center of the horizontal profile. A straight line through the two minimum pixel value locations at the two levels in each of the right and left lungs is called here the lung angle line, as shown in FIG. 8. The angle, in each of the right and left lungs, between the lung angle line and the horizontal axis is called the right lung angle $A_r$ and left lung angle $A_L$, respectively. The crossing point of the lung angle line with the horizontal line at the lung top level is chosen as a starting point for the search of top lung edges in each of the right and left lungs, as shown in FIG. 8.

It is important to note that lung angles must be in a proper range so that one can determine the correct starting points and thus detect the top lung edges accurately. For example, if the right lung angle ($A_r$) is too small or too large, the starting point would be in the neck area or close to the upper part of the clavicle, respectively. In both cases, the improperly chosen starting points could result in failure in the detection of the top lung edges. To find the proper ranges for the right and left lung angles, 100 cases were used to study the distributions of these lung angles. The proper and improper lung angles were subjectively judged by the corresponding results of proper and improper detection of the top lung edge derived from these lung angles.

Figure 9A:
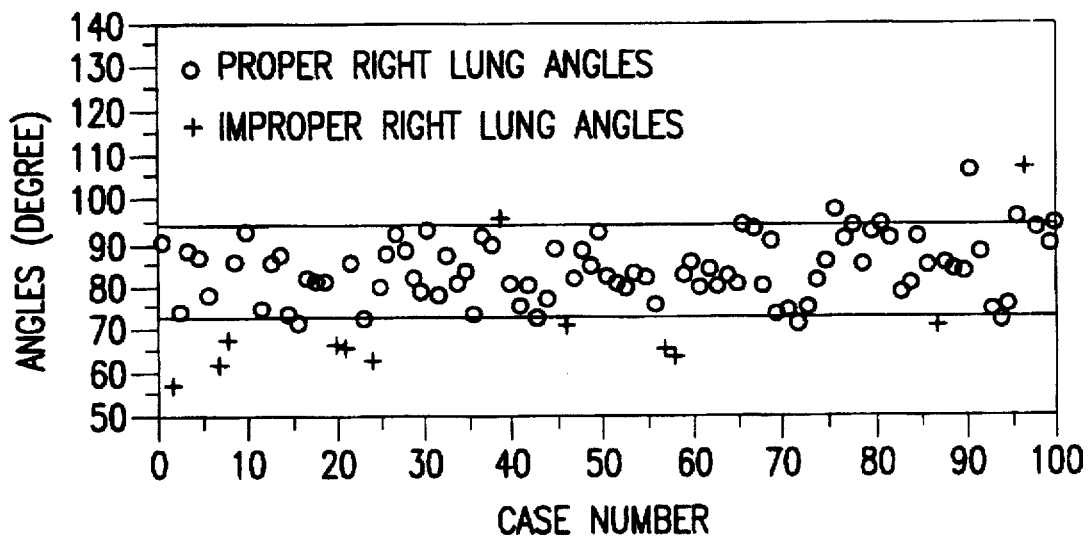
FIGS. 9(a) and 9(b) illustrate, respectively, distributions of (a) right lung angle (Ar) and (b) left lung angle (Al) obtained from 100 chest images. The upper and lower limits are defined from the average angle ±1.5 standard deviation obtained from all proper lung angles.
Figure 9B:
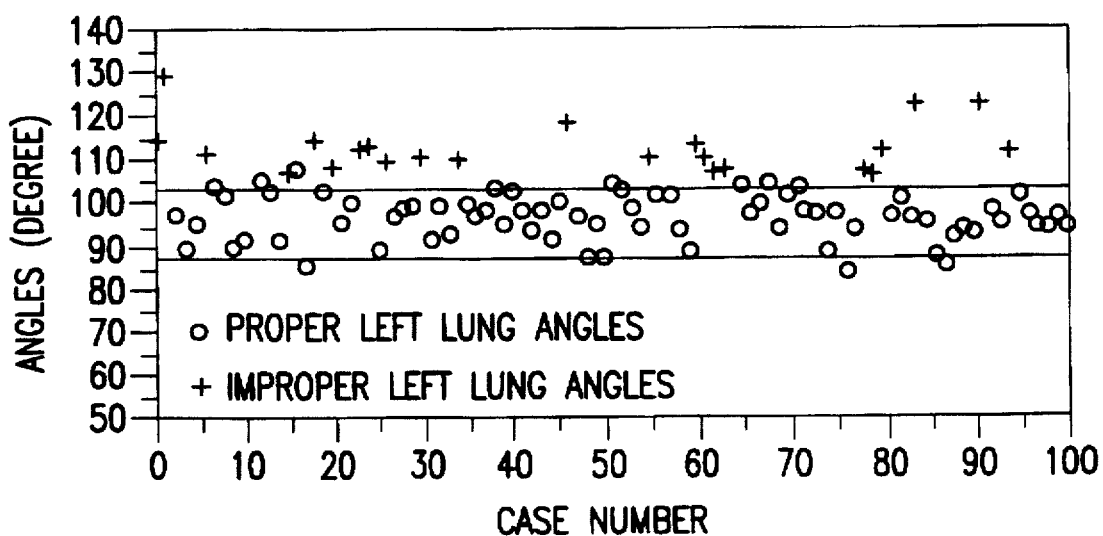

FIG. 9 shows the distributions of proper and improper angles in the right and left lungs of the 100 cases. The majority of the proper right and left lung angles are limited in certain ranges, as shown by the upper and lower bounds marked by the solid lines in FIG. 9. The upper and lower bounds of the lung angles for each lung are defined by the average lung angle ±1.5 times the standard deviation; these are calculated from all proper lung angles in each lung. It is apparent in FIG. 9 that all of the improper lung angles are outside the upper and/or lower bounds. Therefore, if an initially derived lung angle line may provide an angle outside the proper range, then the lung angle line should be rotated to become the average lung angle. The average lung angles for the right and left lung were 76.1° and 103.9°, respectively. It is a remarkable coincidence that the summation of these angles is exactly 180°. This result implies that the two lung angle lines are nearly symmetric about the midline in a chest image.

The search range of the top lung edges is defined by the inside and outside limits in each lung, as shown in FIG. 8. These limits were derived from the horizontal profile at the upper ⅕ level of the lung. The inside limit is defined halfway between the midline and the peak of the minimum pixel value in the horizontal profile in each lung. The outside limit is defined at the position, on the outer side in the horizontal profile in each lung, having an average pixel value between the minimum and the midline pixel values.

The starting point and search range for determination of ribcage edges in each lung are also illustrated in FIG. 8. The search of ribcage edges begins from the center of each lung. The horizontal profile and its second derivative at this center level, which are similar to those shown in FIG. 7, are used to determine the horizontal position of the starting point. The distance increment for calculating the second derivative is 50 pixels. The purpose of using this large increment to calculate the second derivative is to avoid the effects of unwanted structures in the lung area, such as edges from the cardiac shadow, large pulmonary vessels, and ribs.

In the determination of the starting point for ribcage edges, other landmark information in the lung field is also used, for example, the midline position, the lung angle line, and the position of the outside limit for the search of the top lung edges in each lung. It was found that the minimum peak of the second derivative, which is located outside the lung angle line in each lung, is generally very close to the inner edges of the ribcage of that lung. Thus, the minimum peak location in each lung is used as an approximate location of the horizontal position of the starting point for the search of ribcage edges in that lung.

It was found that in about 10% of all cases examined that the starting point for ribcage edges in one or both lungs was not detected correctly when a large increment of 50 pixels was used for calculation of the second derivative. These cases generally included relatively low image contrast near the ribcage edges at the center of the lung. Therefore, the use of a 50-pixel increment in the calculation of the second derivative can result in missing the "true" ribcage edges at the center of the lung. For all of these cases, it was found that, when the distance increment was reduced from 50 pixels to 25 pixels, the starting points for ribcage edges determined from the recalculated second derivative were very close to the "true" ribcage edges at the center level of the lung. It was also found that the distance between the detected ribcage edge starting point in each lung and the position of the outside limit for the search of the top lung edge in that lung can provide a useful measure to determine whether the detected ribcage edge starting point is correct or not. If this distance is larger than a certain length, for example, 100 pixels, then the detected ribcage edge starting point may not be correct due to the large increment used. Therefore, the distance increment should now be reduced to 25 pixels.

The upper limit for search of ribcage edges was determined at the upper ⅓ level of the lung. The lower limit was extended below the lung bottom by 15% of the lung length.

Top lung edges and ribcage edges are detected by analysis of profiles obtained from rectangular ROIs (80 pixels in length and 30 pixels in width) placed across the edges. For determining the top lung edges in each lung, the rectangular search ROIs are placed over the area of the top lung cages in the vertical direction. For detection of ribcage edges, however, the same rectangular search ROIs are used in the horizontal direction. The detection of the top lung or ribcage edges always begins from the respective starting point and is limited within the corresponding search range. To detect the adjacent top lung edge, the vertical position of the previously determined top lung edge is used as the center of the next search ROI, which is shifted by 30 pixels in the horizontal direction from its previous location. Similarly, the horizontal position of the previously determined ribcage edge is used as the center of the next search ROI, which is shifted by 30 pixels in the vertical direction from its previous location for detection of the adjacent ribcage edge.

Figure 10A:
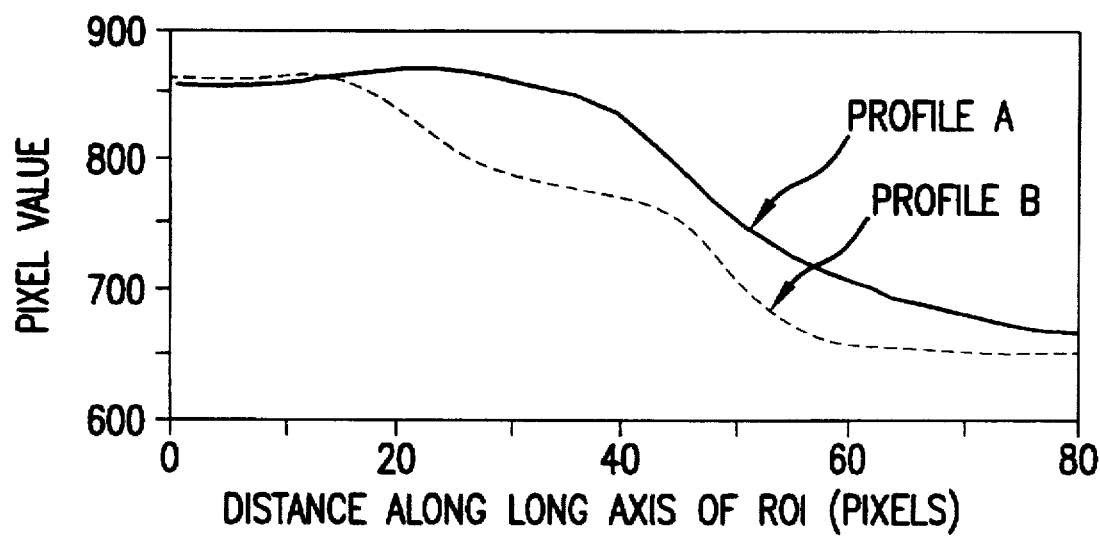
FIGS. 10(a) and 10(b) are graphs illustrating, respectively, (a) two profiles and (b) their second derivatives in two search ROIs.
Figure 10B:
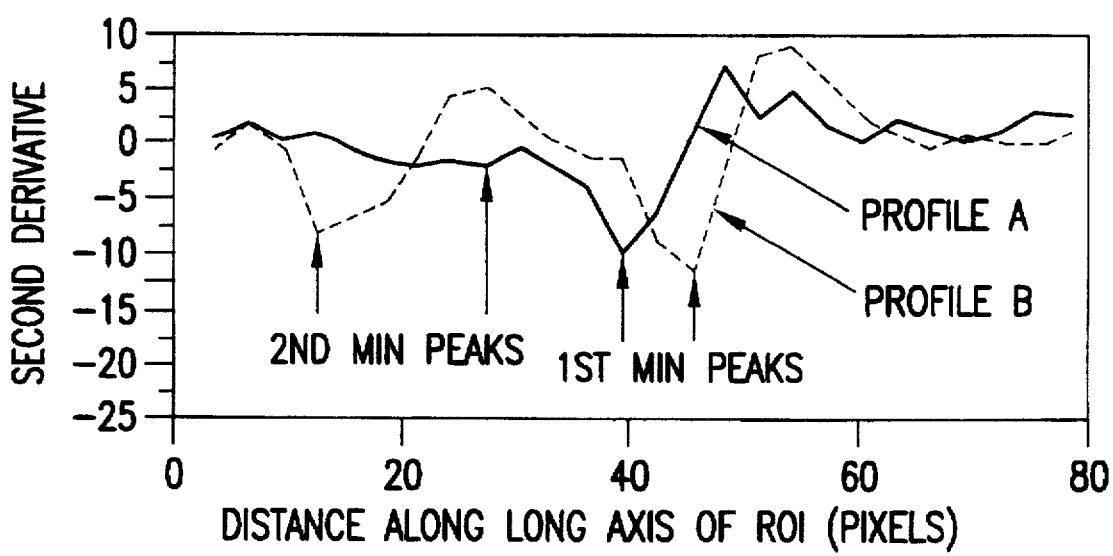
Figure 11:
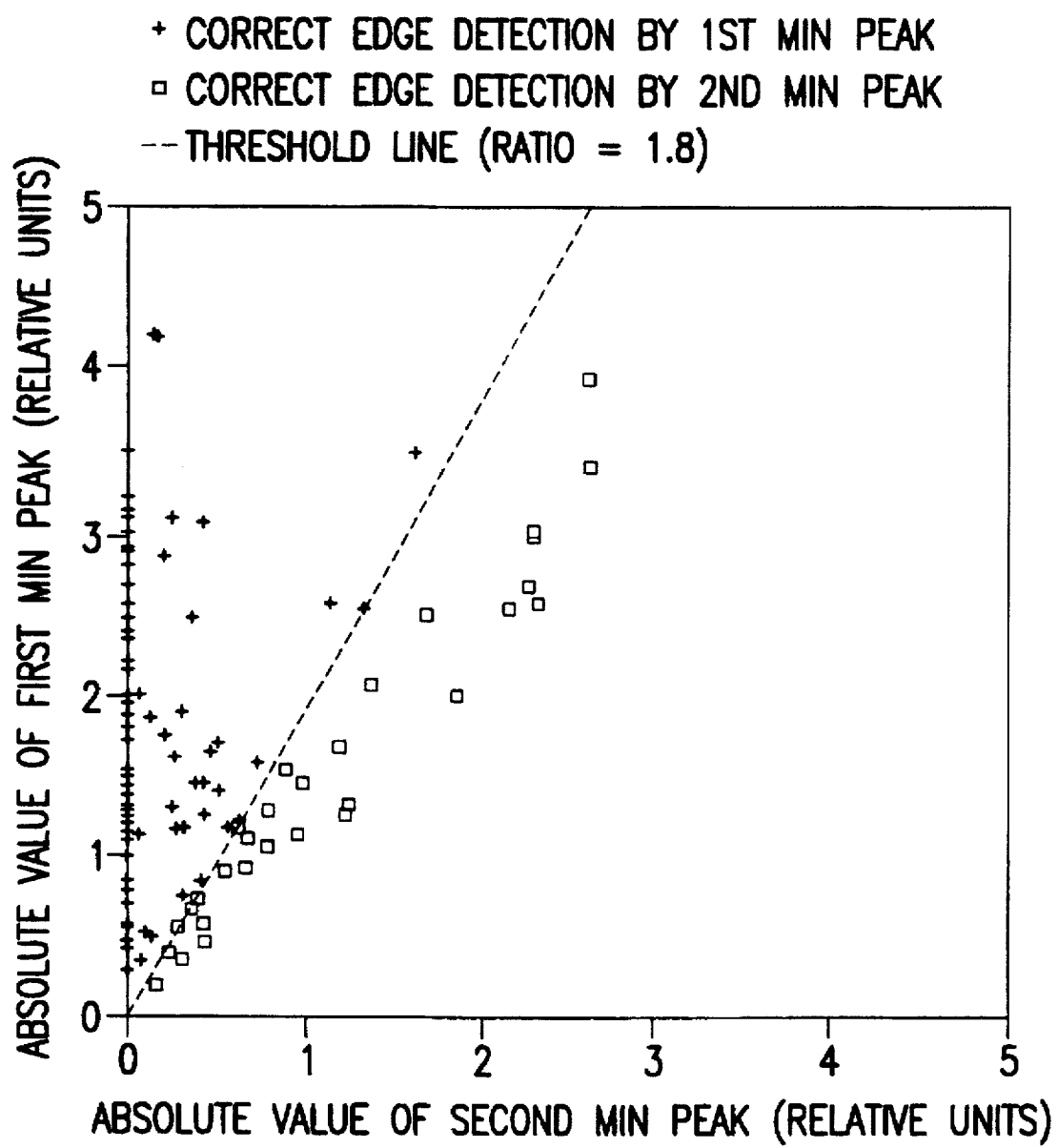
FIG. 11 is a graph illustrating the relationship between the first and second minimum peak values in second derivatives of profiles in search ROIs (20 images). The ratio of the first minimum peak value to the second minimum peak value is used as an indicator for correct detection of top lung edges or ribcage edges in ROIs.

Two examples of profiles and their second derivatives in two search ROIs are shown in FIG. 10. The distance increment used in the calculation of the second derivatives was 3 pixels. It was found that the use of the first minimum peak position in the second derivative to locate the top lung edge or ribcage edge within a search ROI was not always correct. The first minimum peak may result from other edge patterns in the ROI, such as ribs or devices. Therefore, the second minimum peak in the second derivative is also taken into consideration. FIG. 11 shows the relationship between the absolute values of the first and second minimum peaks obtained from 20 chest images. The ratio of the first minimum peak value to the second minimum peak value was defined as a measure to determine top lung or ribcage edges correctly. It should be noted in FIG. 11 that the first minimum peak position (marked by pluses) corresponds to the location of the top lung edge or ribcage edge in the search ROI, if the ratio of the first minimum peak value to the second minimum peak value is greater than a threshold value such as 1.8, which is shown by the dotted line. Otherwise, the top lung edge or ribcage edge can be detected correctly by the second minimum peak position.

Next described is how the ribcage boundary in the chest radiograph is delineated. Detected edges are grouped into three sections, namely, the top lung section and the right and left ribcage sections. The top lung section includes all top lung edges determined in both lungs and also three detected upper ribcage edges which are closest to the top lung edges in each lung. Each of the right and left ribcage sections contain all of the ribcage edges detected in each lung. For each edge section, a fourth degree polynomial function is applied to fit a smooth curve for locations of all detected edges.

With this method, two ends of the smooth curve for the top lung edges are overlapped with each of the smooth curves for the right and left ribcage edges in each lung. A simple weighting average method is applied to achieve a smooth connection in these two overlapped areas and thus to obtain a complete ribcage boundary in a chest radiograph. As the connection begins from the top of the overlapped areas toward the lower end, the weighting factor for the top lung edge curve is reduced from 1 to 0 in proportion to the distance from the top to the lower end, whereas the weighting factor for the ribcage edge curves is increased from 0 to 1.

In order to examine the accuracy of the results of the present computerized automated method in the determination of the ribcage boundary in digital chest images, a subjective evaluation was employed. Three radiologists and two physicists participated in the evaluation test. A five-point rating scale was used in this test, i.e., 5 for highly accurate, 4 for moderately accurate, 3 for marginally accurate, 2 for moderately inaccurate, and 1 for highly inaccurate. "Highly accurate" was used if the ribcage boundary of a computer output corresponded almost perfectly to the real ribcage boundary in a chest image. "Highly inaccurate" was used if the two were obviously different. The observers were asked to use the rating scale consistently. There was no time limit for observation of each result. The distribution of the average number of cases for each rating score by three groups of observers, i.e., all five observers, three radiologists and two physicists indicate that the majority of cases indicates highly accurate results of our computer output. If the two high (4 and 5) scales are combined, the number of cases containing the average rating of moderately to highly accurate results, by all five observers, three radiologists and two physicists, were 96.7%, 97.3% and 95.0%, respectively. About 1% of the total cases were rated as 1 or 2 categories, which were classified as the complete failure of detection of ribcage edges and lung boundaries in chest images. Among them, 80% are due to various large devices (over 24 mm) included in the lung fields and the rest are due to incorrect detection of the lung top position or ribcage edges in chest images.

As above noted, the distance increment (in pixels) used for the calculation of the first derivative of the vertical profile in the upper central area of a chest image has a strong effect on the correct determination of the position of the lung top. With the present method, it is assumed that the first candidate for the lung top is either at the position of the "true" lung top or in the neck area. This assumption is not valid if an improper distance increment is used. For example, if a large increment (more than 10 pixels) is used, then the first candidate for the lung top position might be skipped and the position of the "true" lung top may be located incorrectly inside the lung area. On the other hand, if the increment is less than 5 pixels, then various structures in the neck area, such as the neck bone, chin, and lower jaws, could lead to incorrect detection of the lung top position. Thus, an increment of 5 pixels is employed so that the first candidate would not be located inside the lung area, while the effects of various structures in the neck area can be minimized.

Next described is the detection of diaphragm edges of postero-anterior (PA) chest images. As an overview, first, the right hemidiaphragm edges in a chest image are determined through the edge gradient analysis. Then, an initial vertical ROI is placed at the middle of the left hemidiaphragm to determine the left starting points for searching left hemidiaphragm edges based on a manually measured relationship (or "standard rule") between the middle right and left-hemidiaphragm edges. Seven categories are used to assess the placement of the initial ROI and the accuracy of the primary left starting point within the initial ROI. For some categories, it is necessary to select a second left starting point beside the primary one. Therefore, for those categories, there are two sets of detected "left hemidiaphragm edges" resulting from the two left starting points. Two parameters are used as measures to eliminate the false left hemidiaphragm edges which are due to an incorrect left starting point. Two polynomial functions are applied separately to produce smooth curves for the right and left hemidiaphragm edges, respectively. Finally, the right and left hemidiaphragm edge curves are connected with the corresponding ribcage edge curves to form a complete delineation of the lung fields in a chest image. A total of 300 radiographs were digitized to lk×lk matrix size and a 10-bit gray scale with a laser scanner and analyzed by our method. The results indicated that the accuracy for the determination of the right and left hemidiaphragm edges is approximately 97% and 90%.

Next described is the detailed method for the determination of diaphragm edges, beginning with the determination of starting points at the middle of the right and left hemidiaphragms.

The right hemidiaphragm area in a chest image is generally free of the effects of the complicated patterns of stomach gas structures and cardiac edges. The image contrast between the lower right lung area and the right hemidiaphragm area is usually high. Thus, the profiles across the right hemidiaphragm in the chest image indicate clear edge patterns. Therefore, it is not difficult to detect the right hemidiaphragm edges with the edge gradient analysis method through the first derivatives of profiles selected over the right hemidiaphragm if the starting point and search ranges are chosen properly.

Figure 12:
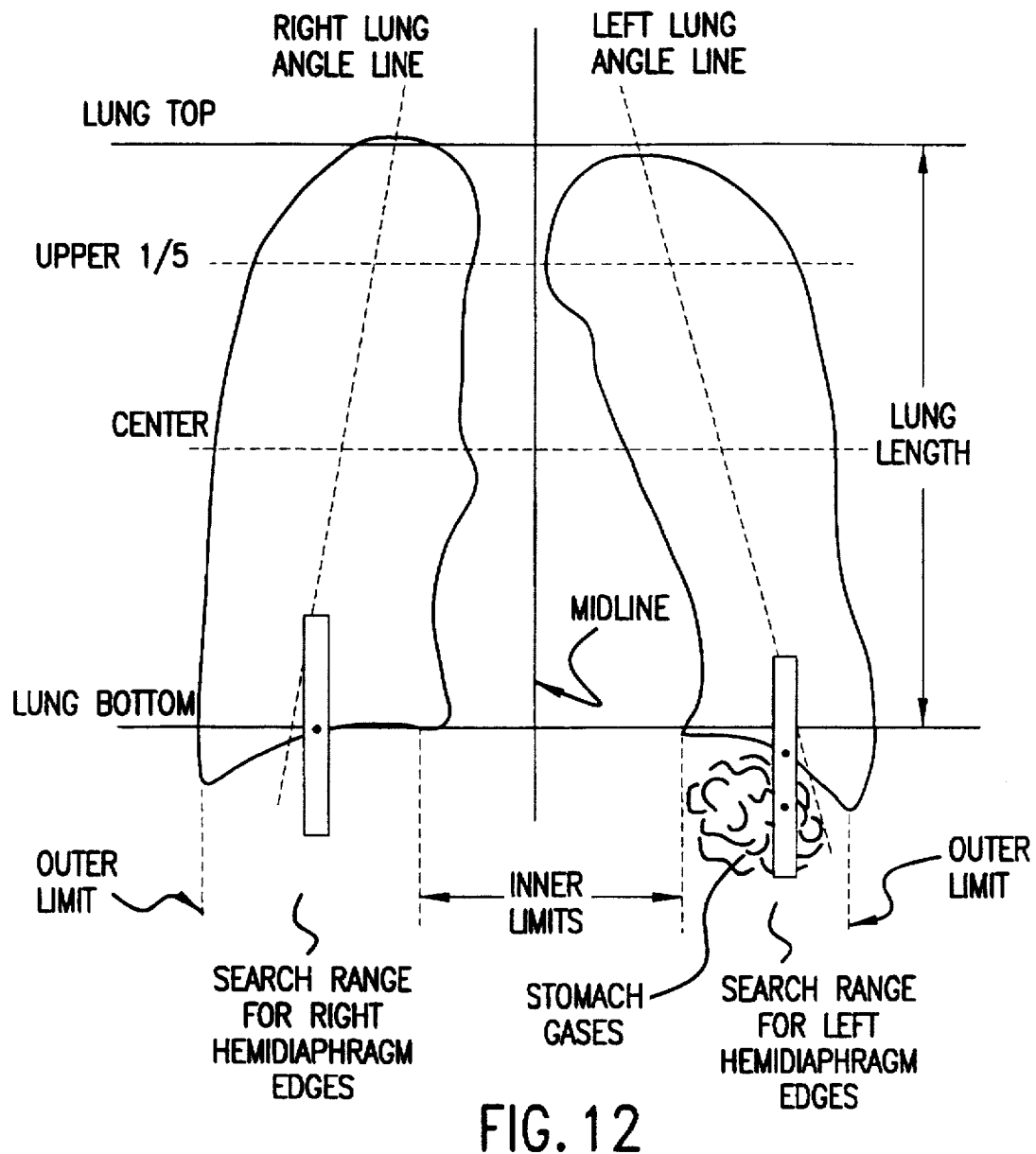
FIG. 12 is an illustration of the placement of the initial vertical ROIs, starting points and search ranges for detection of the right and left hemidiaphragm edges. The other landmark information of the chest image which are derived from the detection of ribcage edges is also indicated.

To detect the right starting point for search of the right hemidiaphragm edge in a chest image, the initial vertical ROI is set at the middle of the right hemidiaphragm. FIG. 12 demonstrates the method of selection of the initial ROI at the middle of the right hemidiaphragm for detection of the right starting point. This initial ROI has the length and width of 200 pixels (70.0 mm) and 20 pixels (7.0 mm), respectively. The center of the initial ROI is derived based on the landmark information obtained from the detection of ribcage edges in the chest image. The vertical coordinate (y) of the center of the initial ROI is chosen at the vertical level of the lung bottom. The horizontal coordinate (x) of the center of the initial ROI is selected by shifting the crossing point between the right lung angle line and the horizontal line through the lung bottom 30 pixels (10.5 mm) toward the midline. The lung angle line is a straight line through the two minimum pixel value locations at the two vertical levels in each of the right and left lungs. The two vertical levels corresponded to the upper ⅕ and the center of lungs, as shown in FIG. 12. The midline in the chest image is assumed to be located at the largest pixel value near the center of the horizontal profile which is calculated from the vertical level of the center of the image.

Figure 13A:
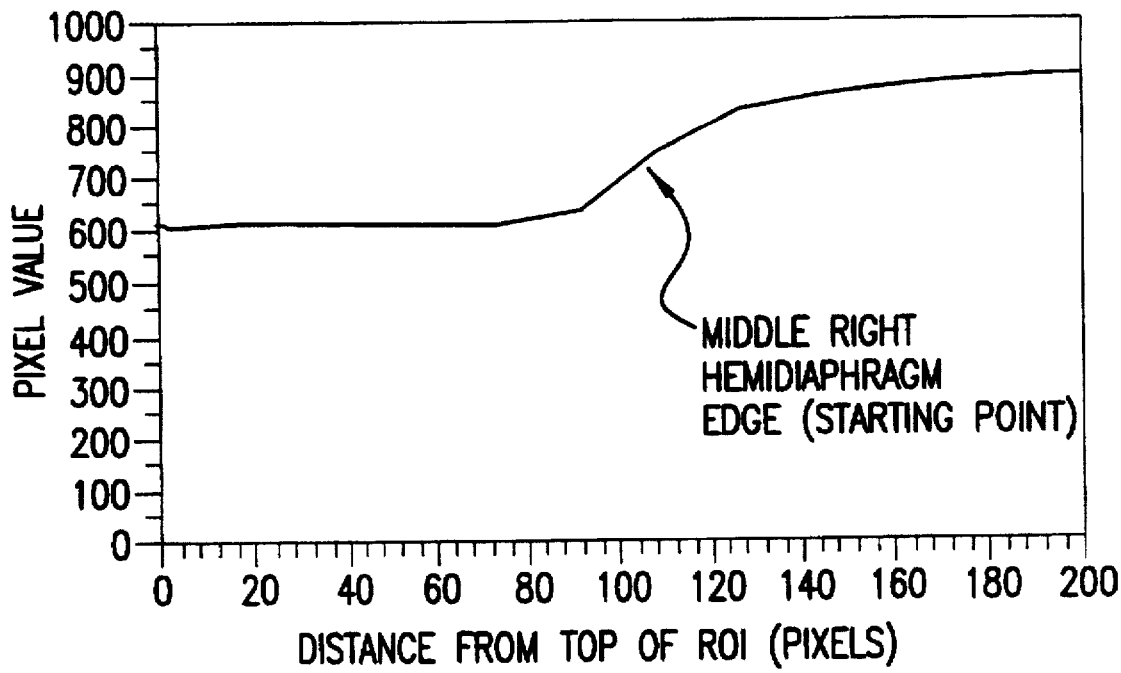
FIGS. 13(a) and 13(b) are, respectively, (a) a vertical profile and (b) its first derivative calculated from the initial vertical ROI at the middle of the right hemidiaphragm.
Figure 13B:
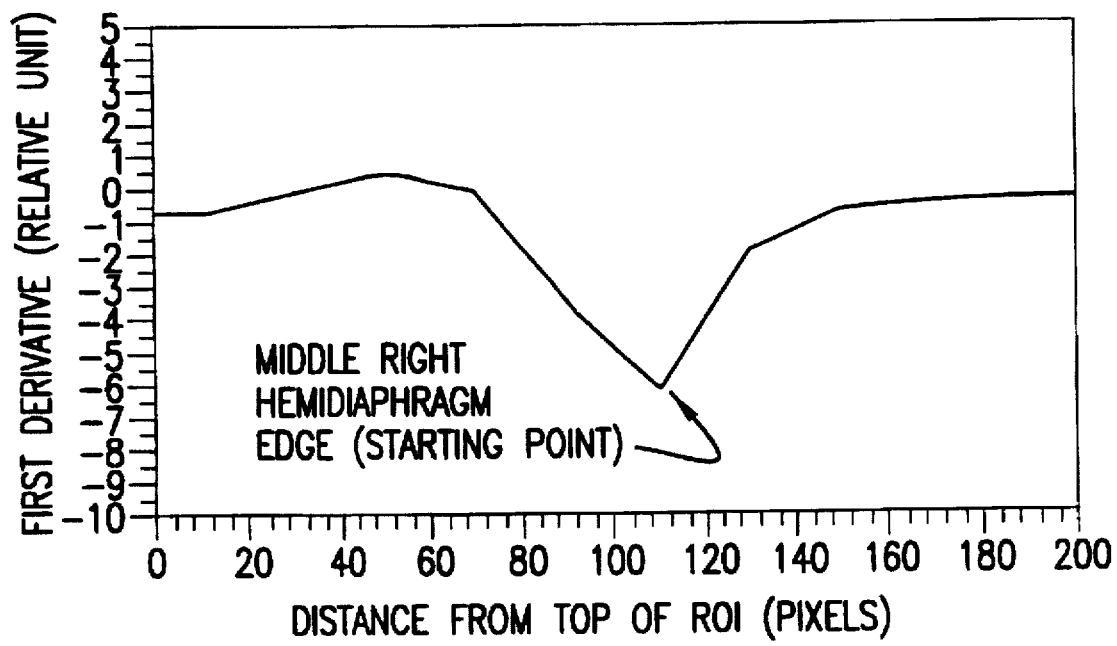

FIGS. 13(a) and 13(b), respectively, show the vertical profile and its first derivative calculated from the initial vertical ROI at the middle of the right hemidiaphragm. It is clear in FIG. 13(a) that the vertical profile in the initial ROI indicates a clear edge pattern (i.e., the step edge pattern) because the right hemidiaphragm area does not have the effects of stomach gases and cardiac edges, and the image contrast is usually high between the right lower lung area and the right hemidiaphragm area. The first derivative of the vertical profile is shown in FIG. 13(b). The right hemidiaphragm edge within the ROI can be detected by the location of the minimum in the first derivative according to the edge detection theory (see Johne, "Digital Image Processing: Concepts, Algorithm and Scientific Applications", Springer-Verlag, 1991). This detected right hemidiaphragm edge inside the initial ROI is referred to as the right starting point and is used as a guide for further search of right hemidiaphragm edges located on the either side of the right starting point. This right starting point is also called the middle right hemidiaphragm edge which is an important quantity for the selection of the initial vertical ROI at the middle of the left hemidiaphragm, as will be discussed in detail next.

The selection of the initial vertical ROI at the middle of the left hemidiaphragm for the purpose of determination of the left starting point is not as simple as that at the middle of the right hemidiaphragm because the presence of the complicated patterns of stomach gas structures and the effects of cardiac edges which are very common in the left hemidiaphragm area for a large number of chest images. Furthermore, the vertical level of the left hemidiaphragm is generally different from that of the right hemidiaphragm. Thus, using only landmark information is not sufficient to select a proper initial vertical ROI at the middle of the left hemidiaphragm.

Figure 14A:
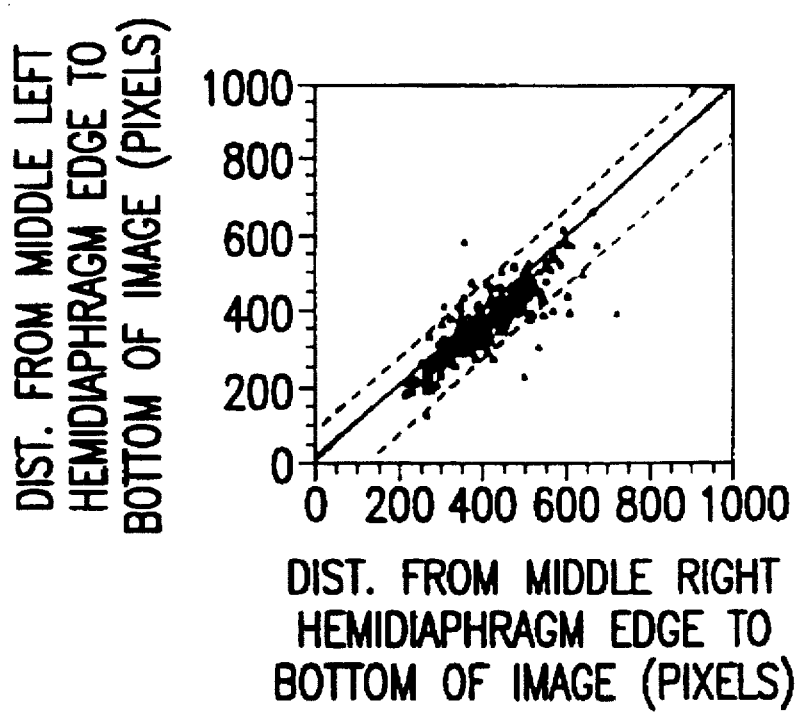
FIGS. 14(a) and 14(b) are graphs illustrating, respectively, (a) a relationship of distance from the middle of the right and left hemidiaphragms to the bottom of image, and (b) selection of upper and lower levels of the initial vertical ROI in the middle of the left hemidiaphragm based on the detected middle right hemidiaphragm edge.
Figure 14B:
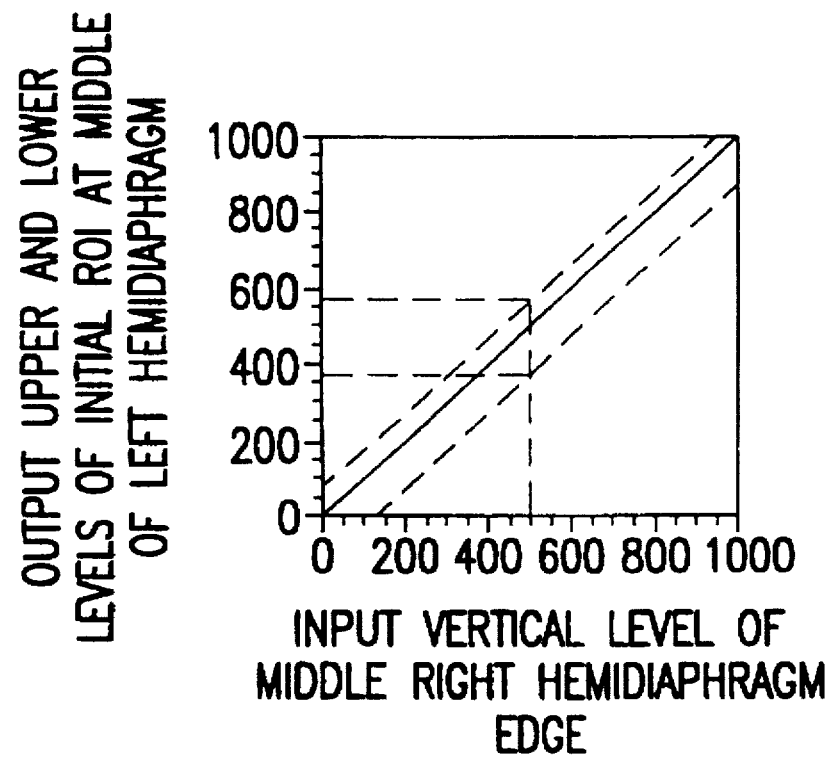

Therefore, in order to overcome these difficulties, the distances (pixels) from the middle right and left hemidiaphragm edges to the bottom of the image were manually measured for each case in the database, as shown in FIG. 14(a). The purpose of this measurement was to establish a "standard rule" for selection of the upper and lower levels of the initial ROI at the middle of the left hemidiaphragm based on the previously detected middle right hemidiaphragm edge (i.e., the right starting point). It should be noted in FIG. 14(a) that the vertical positions of the middle right and left hemidiaphragm edges were correlated for the majority of chest images in the database. About 95% of cases in the database had the middle right and left hemidiaphragm edges which were covered by the limiting ranges marked by the dotted lines, as shown in FIG. 14(b). Forty-four out a 300 cases were located above the 45° diagonal line, as shown by the solid line in FIG. 14(a). The average distance and the standard deviation of these cases to the diagonal line were 22.86 pixels (8.0 mm) and 29.14 pixels (10.2 mm), respectively. The upper limit which was above the diagonal line is therefore determined by the average distance plus the standard deviation. Two hundred and fifty one cases, on the other hand, were located below the 45° diagonal line. The average distance and the standard deviation of these cases to the diagonal line were 33.71 pixels (11.8 mm) and 28.57 pixels (10.0 mm), respectively. The lower limit which was below the diagonal line is then determined by the average distance plus two times of the standard deviation. It is noted that cases that were above 45° diagonal line had the higher level of the left hemidiaphragm than that of their right hemidiaphragm. However, in those cases which were below the 45° diagonal line, the level of the left hemidiaphragm was lower than that of their right hemidiaphragm.

In order to determine the left starting point at the middle of the left hemidiaphragm, the initial vertical ROI having a width of 20 pixels was placed at the middle of the left hemidiaphragm. The horizontal coordinate (x) of the origin of the initial ROI was selected at that of the crossing point between the left lung angle line and the horizontal line through the lung bottom. The vertical coordinate (y) of the origin of the initial ROI was set to equal to that of the right starting point. FIG. 14(b) illustrates the method of selection of the upper and lower levels of the initial ROI at the middle of the left hemidiaphragm. The upper level of the initial ROI was above the origin by 74 pixels, while the lower level of the initial ROI below the origin by 128 pixels. It is necessary to point out that for these cases above the upper limit in FIG. 14(a), the initial ROI selected by this method would be located in left hemidiaphragm area, but for those cases below the lower limit, the initial ROI would be in the left lower lung area. Under both situations, the initial ROIs were not able to capture the desired middle left hemidiaphragm edge (i.e., the left starting point for search of left hemidiaphragm edges).

Figure 15A:
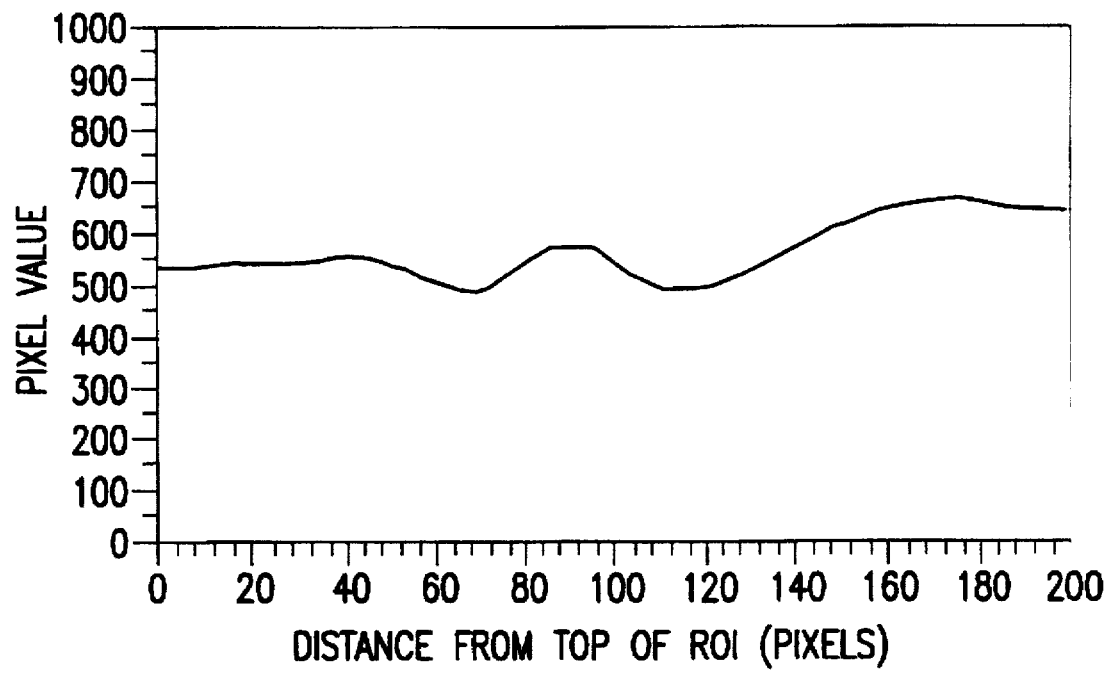
FIGS. 15(a) and 15(b) are graphs illustrating, respectively, (a) a vertical profile and (b) its first derivative calculated from the initial vertical ROI at the middle of the left hemidiaphragm.
Figure 15B:
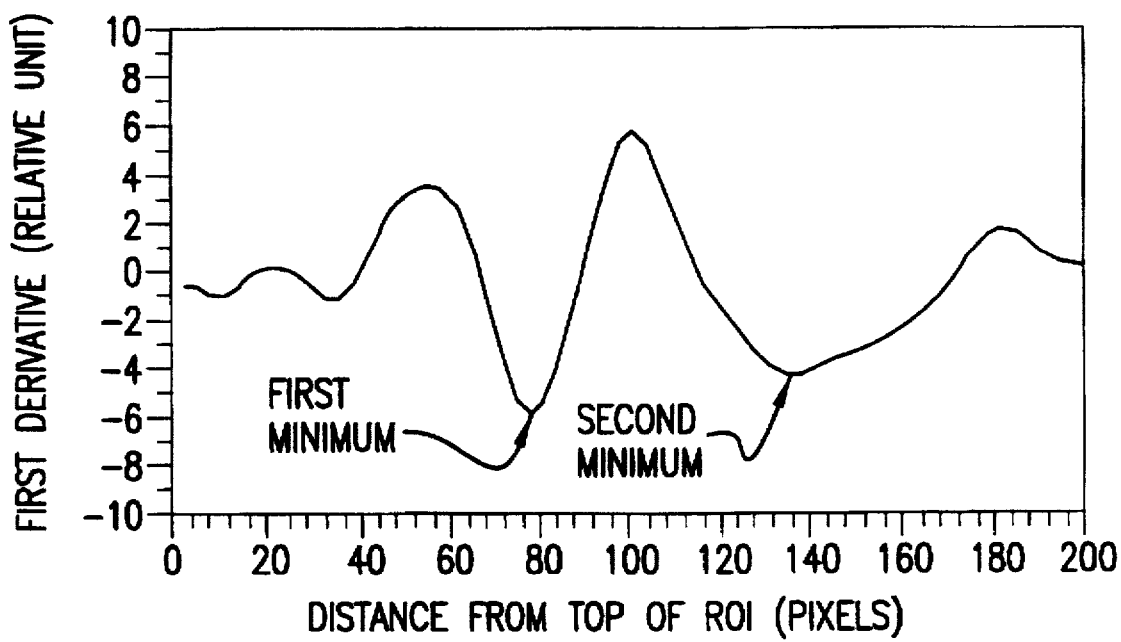

Once the initial ROI is determined, the vertical profile and its first derivative are calculated from the initial vertical ROI across the left hemidiaphragm, shown in FIGS. 15(a) and 15(b). The primary left starting point within the initial ROI is defined at the location of the first minimum in the first derivative, as shown in FIG. 15(b). It is important to note that there were two major edges in this profile, corresponding to the first and second minimum in the first derivative of the profile as shown in FIG. 15(b). The non-diaphragm edge in the profile could result from the complicated structures of stomach gases or cardiac edges. It is very likely that the first minimum in the first derivative corresponds to the non-diaphragm edge if the non-diaphragm-edge pattern is strong enough. Therefore, it is not reliable to use only the primary left starting point as a guide to search left hemidiaphragm edges. In order to evaluate the effects of the non-diaphragm-edge pattern within the initial ROI, the inventors define a measure which is the ratio of the second minimum to the first minimum in the first derivative of the profile calculated from the initial ROI.

Figure 16A:
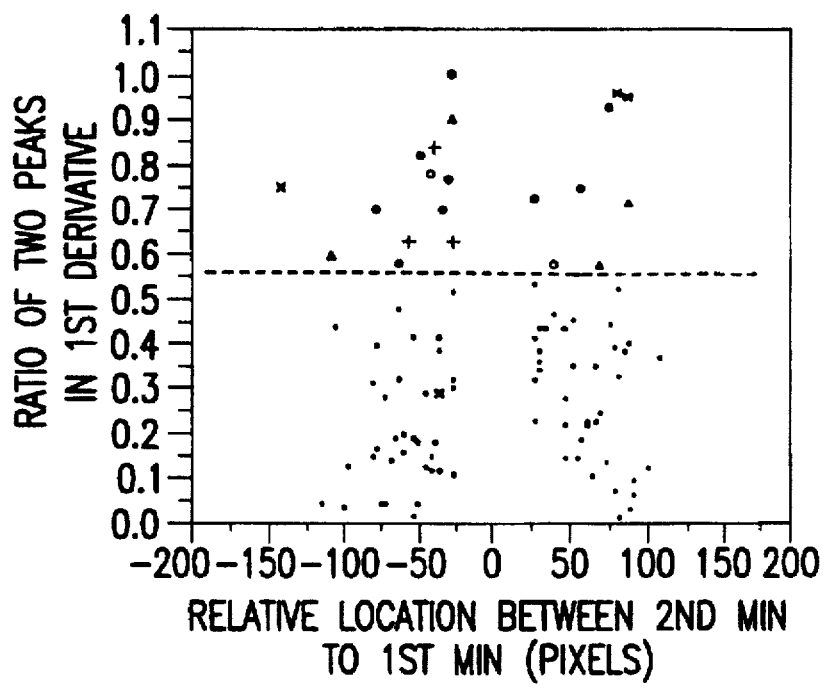
FIGS. 16(a) and 16(b) are graphs illustrating respectively, the relationship between (a) the ratio of the second minimum to the first minimum in the first derivative of the profile derived from the initial vertical ROI at the middle of the left hemidiaphragm and the relative location between the second minimum to the first minimum, and (b) the absolute values of the second minimum and the first minimum. The total number of cases used is 100.
Figure 16B:
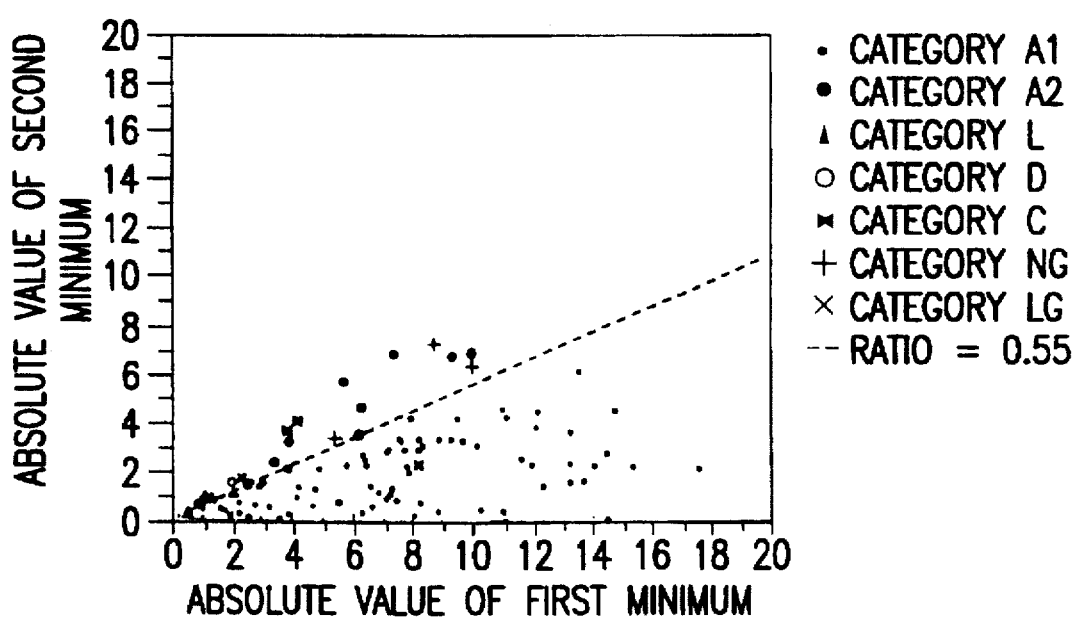

FIG. 16(a) shows the relationship between the defined ratio and the relative location between the second minimum to the first minimum for 100 cases, while FIG. 16(b) shows the relationship between the absolute values of the first minimum and the second minimum. It was found that seven categories could be used to assess the placement of the initial vertical ROI and the accuracy of the primary left starting point based on the defined ratio. Table 1 summarizes the seven categories used in the classification of the initial ROI placement at the middle of the left hemidiaphragm area and the primary left starting point inside the ROI for searching left hemidiaphragm edges in terms of correct/incorrect ROI location and correct/incorrect left starting point. The primary left starting point is detected at the first minimum of the first derivative of the vertical profile in the ROI.

TABLE 1

| Category | Ratio* | Initial ROI Location | Primary Left Starting Point** |
|---|---|---|---|
| A1 | <0.55 | Correct | Correct |
| A2 | >0.55 | Correct | Correct |
| L | >0.55 | Lung | Incorrect |
| D | >0.55 | Diaphragm | Incorrect |
| C | >0.55 | Correct | Incorrect (cardiac edge) |
| NG | >0.55 | Correct | Incorrect (narrow edge) |
| LG | >0.55 | Correct | Incorrect (large gas) |

*The ratio is defined as the second minimum to the first minimum in the first derivative of the vertical profile in the initial vertical ROI at the middle of the left hemidiaphragm area.
**primary left starting point for searching left hemidiaphragm edges.

For cases of category A1, the placement of the initial ROI at the middle of the left hemidiaphragm is correct. Moreover, the middle left hemidiaphragm edge is the dominant edge pattern within the initial ROI. The ratio of the second minimum of the first minimum in the first derivative is generally smaller than a pre-selected criterion, for example, equal to or less than 0.55, as shown by the dotted lines in FIG. 16(a). In other words, for these cases,the effects of the stomach gases and cardiac edges on the determination of the left starting point might not be present or at least not important. Therefore, it is correct to use the primary left starting point as the sole left starting point for search of the rest of the left hemidiaphragm edges.

Although the placement of the initial ROI at the middle of the left hemidiaphragm is correct, the ratio is larger than the pre-selected criterion (i.e., ratio >0.55) for cases of category A2, LG, NG, and C. Cases whose complicated structures of stomach gases contribute a major edge pattern within the initial ROI are classified into category A2, LG or NG. Cases of category C indicate the fact that the presence of the effects of the cardiac edges on the detection of the left starting point is strong. In other words, for cases of these categories one of the two major edge patterns within the initial ROI results from either stomach gas structures or cardiac edges. Thus, it is not proper to use only the primary left starting point as a sole left starting point for search of left hemidiaphragm edges. Therefore, it is necessary to take into consideration the second left starting point corresponding to the second minimum in the first derivative. It should be noted that the difference between a case of category A2 and a case of either category LG or NG is that the primary left starting point is the proper left starting point for the case of category A2, while incorrect for the case of either category LG or NG. Category LG represents cases having very complicated large stomach gas patterns over their left hemidiaphragm area. The category NG represents those cases which have relatively simple and narrow shape of stomach gases that are close to left diaphragm edges.

Figure 17A:
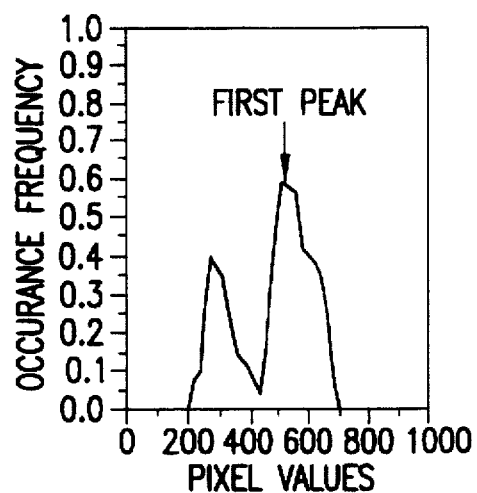
FIGS. 17(a), 17(b) and 17(c) are, respectively, histograms of (a) the initial vertical ROI at the middle of the right hemidiaphragm, (b) the initial vertical ROI located inside the left lower lung area (cases of category L), and (c) the initial vertical ROI located in the left hemidiaphragm area (cases of category D). The histogram peak which is closest to the pixel value of 1023 is defined as the first peak of the histogram, as shown by the arrow sign in each histogram.
Figure 17B:
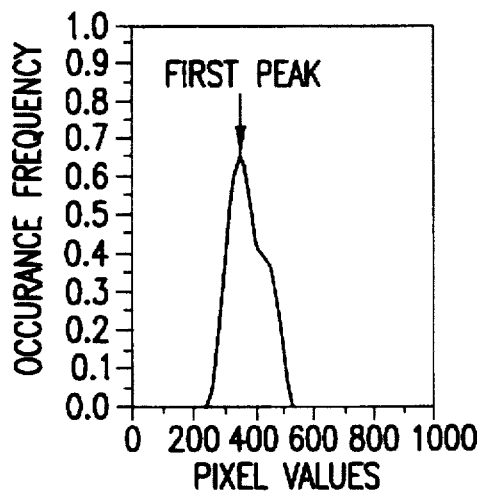
Figure 17C:
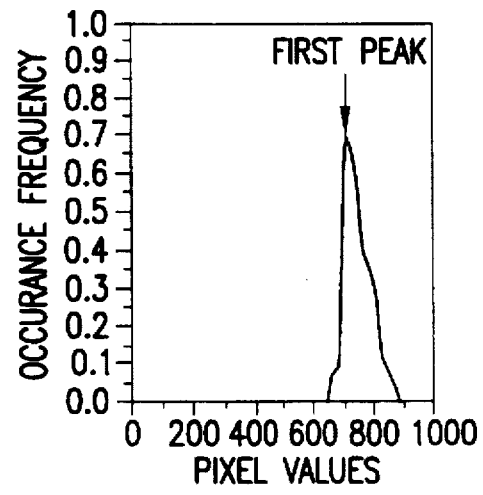
Figure 18:
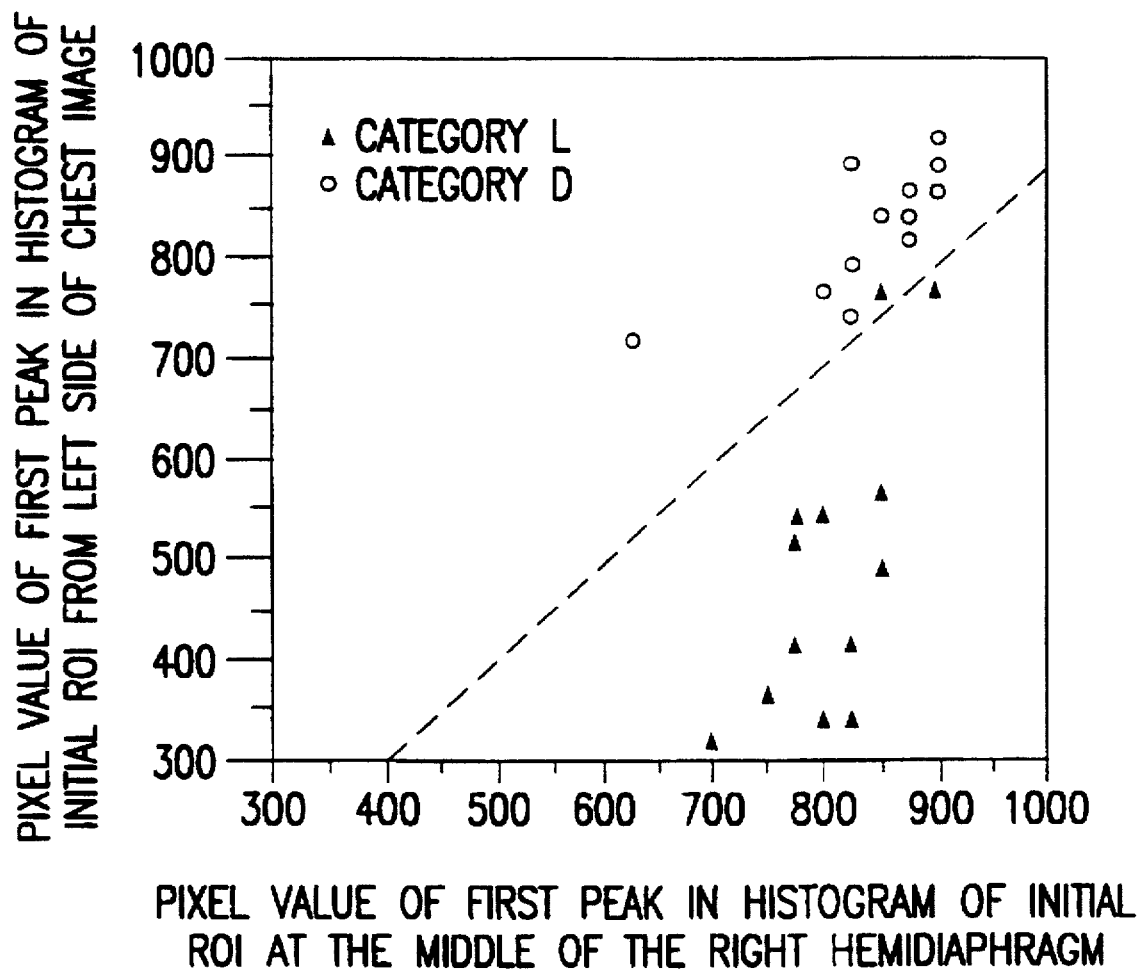
FIG. 18 is a graph illustrating the relationship between pixel values at the first peak of histograms of initial vertical ROIs at the middle of the right hemidiaphragm and the left side of the chest images (either in left lower lung area (category L) or left hemidiaphragm area (category D)). The total number of cases used is 25.

The initial vertical ROI could not capture the required middle left hemidiaphragm edge if the placement of the initial ROI is either too low located in the left hemidiaphragm area or too high in the left lower lung area. Cases whose placement of the initial ROI correspond to the former and the latter situation are classified into category D and category L, respectively. Since the pixel values within the initial ROI are relatively uniform (i.e., there is no dominant edge patterns) for cases of category D or L, the ratio is generally large, as shown in FIG. 16(a), while the absolute values of both the first and second minimum in the first derivative are very small, as shown in FIG. 16(b). The initial ROI should be shifted up or down for cases of category D or L, respectively, to recapture the middle left hemidiaphragm edge. Therefore, in order to distinguish between cases of category D and L, the histograms derived from both the initial ROIs at the middle of the right and left hemidiaphragm are compared, as shown in FIGS. 17(a), 17(b) and 17(c). The histogram from the initial ROI placed crossing the right middle hemidiaphragm edge (FIG. 17(a)) had two major peaks generally. These two peaks represented the pixel values in areas of lower lung and diaphragm, separately. The peak at the most right side of the histogram is defined as the first peak of the histogram. It should be noted in FIGS. 17(b) and 17(c) that the histogram of either category D or L has only one peak which corresponding to the pixel values in the initial ROI which is located in the left hemidiaphragm area or the left lower lung area, respectively. It was found that the category D and L could be separated by comparing with a threshold (the dashed line in FIG. 18) the pixel value at the first peak of the histograms from the initial ROIs at the middle of the right and left hemidiaphragms, as shown in FIG. 18. Cases of both category D and L could be re-classified into one of the categories of A1, A2, C, NG or LG, after correct identification as D or L and proper shift of the initial ROI.

Figure 19:
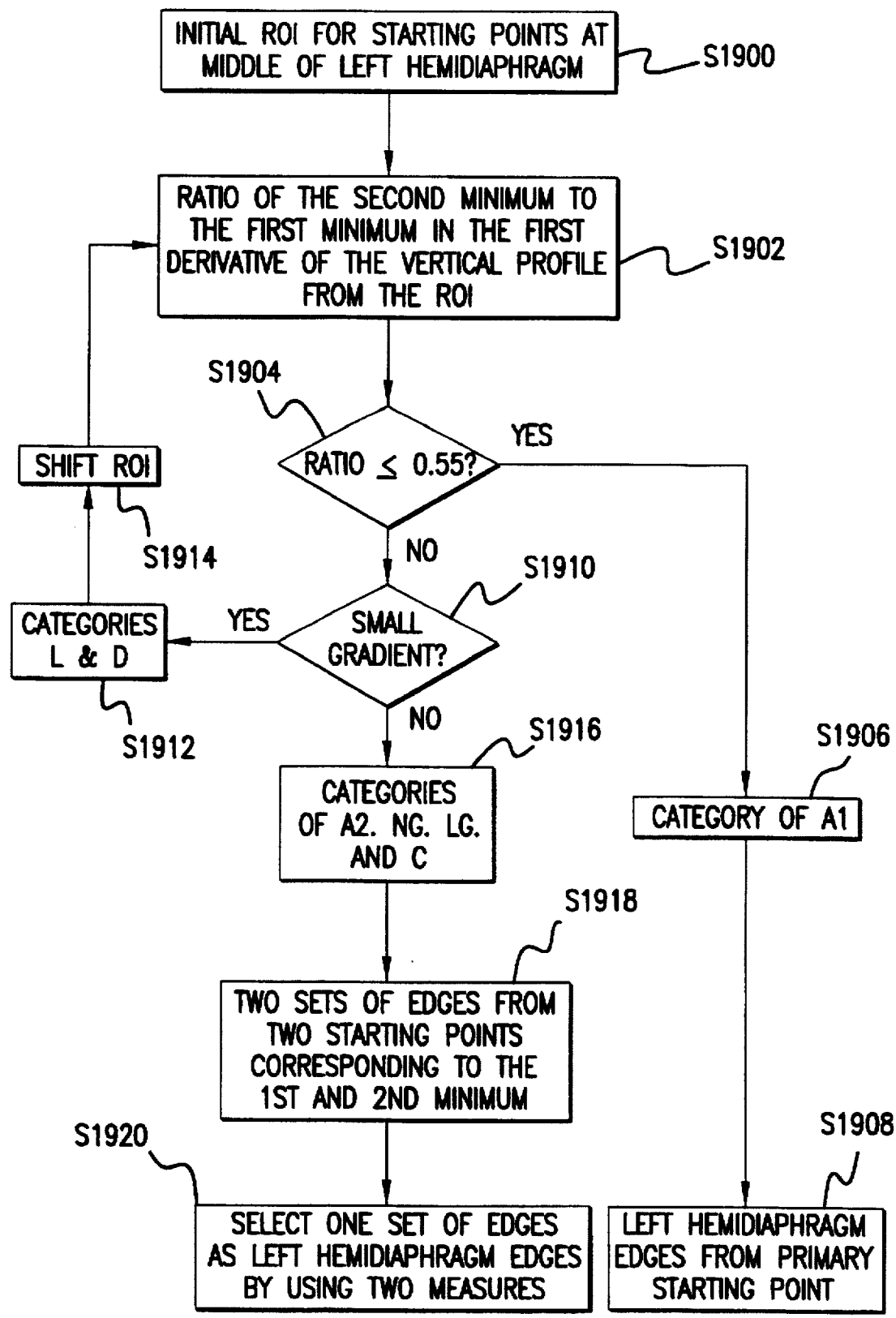
FIG. 19 is a flow chart illustrating a computerized method for determination of left hemidiaphragm edges according to the present invention, wherein two parameters are used as measures to eliminate the false left hemidiaphragm edges that are resulted from an incorrect starting position. The first parameter is the slope derived from the linear fit of the detected left hemidiaphragm edges. The second one is the standard deviation of the vertical distance from the detected left hemidiaphragm edges to a third order polynomial fitting curve of these edges.

FIG. 19 shows the flow chart of the method for the detection of left hemidiaphragm edges of a chest image by the image feature analysis method of the present invention. In step 1900, the placement of the initial vertical ROI at the middle of the left hemidiaphragm is determined based on the landmark information derived from the ribcage-edge detection in the image as well as the "standard rule" as shown in FIG. 14(b). In step 1902, the vertical profile and its first derivative from the initial ROI are obtained and the ratio of the second minimum to the first minimum is then calculated. In step 1904, the ratio is compared with a threshold of 0.55 established with regard to FIG. 16(a). If the ratio was equal to or less than the threshold, the case in step 1906 is classified into category A1 and in step 1908 the primary left starting point is determined the sole left starting point for further searching left hemidiaphragm edges. Thus, for cases of category A1, the procedure of detection of left hemidiaphragm edges is similar to that of right hemidiaphragm edges and thus is simple. If in step 1904 the ratio is determined to be larger than the threshold, in step 1910 the gradient, i.e., the absolute value of the first and second minimums in the first derivative of the vertical profile in the ROI, is checked to determine if it is small. If the gradient is small, i.e., the absolute values of the first minimum and the second minimum of the first derivative are less than 2.61 and 1.72 respectively, for example, in step 1912 it is concluded that the case belongs to either category D or L. By application of the threshold to the histogram peaks, as above explained in regard to FIG. 18, it is determined which of categories D and L applies in order to shift the initial ROI in step 1914 properly to re-capture the middle left hemidiaphragm edge. The amount of the shift (in pixels) in the vertical direction (up or down for category D or L, respectively) is, for example, ⅓ of the length of the left initial ROI. The length of the left initial ROI is 202 pixels (74+128=202 pixels). Then, steps 1904 and 1910 are repeated. If a small gradient is not detected in step 1910, the case is determined in step 1916 to be a category A2, NG, LG or C. For such categories of A2, LG, NG or C, two left starting points are selected from the initial ROI for search of left hemidiaphragm edges. These two left starting points correspond to the locations of the first and second minimums in the first derivative of the vertical profile from the initial ROI. The two left starting points result in two sets of detected left hemidiaphragm edges in step 1918. Further feature analysis based on two measures, as will be described in detail later, are applied in step 1920 to identify the correct set of left hemidiaphragm edges between the two sets.

The procedure for searching diaphragm edges is similar for both the right and left hemidiaphragm. The detection of diaphragm edges always begins from the respective starting point and is limited within the corresponding search range. The range ends which are close to the midline are called inner limits for search of diaphragm edges and those which are close to the right and left ribcages are referred to as outer limits. The respective inner and outer limits which correspond to the search ranges of right and left hemidiaphragm edges are illustrated in FIGS. 12(a) and 12(b). The inner limits are determined at the half-ways between the midline and the corresponding starting points. On the other hand, the right and left outer limits are chosen at the horizontal positions of the lowest ribcage edges of the right and left lungs, respectively.

For searching the diaphragm edges, a search ROI in the vertical direction is used. This search ROI is generally shorter than the initial ROI for determination of the starting points. The width of the search ROI is also 20 pixels. To detect the adjacent diaphragm edge, the vertical position of the previously determined diaphragm edge is used as the center of the next search ROI, which is shifted by 30 pixels in the horizontal direction from its previous location. Then again, the diaphragm edge within the search ROI is detected by the location of the minimum in the first derivative of the vertical profile calculated from the ROI. The length of the vertical search ROI was 60 pixels and 100 pixels for the ROI in the inner and outer search ranges, respectively. The longer search ROI in the outer search ranges was necessary for the ROI to capture the diaphragm edges in the outer ranges because the angle between the diaphragm margin and the vertical axis of the search ROI becomes narrow as the search ROI shifted towards the ribcage edges. FIGS. 20(a)-20(b), 21(a) and 21(b) demonstrate the results of the detection of right and left hemidiaphragm edges for cases of category C and LG. Both categories have two sets of detected "left hemidiaphragm edges" which result from two left starting points. The correct left hemidiaphragm edges are marked by the plus signs. The signs of circles in both images present the falsely detected left hemidiaphragm edges due to effects of cardiac edges and stomach gas structures.

Figure 22:
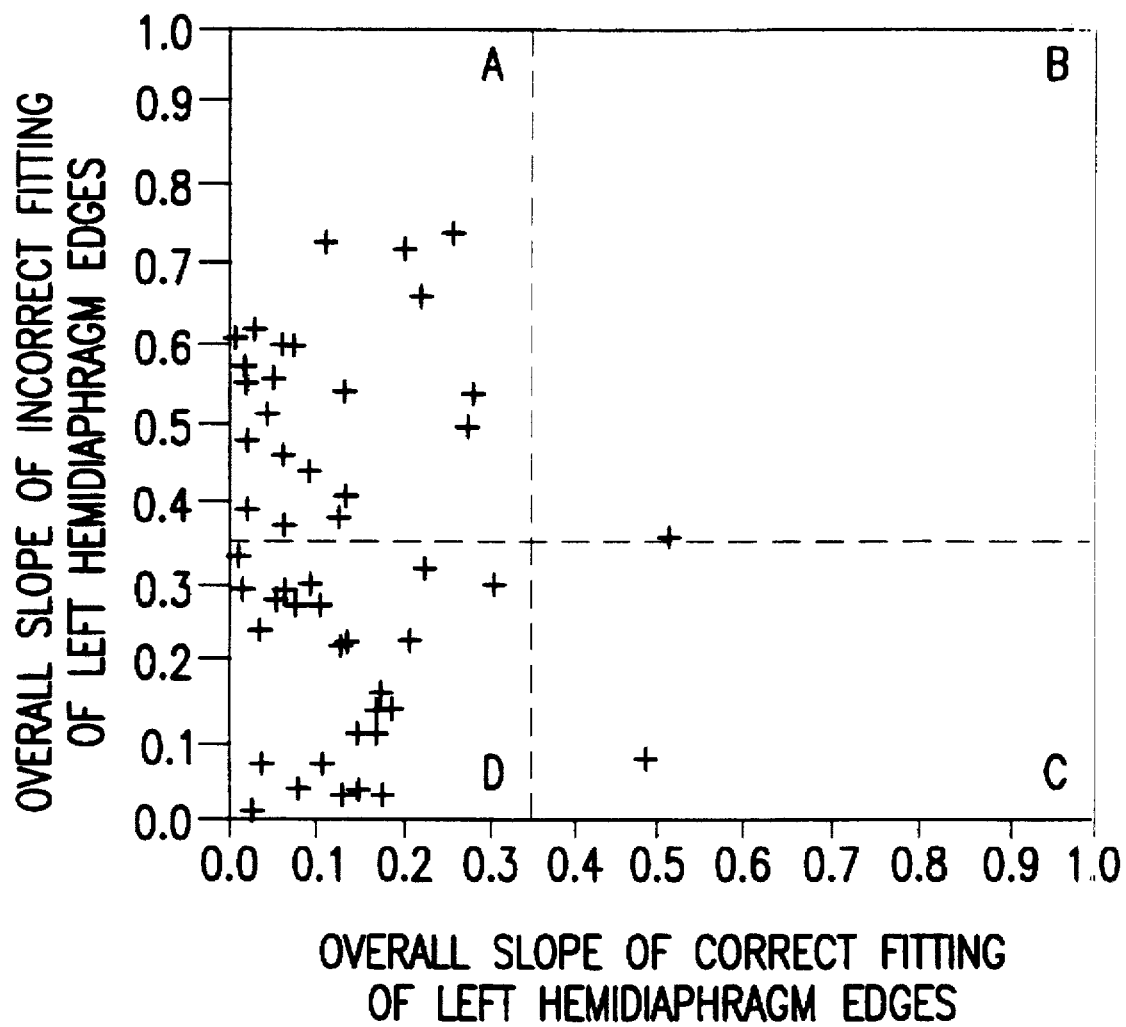
FIG. 22 is an illustration of the relationship of overall slope for correct and incorrect sets of detected "left hemidiaphragm edges". The total number of cases used is 50. Cases in areas A and C correspond to that in which the set of detected edges with a large slope is likely the cardiac edges.

In step 1920 of FIG. 19, in order to identify the set of correct left hemidiaphragm edges between the two sets of detected edges for cases of category A2, LG, NG and C, two parameters have been derived as measures. These two parameters are obtained from the polynomial fits of each set of detected edges from the corresponding starting point. The first parameter is the slope of a line which is the linear fit (first-order polynomial fitting) of each set of detected edges. It is clear in FIG. 20(a) that the detected edges along the cardiac border result in a fitted line with a larger slope. It was found that the slope of the line by fitting the edges along the left hemidiaphragm is usually less than 0.35. FIG. 22 shows the relationship between slopes of lines obtained by fitting the correctly and falsely detected left hemidiaphragm edge from 50 images. Four areas, marked by A, B, C and D clockwise, can be identified in FIG. 22 with the cutoff value of 0.35 for the slope. It should be noted that majority of these cases (total 48 of 50 cases) was located in area of A and D, i.e., only where the slope from the set of correct left diaphragm edges was less than 0.35. For cases in area A or C, one set of edges had a slope larger than 0.35 and the other had one smaller than the criterion. Thus, the set of edges which had a slope less than 0.35 was selected as the wanted left hemidiaphragm edges, because the set of edges which had a larger slope was likely to be the one of cardiac edges. However, those cases which had either smaller or larger slopes for both sets of detected edges were in the area of B or D and the criterion of slope was not enough to distinguish between the correct and false set of left hemidiaphragm edges. Therefore, a second measure was needed for cases in area of B or D in order to determine the correct set of left hemidiaphragm edges.

Figure 20A:
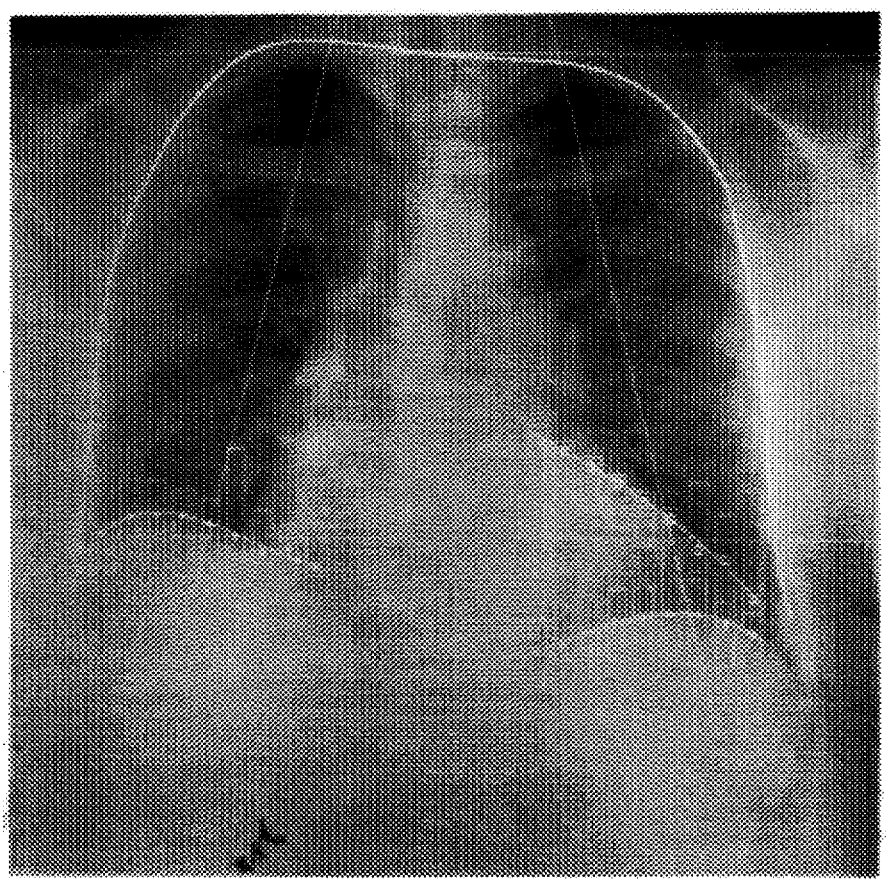
FIGS. 20(a) and 20(b) are images illustrating, respectively, (a) an example of detection of left hemidiaphragm edges for a case of category C and (b) complete delineation of lung fields for this case.
Figure 21A:
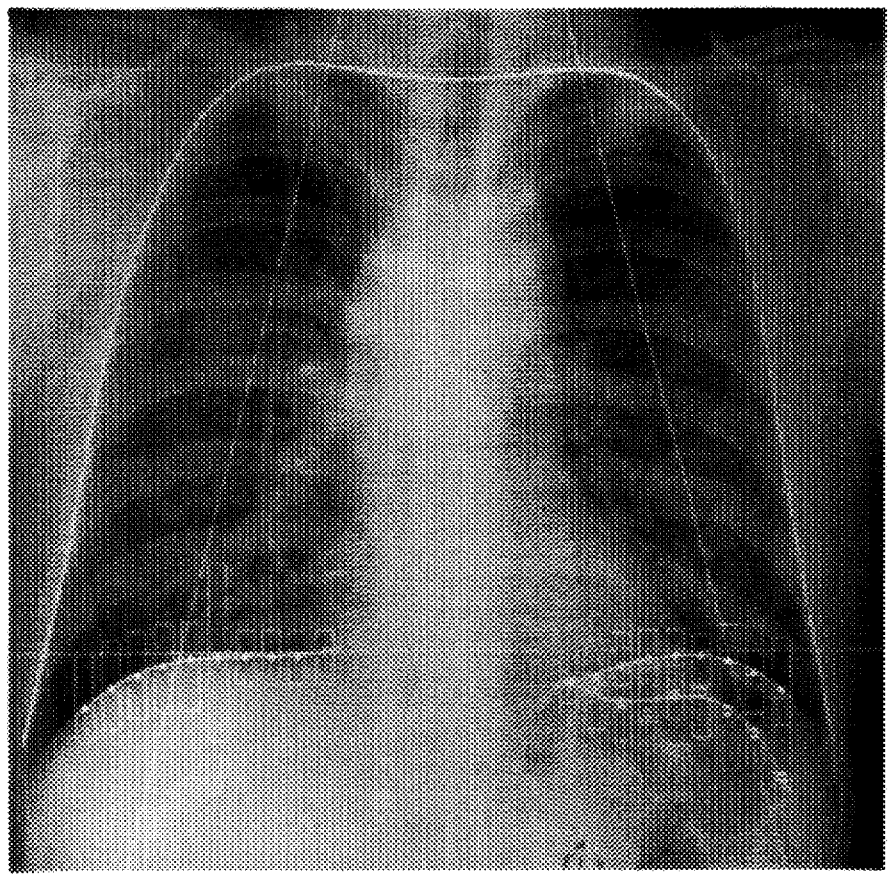
FIGS. 21(a) and 21(b) are images illustrating, respectively, (a) example of detection of left hemidiaphragm edges for cases of categories A2, LG, or NG and (b) complete delineation of lung filed for this case.
Figure 23:
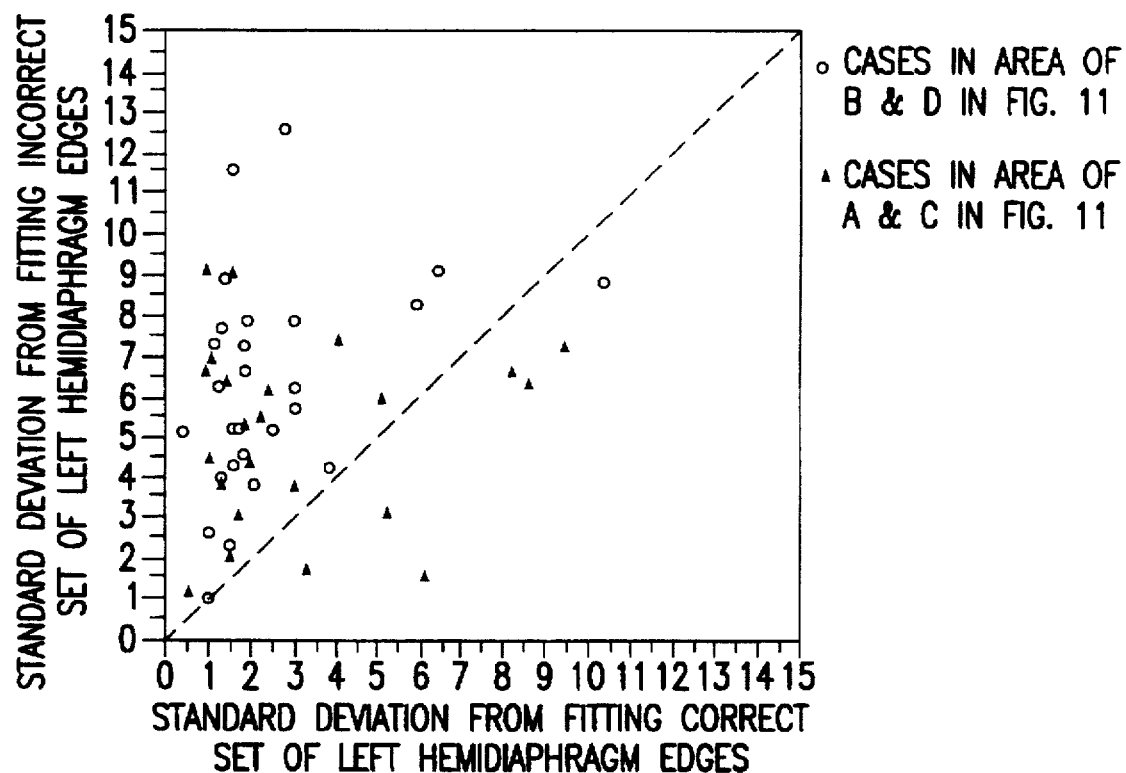
FIG. 23 is an illustration of the relationship of standard deviation from fitting correct and incorrect sets of detected "left hemidiaphragm edges". The incorrect edges due to the effects of stomach-gas patterns usually result in a large standard deviation. Therefore, for cases in areas of B and D in FIG. 22 (27 cases) the selection of the correct set of left hemidiaphragm edges is based on the smaller standard deviation. The cases used here are those in FIG. 22.

The second parameter was the standard deviation of the vertical distance from the detected edges to a third-order polynomial fitting curve resulted from these edges, as illustrated in FIG. 20(a) and FIG. 21(a). In FIG. 21(a), the slopes of both sets of detected edges were less than 0.35, but the set of edges within the structures of stomach gases would have a larger standard deviation. The patterns of stomach gas structures are irregular in shape and thus the edges spread in the gas structures could not be fitted well by a third-order polynomial function. However, the set of detected edges located along the left hemidiaphragm margin (i.e., the set of correct left hemidiaphragm edges) could be generally fitted well by a third-order polynomial curve with a relative small standard deviation. FIG. 23 is the relationship of the standard deviations between the set of correct left hemidiaphragm edges and the set of non-left-hemidiaphragm edges for the previous 50 images. This figure indicates that the set of correct left hemidiaphragm edges generally has a smaller standard deviation than that of non-left-hemidiaphragm edges. The cases which are in the area of B and D in FIG. 22 are shown by the circles in FIG. 23. It should be noted in FIG. 23 that all of these cases except one (26/27) are above the diagonal line. Thus, for cases that located in area B and D in FIG. 22, the set of edges which has the smaller standard deviation is chosen as the set of correct left hemidiaphragm edges.

Figure 24:
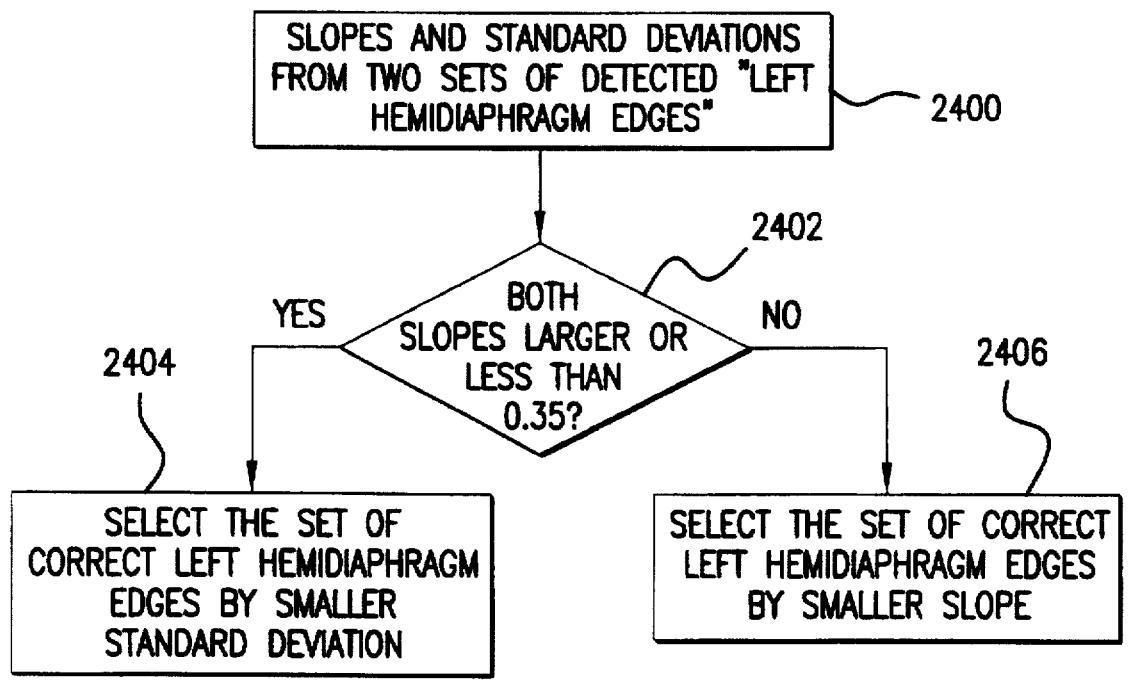
FIG. 24 is a flow chart of method steps implemented to identify the correct set of hemidiaphragm edges between two sets of detected "left hemidiaphragm edges."

FIG. 24 illustrates the method used to identify the correct set of left hemidiaphragm edges between the two sets of detected edges resulting from the two left starting points. In step 2400 of FIG. 24, the slopes and standard deviations from the sets of detected left hemidiaphragm edges are determined and in step 2402 the slopes are compared with a threshold, 0.35, derived from FIG. 22. If both slopes are either larger or less than the threshold, in step 2404 the set having the smaller standard deviation is selected as the correct edge. If both slopes are not larger or less than the threshold in step 2402, in step 2406 the set having the smaller slope is selected as the correct set of left hemidiaphragm edges.

Figure 20B:
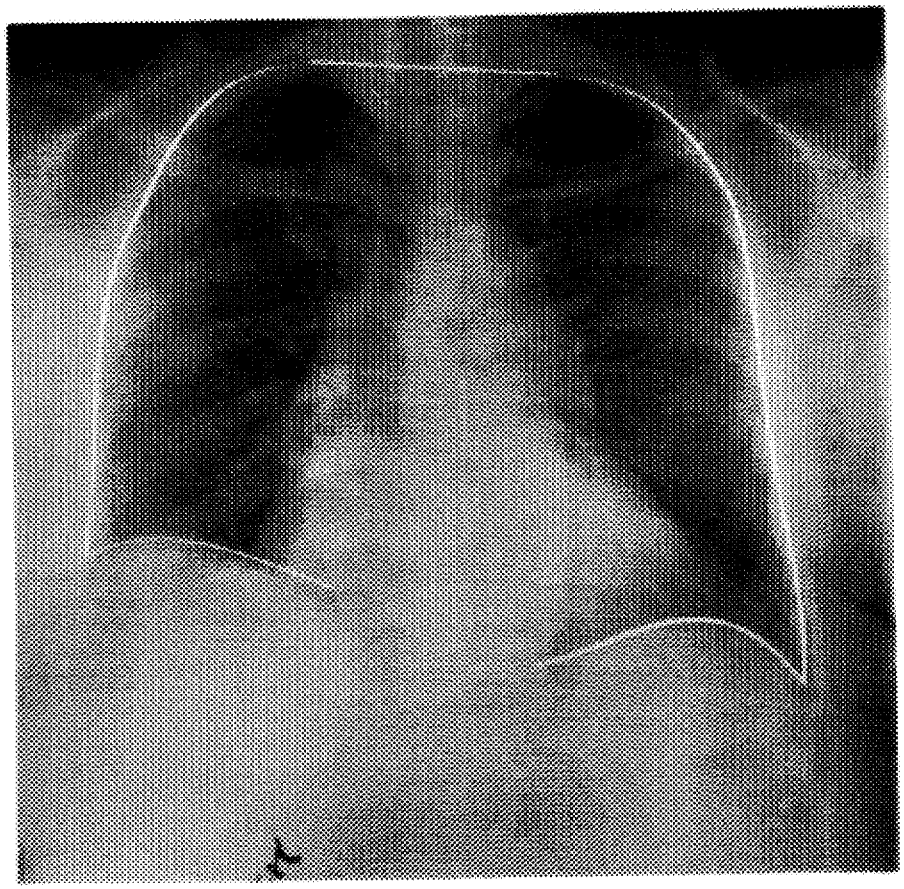
Figure 21B:
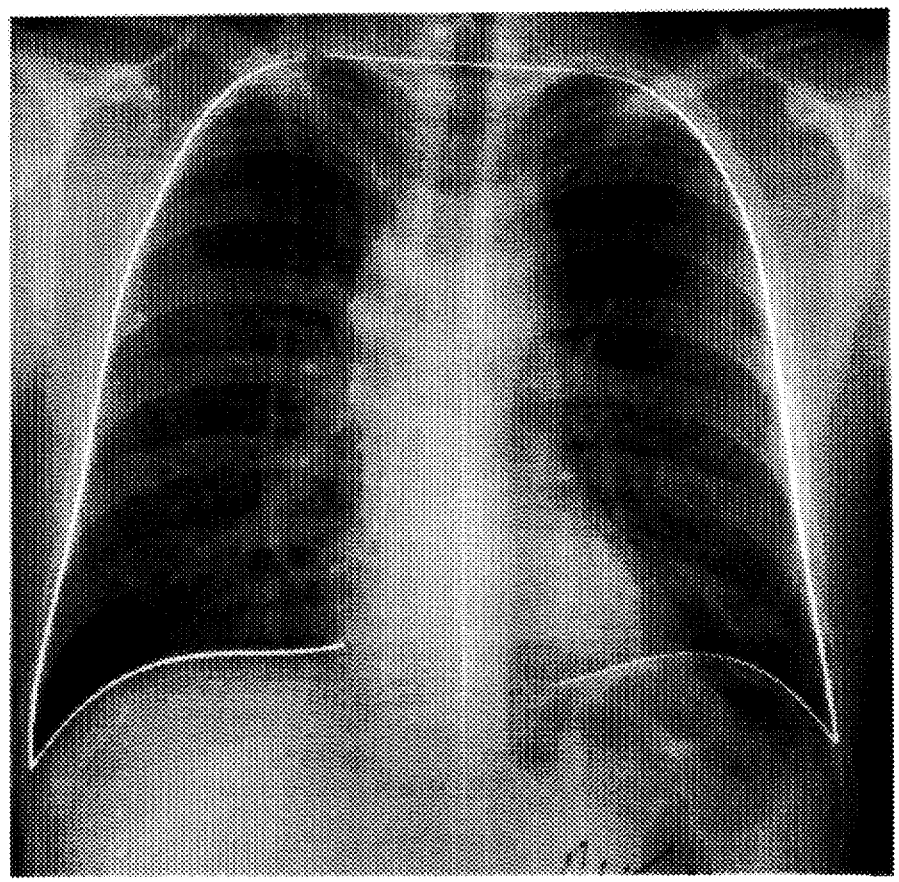

A third-order polynomial function is applied to fit the detected right and left hemidiaphragm edges into smooth curves separately. In order to obtain the complete lung boundary in a chest image, the crossing points between the smooth curves of ribcage edges and diaphragm edges of the right and left lungs are determined around the corresponding costophrenic angles of the chest image. The parts of these covers beyond the crossing points are removed. The examples of the complete delineation of the lung fields in chest images are shown in FIG. 20(b) and 21(b).

The computerized method alone described can achieve 97% and 90% accuracy in the detection of the right and left hemidiaphragm edges, respectively, for all cases in the data base studied. The main reasons that cause the difficulties in the correct detection of left hemidiaphragm edges are the improper placement of the initial ROI at the middle of the left hemidiaphragm and the effects of extremely complicated structures of large stomach gases. For instance, in FIG. 16, one case which was classified into category LG had the ratio about 0.3. It was found that about 3% of all cases in the database had this problem. It is possible to improve these cases by choosing a lower ratio criterion, for example, 0.25. By doing this, however, more cases, which are originally classified as category A1, will be referred to category A2, and thus increase the complexity and computing time for the detection of left hemidiaphragm edges for these cases.

To improve the performance of a computerized method for automated detection and characterization of interstitial infiltrates based on the Fourier transform of lung texture, developed by the inventors, the inventors have also studied the optical-density dependence of both the gradient of the film used and the system noise associated with the laser scanner.

The computerized method was developed using an IBM RISC/6000 Series Powerstation 560 (Chicago, Ill.), and the results were displayed on a CRT monitor, and/or printed using a video printer (Model VP 3500, Seikosha, Tokyo, Japan) or a laser printer (KFDR-P, Konica Corp., Tokyo, Japan). The database used consisted of two hundred posteroanterior chest radiographs, including one hundred normal and one hundred abnormal cases. All of chest radiographs were exposed at 125 kV with a 12:1 grid, using a Lanex Medium/OC screen-film system (Eastman Kodak Co., Rochester, N.Y.). Normal cases were chosen based on consensus between four experienced chest radiologists. Similarly, abnormal cases with interstitial infiltrates were selected based upon consensus together with clinical data, and follow-up chest radiographs. In 20 abnormal cases CT correlation was available, and the disease was histologically proved in 18 abnormal cases.

In a study for computerized detection and characterization of the interstitial disease performed by the inventors, chest radiographs were digitized using a laser scanner (KFDR-S, Konica Corp, Tokyo, Japan) with a 0.175 mm pixel size and ten-bit gray scale to produce 2k×2k matrix digital image. The ribcage boundary together with the top of the lung and the diaphragm, are first determined by analysis of profiles. Subsequently, a large number (300–500) of regions of interest (ROIs) with 32×32 matrix size are automatically selected in the peripheral lung regions. This ROI selection method is based on a gradient-weighted edge orientation histogram analysis (See Med. Phys., Vol. 20, pp. 975–982, 1993) and can eliminate undesirable ROIs which include sharp rib edges. The nonuniform background trend, which is caused by the gross anatomy of the lung and chest wall, is corrected using a two-dimensional surface fitting technique for each ROI. Finally, the RMS variation, R, and the first moment of the power spectrum, M are determined by the two-dimensional Fourier transform of the digital image in each ROI as defined below:

$$R = \sqrt{\int_{-\infty}^{\infty} \int_{-\infty}^{\infty} V^2(u,v)|F(u,v)|^2 du\, dv} \tag{1}$$

$$M = \frac{\int_{-\infty}^{\infty} \int_{-\infty}^{\infty} \sqrt{u^2+v^2}\, V^2(u,v)|F(u,v)|^2 du\, dv}{\int_{-\infty}^{\infty} \int_{-\infty}^{\infty} V^2(u,v)|F(u,v)|^2 du\, dv} \tag{2}$$

where F(u,v) is the Fourier transform of the trendcorrected image in a ROI and V(u,v) is the visual system response of a human observer (See Med. Phys., Vol. 15(3), pp. 311–319, 1988). The visual system response is employed as a bandpass filter to suppress unwanted components such as residual uncorrected background. In this study, texture measures were plotted against the average optical density in each ROI to examine the optical-density dependence.

For the purpose of classification, two texture measures are normalized independently by use of the average and the standard deviation of each texture measure obtained from normal lungs in our database. The normalized texture measures are used to distinguish patterns of disease as will be described later. In addition, a texture index is determined as a single overall measure by combining the two normalized texture measures. The texture index is used to classify individual ROIs as normal or abnormal based on a predetermined threshold level. Since isolated abnormal ROIs are likely to contain sharp rib edges, these isolated abnormal ROIs are eliminated from further analysis. The elimination of isolated ROIs improves the performance in distinguishing between normal and abnormal cases as shown in our previous study.

Finally, individual abnormal ROIs are classified into three different types of patterns, namely, reticular, nodular and reticulonodular patterns, based on normalized texture measures. Generally speaking, the reticular pattern has a large RMS variation and a high frequency content comparable to that of normal lung; the nodular pattern has a low-frequency content and its RMS variation is slightly larger than that of normal lung; and the reticulonodular pattern has a large RMS variation and a lower frequency content than normal lung. For illustration of the results of the computerized analysis, four different symbols are used; a "plus", a square, an open circle, and a hexagon corresponding to normal, reticular, nodular and reticulonodular patterns, respectively. Three different sizes (small, medium, and large) for each symbol were used to indicate the severity of infiltrate in proportion to the magnitude of the texture index.

Figure 25A:
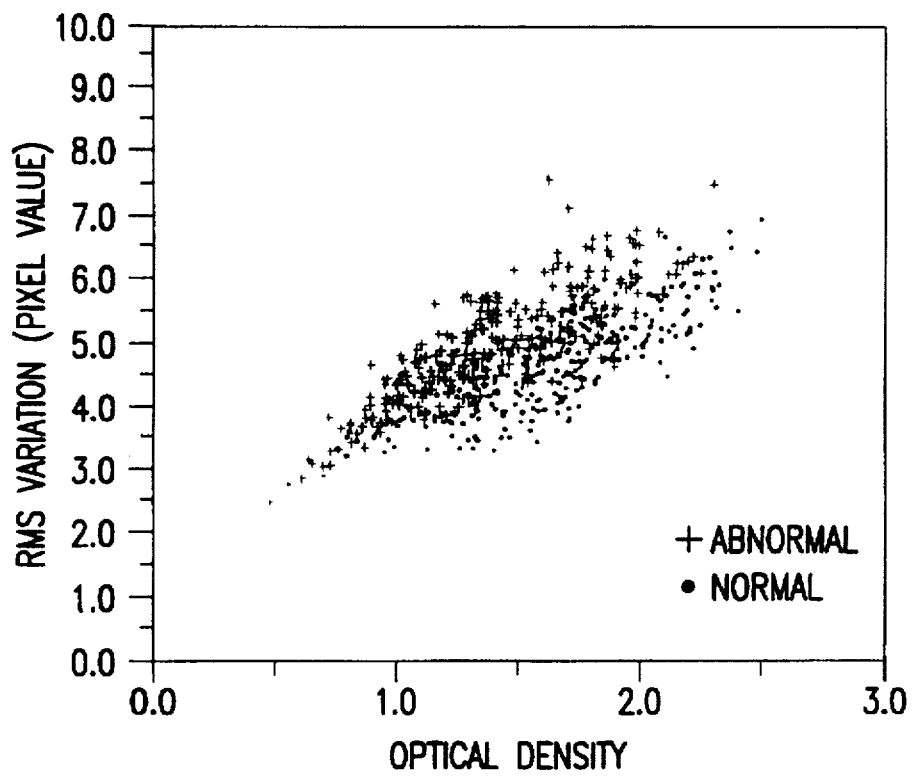

FIGS. 25(a) and 25(b) show the optical-density dependence on the RMS variation and the first moment of the power spectrum, respectively. Both texture measures were calculated in terms of pixel value. For simplicity, only about 1 percent of all data were plotted, since the total number of ROIs for 100 normal cases is approximately 40,000. The RMS variations for abnormal cases were slightly greater than those for normal ones. On the other hand, the first moment of the power spectra for abnormal cases tended to provide slightly lower values than normal ones. It is important to note in FIG. 25(a) that the calculated RMS variation strongly depends on the optical density, i.e., the greater the density, the larger the RMS variation. However, there was no obvious optical-density dependence for the first moment of the power spectrum. Therefore, the optical-density dependence on the RMS variation was alone studied.

Figure 25A:
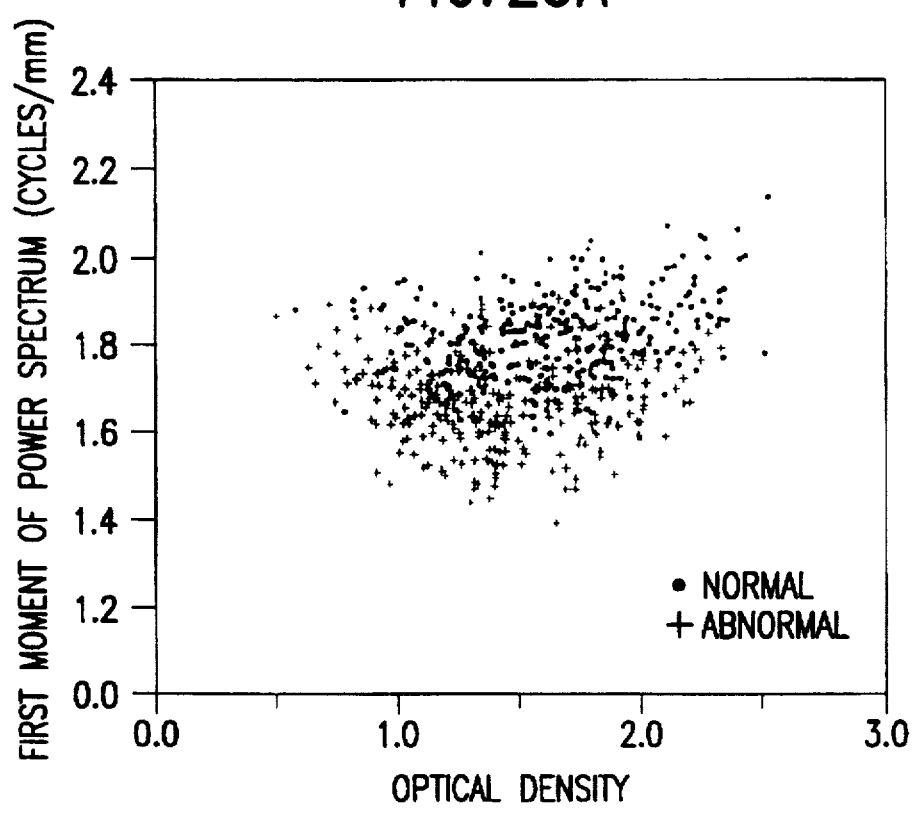
Figure 26:
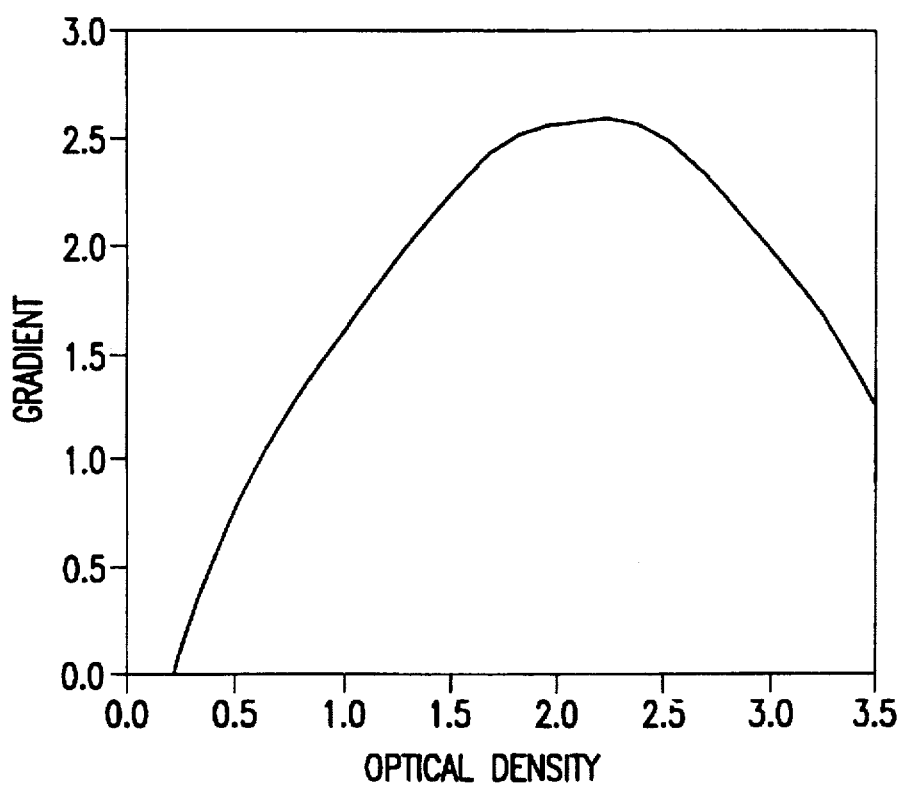
FIG. 26 is a graph illustrating the gradient curve of OC film.
Figure 27:
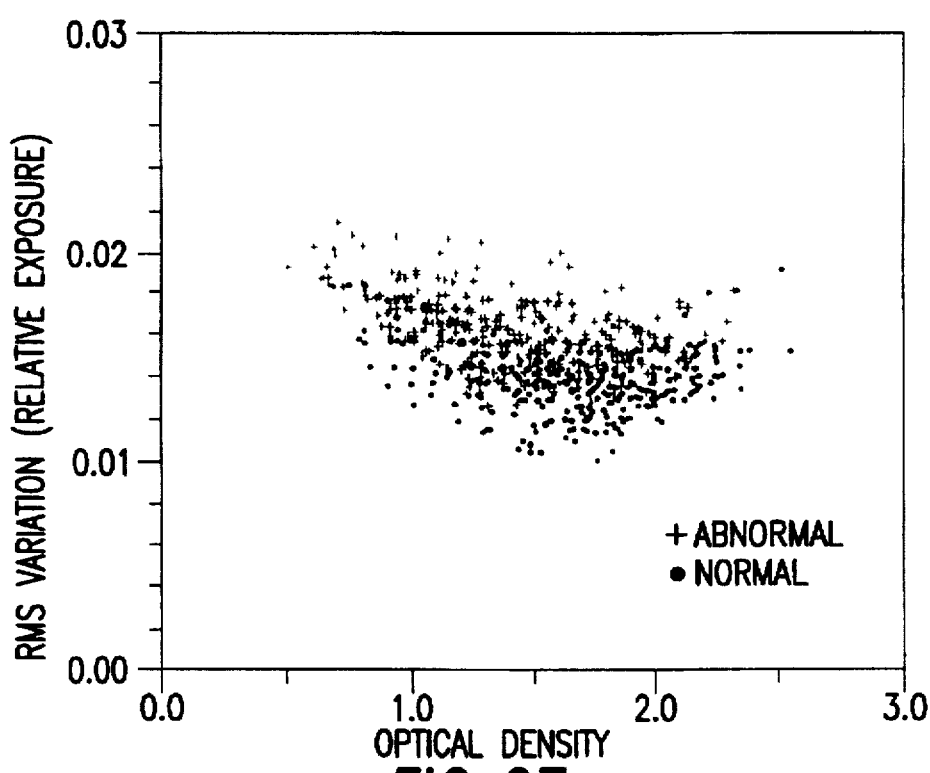
FIG. 27 is a graph illustrating the optical-density dependence on the RMS variation in terms of relative exposure, which is calculated after the gradient correction. For simplicity, only 1% of all data are shown for normal (●) and abnormal (+).
Figure 28:
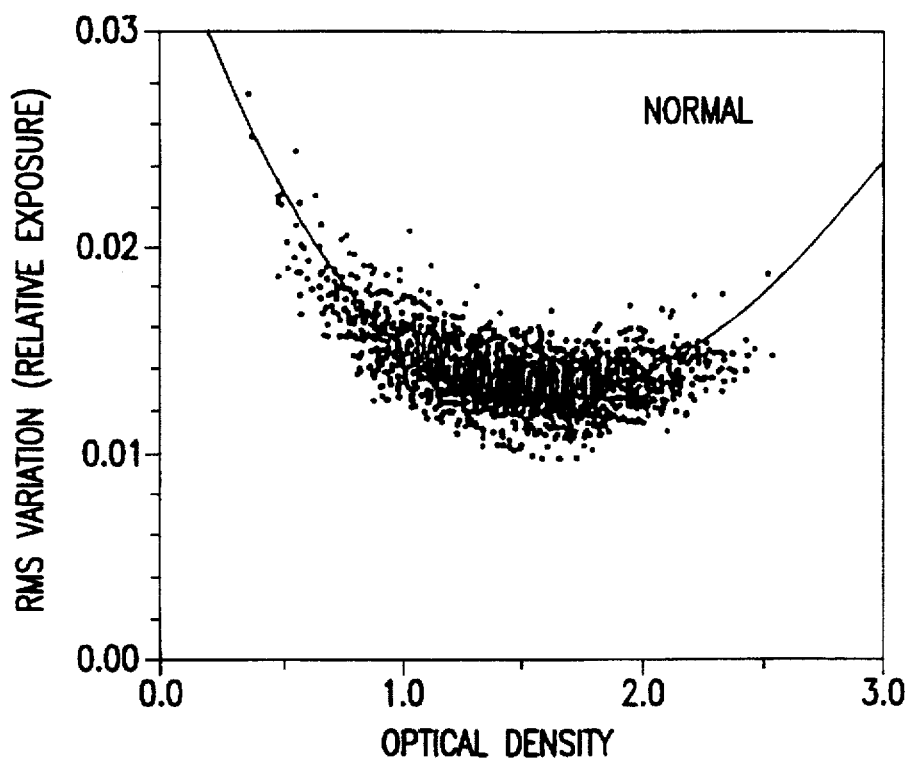
FIG. 28 is a graph illustrating optical-density dependence on the RMS variation of normal cases in terms of relative exposure, which was calculated after the gradient correction. Note that 10% of all ROIs for normal cases were used to estimate the average distribution of the RMS variation (solid curve).
Figure 29:
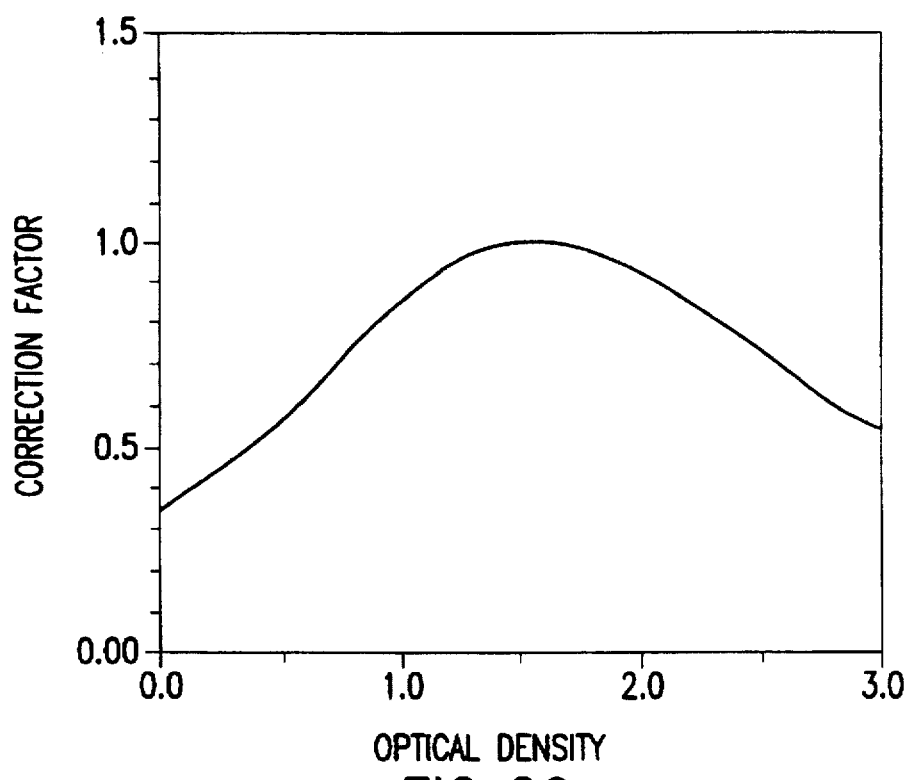
FIG. 29 is a graph illustrating a correction curve for "system noise", which was determined by an inverse of the average curve of the RMS variation as shown in FIG. 28.
Figure 30:
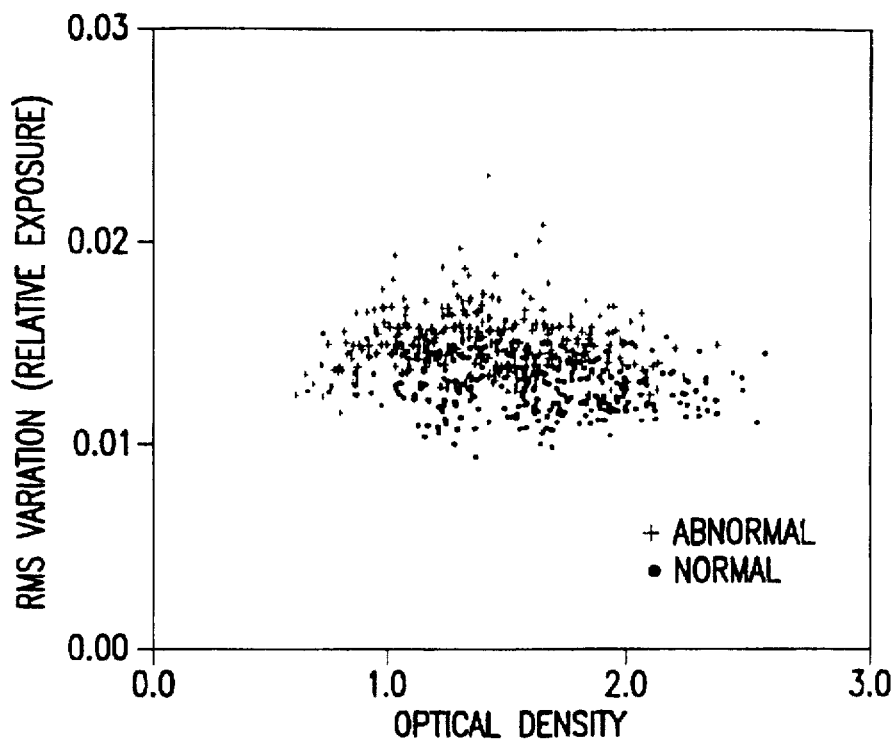
FIG. 30 is a graph illustrating optical-density dependence on the RMS variation in terms of relative exposure, which was calculated after the gradient and the system noise corrections. For simplicity, only 1% of all data are shown for normal (●) and abnormal cases (+).

FIG. 26 shows a gradient curve of the OC film used in this study. This gradient curve was determined from an "average" characteristic curve which was estimated from four independent measurements. The gradient curve indicates the magnitude of film contrast at various average optical densities. Due to this variation of film contrast, the magnitude of lung texture appearing on film will be suppressed by the low gradient at low densities and enhanced at high densities up to about 2.5. To correct for this effect, all pixel values in each ROI need to be converted to relative exposures ($\Delta E/E$) before calculation of the RMS variation. The RMS variation in terms of relative exposure was calculated using the following approximate equation:

$$RMS_{\Delta E/E} = \frac{RMS_p}{G \cdot C \cdot (\log_{10} e)} \quad (3)$$

where $RMS_p$, G, C correspond to the RMS variation in terms of pixel value, the gradient of the film used, and slope of the characteristic curve of the laser scanner, respectively. Note that the $\log_{10} e$ is a conversion factor from natural logarithm to logarithm to base 10. This approximate equation can be used only when $\Delta E/E$ is small, which is usually the case for interstitial infiltrates. In fact, it was found that the RMS variation calculated by use of Eq. 3 agreed to within 2% of the RMS variation which is determined through the pixel value—relative exposure conversion at all pixels in ROIs. FIG. 27 shows the optical-density dependence of the RMS variation in terms of relative exposure for normal and abnormal cases after the gradient correction. If the optical-density dependence of the RMS variation in terms of pixel value (FIG. 25) is caused only by the effect of film gradient, the distribution of the RMS variation in terms of relative exposure after the correction should not depend on the optical density. However, results in FIG. 27 indicate that the RMS variation at relatively low and high optical density regions was greater than that at intermediate optical densities for both normal and abnormal cases. It should be noted that the texture measure of lungs in terms of relative exposure should not depend on the optical density. Therefore it is assumed that the observed optical-density dependence of the RMS variation in FIG. 27 was caused by radiographic mottle and noise components associated with the digitization using the laser scanner. These noise components are referred to as "system noise" hereafter. Based on this assumption, the inventors attempted to correct for the system noise after correcting for the effect of the film gradient. First, the average distribution (solid curve) of the RMS variation for normal cases was estimated by use of 10 percent of all data (FIG. 28). Although another 10% of subsampled data were examined, there was no large difference in the average distribution of the RMS variation. It is apparent that the average distribution, as shown by a solid line in FIG. 28, was much greater at relatively low and high optical densities than at intermediate optical densities. FIG. 29 shows the correction curve for system noise which was determined by an inverse of the average curve of the RMS variations. The RMS variation was corrected for using a correction curve, which is multiplied by the measured RMS variation in terms of relative exposure. FIG. 30 indicates the relationship between the optical-density and the corrected RMS variation for normal and abnormal cases after the effect of the system noise is corrected for. Although about 1% of all data are shown in the graph, no obvious optical-density dependencies shown for both normal and abnormal cases.

The correction technique was applied to a normal case which had a number of false positive ROIs at high optical densities in order to examine the effect on the computerized analysis of lung textures for such a normal case. Although the result without correction contained a number of false positive ROIs, the majority of the false positive ROIs were removed by the gradient correction. Moreover, most of the remaining false positive ROIs in the upper and lower lung areas are removed by the system noise correction. The percentage of the number of abnormal ROIs included in the left lung, without any corrections and with the two correction techniques, was decreased from 62% to 10% and 2%, respectively. The correction technique was also applied to an abnormal case which had a number of false negative ROIs at low optical densities when no correction was performed. Although mild diffuse interstitial infiltrates were present, only a few abnormal ROIs were present in the lower peripheral lung area, which had an average optical density of 0.75, in the result without any corrections. However, the majority of false negative ROIs occurring at low optical density areas were turned into true positive ROIs by the gradient correction. Moreover, the remaining false negative ROIs at slightly higher optical densities than 1.0 were changed to true positives by the system noise correction. The reason for this improved result at intermediate optical densities will be discussed later. The percentage of the number of abnormal ROIs in the right lung, without any corrections and with the two correction techniques, was 29%, 42% and 53%, respectively. Therefore, the results indicate that the correspondence between the results of the computerized analysis and the radiologists' interpretation was improved by use of the gradient and the system noise corrections.

Figure 31:
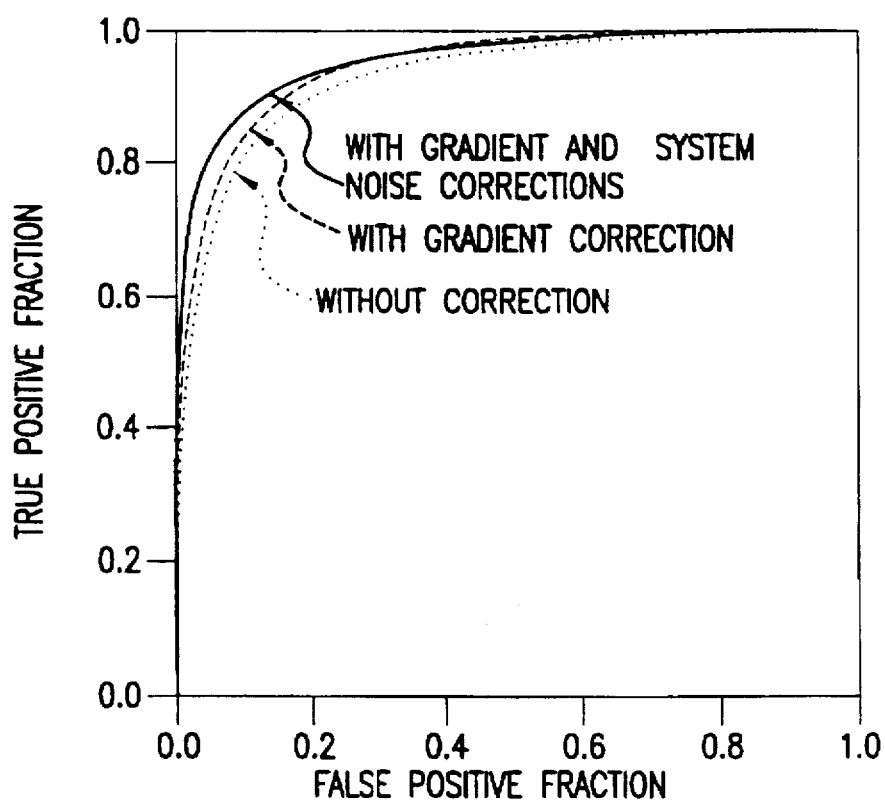
FIG. 31 is a graph illustrating a comparison of ROC curves which are obtained without any corrections (dotted curve), with the gradient correction (dashed curve), and the gradient and the system noise corrections (solid curve).

The average number of abnormal ROIs per normal case without any corrections was reduced about 33% by use of the gradient and the system noise corrections, i.e., 46 abnormal ROIs for no correction and 31 abnormal ROIs for the gradient and the system noise corrections. On the other hand, the average numbers of abnormal ROIs per abnormal case without any corrections, and with the gradient and the system noise corrections were 197 and 188, respectively. These results appear to indicate the effectiveness of these correction techniques in decreasing the number of false positive ROIs without a significant change in the number of "true positive" abnormal ROIs. Finally, the overall performance of the computerized scheme was examined by use of receiver operating characteristic (ROC) curves. To produce the ROC curves, the inventors varied one of the threshold criteria, i.e., the relative number of abnormal ROIs that is used for the overall classification of normal and abnormal lungs (See Med. Phys., Vol. 20, pp. 975–982, 1993; supra). FIG. 31 shows ROC curves obtained without any corrections, with the gradient correction, and with the gradient and the system noise corrections. The specificity without corrections, with the gradient correction, and with the gradient and the system noise corrections at the sensitivity of 90% was 81%, 86% and 89%, respectively. Thus, the result in FIG. 31 indicates clearly the effectiveness of the gradient and the system noise corrections in computerized analysis of interstitial infiltrates based on the Fourier analysis technique.

As evident from the above discussion, to improve the performance of our computerized scheme for the detection and characterization of interstitial diseases, the inventors investigated the optical-density dependence on RMS variation. Although the gradient correction was attempted in the early phase of our work (Med. Phys., Vol. 15(3), pp. 311–319, 1988, supra), there was no obvious beneficial effect on performance at that time. This was probably because that H&D curve employed for the correction was obtained from an average of two different types of films used whereas only one specific film (OC film) was used in this study. Strictly speaking, the conversion from pixel values to relative exposures should be based on the characteristic curve of the laser scanner and H&D curve obtained using the same processing conditions as those used for clinical radiographs. It is impractical at present, however, to use the H&D curve determined for each chest radiograph. It is believed, however, that the correction of film gradient effect based on individual radiographs would improve further the overall performance of the computerized scheme.

The performance of the computerized scheme was improved by 5% in specificity by use of the gradient correction. Advantages of the gradient correction include decreased numbers of false positive ROIs at high optical densities and of false negative ROIs at low optical densities. On the other hand, there are some disadvantages, such as decreasing the number of true positive ROIs at high optical densities and the number of true negative ROIs at low optical densities. It was found that all of the improved normal cases (12 cases) were due to a reduction in the number of abnormal ROIs at high optical densities (above OD=2.0). On the other hand, seven true negative cases without any corrections were changed to false positive cases because of an increase in the number of abnormal ROIs at low optical densities.

The optical-density dependence on the RMS variation after the gradient correction was attributable to system noise. The system noise tended to provide greater RMS variation at both low and high optical densities compared to intermediate optical densities (OD=1.2–1.8) as shown in FIG. 29. The system noise can be considered as a combination of several noise sources which are associated with the laser scanner and the screen-film system. They include (1) increased electronic noise of the laser scanner due to low signal-to-noise ratio at high optical densities, (2) increased film granularity at high optical densities, (3) increased quantum mottle at low optical densities, (4) increased quantization noise of the laser scanner at low optical densities, and (5) an interference artifact (moire pattern) at very low optical densities. To confirm the existence of the system noise, noise film samples were prepared at different optical densities using the same screen-film system (Lanex medium/ OC system) which was exposed uniformly to different levels of exposure at 120 kVp. Film samples were digitized and the RMS variation of these films without lung texture (no chest image) was then calculated. The RMS variation of the film samples in terms of the relative exposure indicated greater RMS variation at low and high optical densities, similar to the trend shown in FIG. 28. However, the RMS variations of the noise film samples were slightly less than those calculated by clinical chest radiographs (including lung texture and the system noise). The results of the noise film samples appear to be consistent with the results obtained from chest radiographs.

The system noise correction further improved the specificity by 3% compared to the result which was obtained with the gradient correction. One of the reasons for improved performance is a reduction in the number of false positive ROIs at low optical densities. Another reason may be the increased number of abnormal ROIs at intermediate optical densities (1.1–1.9) compared to the result obtained with the gradient correction alone. In one example of an abnormal case which had intermediate optical densities (1.2 to 1.7), this abnormal case was interpreted as showing relatively interstitial infiltrates, except for the costophrenic angle areas. The ratio of the number of abnormal ROIs to the total number of ROIs in the left lung without any corrections, with the gradient correction, and with the gradient and the system noise corrections were 24%, 19%, and 41%, respectively. The number of false positive ROIs in the costophrenic angle area (OD=2.0) was decreased by use of the gradient correction. Therefore, it appears that the correspondence between the computer output and the radiologists' interpretation was much improved by use of the system noise correction together with the film gradient correction.

On the other hand, four true negative cases with the gradient correction were changed to false positives due to increased abnormal ROIs at intermediate optical densities. The reason for the increased abnormal ROIs at intermediate optical densities with the system noise correction is related to the change in the average value of the RMS variation obtained from all normal cases in the database studied. Since the system noise correction decreases the RMS variation more at low and high optical densities than at intermediate optical densities, the average RMS variation obtained from one hundred normal cases with the gradient and the system noise corrections was decreased. Thus, the distinction between the RMS variation of individual ROIs for abnormal cases and the average RMS variation of the normal ones was improved at less-corrected densities, i.e., middle optical densities.

Although correction for the system noise for the first moment of the power spectrum was attempted using the same method used for the RMS variation, the performance of the computerized scheme was not improved. This is because that the first moment of the power spectrum is not much affected by the system noise compared to the RMS variation.

Six normal and seven abnormal cases consistently remained as false positives and false negatives, respectively, even if the gradient correction, and the gradient and the system noise corrections were employed. Those normal cases, which were classified as false positive, tended to have higher contrast in the normal structure such as vessels. On the other hand, abnormal cases, which were classified as false negative, tended to have lower contrast compared to the other cases. Actually, five out of the seven false negative cases included large breast shadows overlying the lungs. Although the exact causes of the false positives and false negatives have not been established, one of the possible reasons for false negatives seems to be related to the large amount of scattered radiation from the soft tissues. Therefore, the effect of scatter on the computerized analysis of lung texture remains to be investigated further.

Summarizing, the optical-density dependence of both the RMS variation and the fist moment of the power spectrum for lung texture analysis in digitized chest radiographs was investigated. The RMS variation in terms of pixel value indicated strong dependence on the average optical density in the ROI. On the other hand, there was no obvious optical-density dependence on the first moment of the power spectrum. Correction for the effects of the film gradient and the system noise is useful in improving the performance of the computerized scheme for detection of interstitial infiltrates, by improving the specificity from 81% to 89% without any loss of sensitivity (90%).

As above noted, the inventors have been developing computerized schemes for detection and characterization of interstitial disease in digital chest radiographs by using texture analysis based on the Fourier transform, as well as geometric-pattern feature analysis based on filtering techniques. In texture analysis, the rms variation and the first moment of the power spectrum of lung patterns are determined as texture measures. In geometric-pattern feature analysis, the total area of nodular opacities and the total length of linear opacities are determined as geometric-pattern measures. The texture measures can represent overall features of lung texture, and they have been very useful in distinguishing between normal and abnormal lungs with interstitial disease, as reported previously (See Med. Phys. 16, 38–44, (1989)). On the other hand, the geometric-pattern measures can represent features related to the shape and size of individual opacities. Therefore, the combined analysis of texture and geometric-pattern measures has the potential to improve the distinction between normal and abnormal lungs with interstitial disease.

The inventors previously reported on the classification performance based on texture analysis with a rule-based method (See Med. Phys. 16, 38–44, (1989), supra), which employs the number of abnormal regions of interest (ROIs) with large texture measures above a threshold value. Artificial neural networks (ANNs) have been used in many fields as a powerful classification tool in recent years. (See SN 08/053,345; Radiology, 177, 857–860 (1990); Invest. Radiol., 25, 1012–1016 (1990); Med. Phys. 19, 555–560, 1992; and Radiology 187, 81–87 (1993)). As described hereinafter, the present invention includes an automated classification scheme with the rule-based plus ANN method, using the combined analysis of texture measures and geometric-pattern measures for distinction between normal lungs and abnormal lungs with interstitial disease. In addition, the inventors compared the classification performance among the rule-based method alone, an ANN method alone, and a rule-based plus ANN method, as described hereinafter.

Once again, in order to establish a classification method, the inventors created a database consisting of 200 conventional posteroanterior (PA) chest radiographs which were exposes with OC films and Lanex medium screens (Eastman Kodak Co., Rochester, N.Y.). The subject database included one hundred normal lungs and one hundred abnormal lungs with interstitial disease. Normal cases were selected by four experienced chest radiologists based on unequivocally normal radiographs and clinical data showing no clinically suspected cardiopulmonary disease. Abnormal cases with interstitial disease, which ranged from subtle to severe, were also selected based on radiographic findings, clinical data, and follow-up chest radiographs. All chest radiographs included in the database were digitized with a laser scanner with a 0.175 mm pixel size and 1024 gray levels.

Figure 32A:
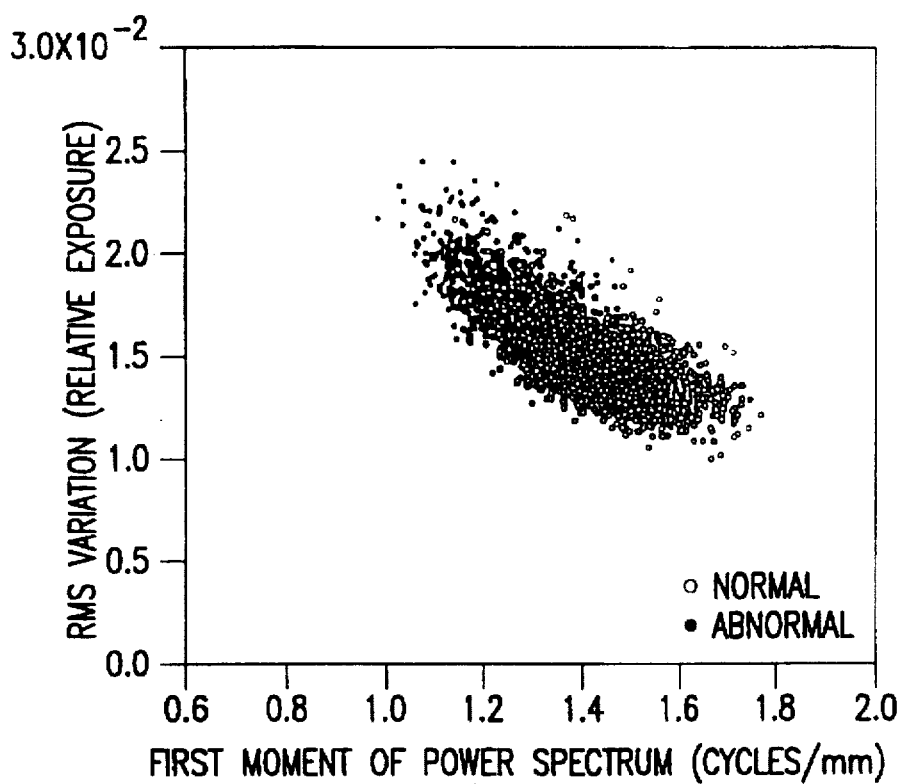
FIGS. 32(a) and 32(b) are graphs showing, respectively, distributions of (a) texture measures and (b) geometric-pattern measures obtained from 100 normal and 100 abnormal lungs with interstitial disease included in our database. For simplicity, only about 5 and 50 percent of all data are plotted for the texture measures and geometric-pattern measures, respectively.

The overall scheme of the texture analysis is described below. Approximately 200 to 500 ROIs with a 32×32 matrix size are selected automatically in peripheral lung regions for each chest image (See Med. Phys. 20, 975–982 (1993). The non-uniform background trend in each ROI is corrected for fluctuating patterns of the underlying lung texture. The power spectrum of the lung texture is then obtained from the Fourier transform and is filtered by the visual system response of the human observer. Finally, the rms variation in terms of relative exposure, R, and the first moment of the power spectrum, M, are determined as texture measures representing the magnitude and coarseness (or fineness) of the lung texture, respectively. R and M, as above described, are defined as follows:

$$M = \frac{\int_{-\infty}^{\infty}\int_{-\infty}^{\infty} \sqrt{u^2+v^2}\, V^2(u,v)|F(u,v)|^2 du\, dv}{\int_{-\infty}^{\infty}\int_{-\infty}^{\infty} V^2(u,v)|F(u,v)|^2 du\, dv},$$

$$R = \frac{1}{G \cdot C \cdot (\log_{10} e)} \sqrt{\int_{-\infty}^{\infty}\int_{-\infty}^{\infty} V^2(u,v)|F(u,v)|^2 du\, dv},$$

where G, C, V(u,v), and F(u,v), correspond to the gradient of the film used, the slope of the characteristic curve of the laser scanner, the visual system response of the human observer, and the Fourier transform of lung textures, respectively. The factor $\log_{10} e$ is a conversion factor from the natural logarithm to the base 10 logarithm. The distribution of the two texture measures obtained for the normal and abnormal lungs included in our database is shown in FIG. 32(a). For simplicity, only about 5 percent of all data were plotted, because the total number of ROIs for the 100 normal and 100 abnormal cases is approximately 75,000.

Figure 32B:
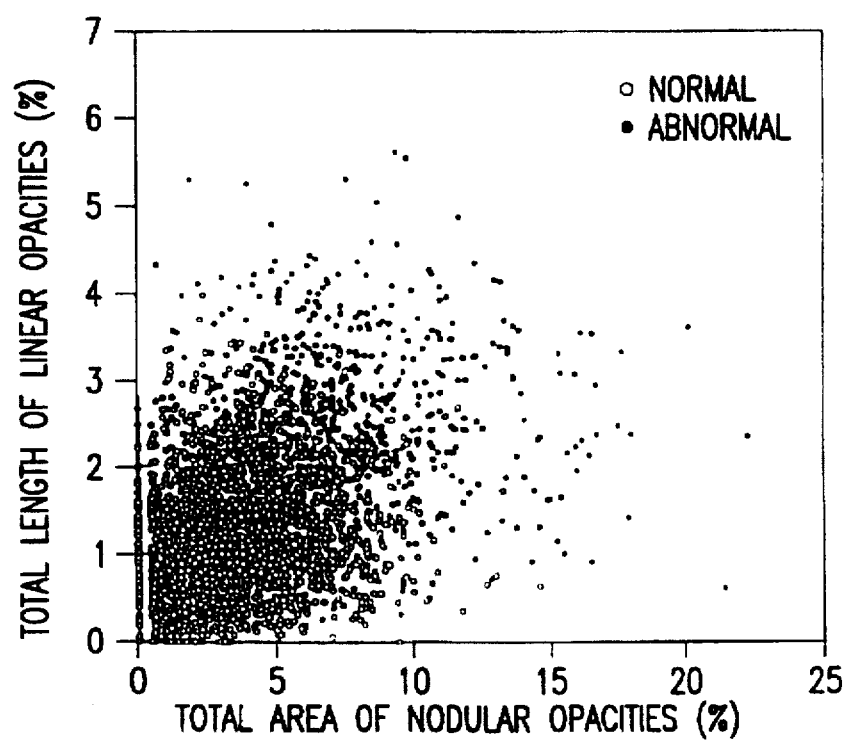

In the geometric-pattern feature analysis, approximately forty ROIs with 128×128 matrix size are automatically selected in peripheral lung regions. It is known that interstitial infiltrates in chest images are composed basically of nodular and linear opacities. Therefore, nodular and linear opacities of interstitial infiltrates are identified independently from two processed images, one of which is obtained by use of a multilevel threshholding technique and the other, by use of a line enhancement filter. Finally, the total area of nodular opacities, A, and the total length of linear opacities, L, in each ROI are determined as geometric-pattern measures. The distribution of the two geometric-pattern measures for normal and abnormal lungs is shown in FIG. 32(b). For simplicity, only about 50 percent of all data were plotted.

In general, normalization of measures based on the average and the standard deviation is useful for quantitative evaluation of different types of measures. Therefore, for subsequent computerized classification, the texture and geometric-pattern measures obtained from a given chest image are normalized by means of the average and the standard deviation of these measures as determined for normal lungs that are included in the database, as follows:

$R_N = (R-\bar{R})/\sigma_R$, $M_N = (M-\bar{M})/\sigma_M$, $A_N = (A-\bar{A})/\sigma_A$, $L_N = (L-\bar{L})/\sigma_L$.

where $R_N$, $M_N$, $A_N$, and $L_N$ are the normalized rms variation, the normalized first moment of the power spectrum, the normalized total area of nodular opacities, and the normalized total length of linear opacities, respectively; $\bar{R}$, $\bar{M}$, $\bar{A}$ and $\bar{L}$ are the average values of these measures for normal lungs; and $\sigma_R$, $\sigma_M$, $\sigma_A$ and $\sigma_L$ are the standard deviations of these measures for normal lungs.

Figure 33A:
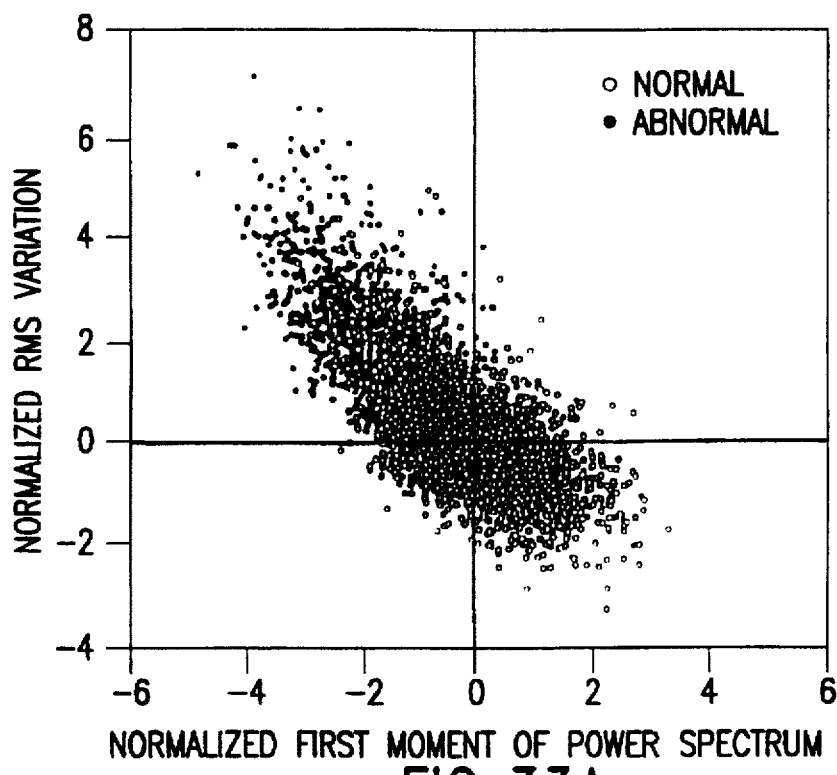
FIGS. 33(a) and 33(b) are graphs showing, respectively, distributions of (a) normalized texture measures and (b) normalized geometric-pattern measures. For simplicity, only about 5 and 50 percent of all data are plotted for the texture measures and geometric-pattern measures, respectively.

The distributions of the normalized texture measures for normal and abnormal lungs included in the database are shown in FIG. 33(a). The distribution for normal lungs is centered around the origin, whereas the distribution for abnormal lungs is shifted to the upper left. However, there is a considerable overlap between the two distributions because lung textures in abnormal lungs can comprise some normal areas, unless interstitial infiltrates are spread over the entire lung.

Figure 33B:
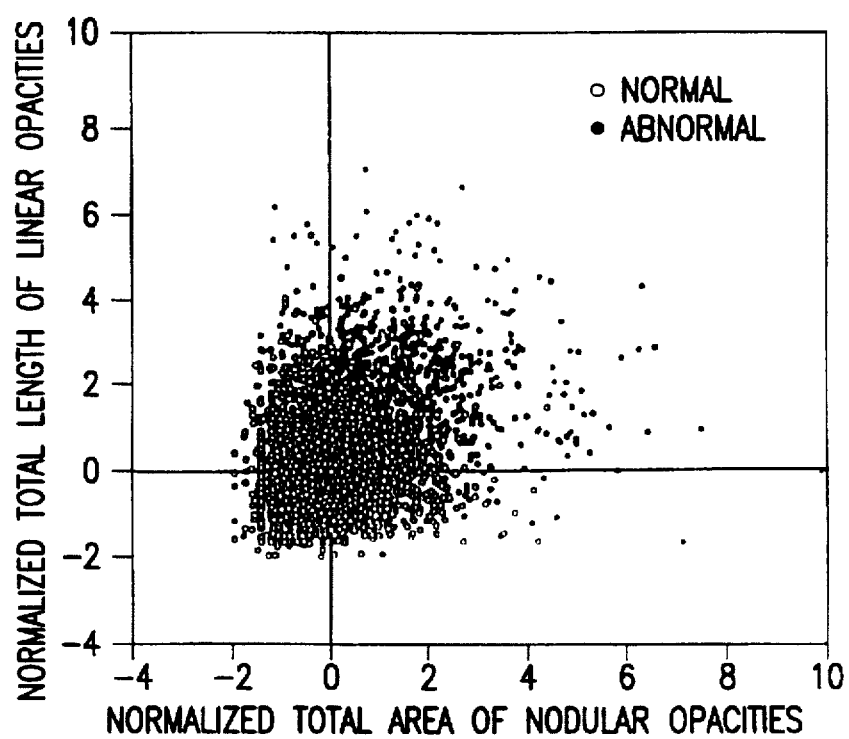

The distributions of the normalized geometric-pattern measures for normal and abnormal lungs are shown in FIG. 33(b). The distribution for normal lungs is also centered around the origin, whereas the distribution for abnormal lungs is shifted to the upper right. There is again a considerable overlap between the two distributions. These overlaps indicate that a classification scheme based only on these distributions would not be very effective for distinction between normal and abnormal lungs with interstitial disease.

As shown in FIGS. 33(a) and 33(b), the normalized texture and geometric-pattern measures for abnormal lungs are distributed widely. However, typical abnormal patterns of interstitial infiltrates such as nodular, reticular, and reticulonodular patterns can be characterized by distinct features. In the texture analysis, a nodular pattern has a low first moment of the power spectrum, a reticular pattern has a large rms variation, and a reticulonodular pattern has a large rms variation and a low first moment of the power spectrum. In the geometric-pattern feature analysis, a nodular pattern has a large total area of nodular opacities, a reticular pattern has a large total length of linear opacities, and a reticulonodular pattern has a large total area of nodular opacities and a large total length of linear opacities. Therefore, in order to facilitate the computerized classification, a single texture index, T, and a single geometric-pattern index, G, are determined from the two normalized texture measures and the two normalized geometric-pattern measures, respectively.

The single texture index (FIG. 34) is defined as follows:

$T = R_N$     for $M_N > 0$ and $R_N > 0$, $T = \sqrt{M_N^2 + R_N^2}$     for $M_N < 0$ and $R_N > 0$, $T = -M_N$     for $M_N < 0$ and $R_N < 0$, $T = -\{\text{Min}(M_N, |R_N|)\}$     for $M_N \geq 0$ and $R_N \leq 0$.

The single geometric-pattern index is also defined as follows:

$G = L_N$     for $A_N < 0$ and $L_N > 0$, $G = \sqrt{A_N^2 + L_N^2}$     for $A_N > 0$ and $L_N > 0$, $G = A_N$     for $A_N > 0$ and $L_N < 0$, $G = \text{Max}(A_N, L_N)$     for $A_N \leq 0$ and $L_N \leq 0$.

Figure 34:
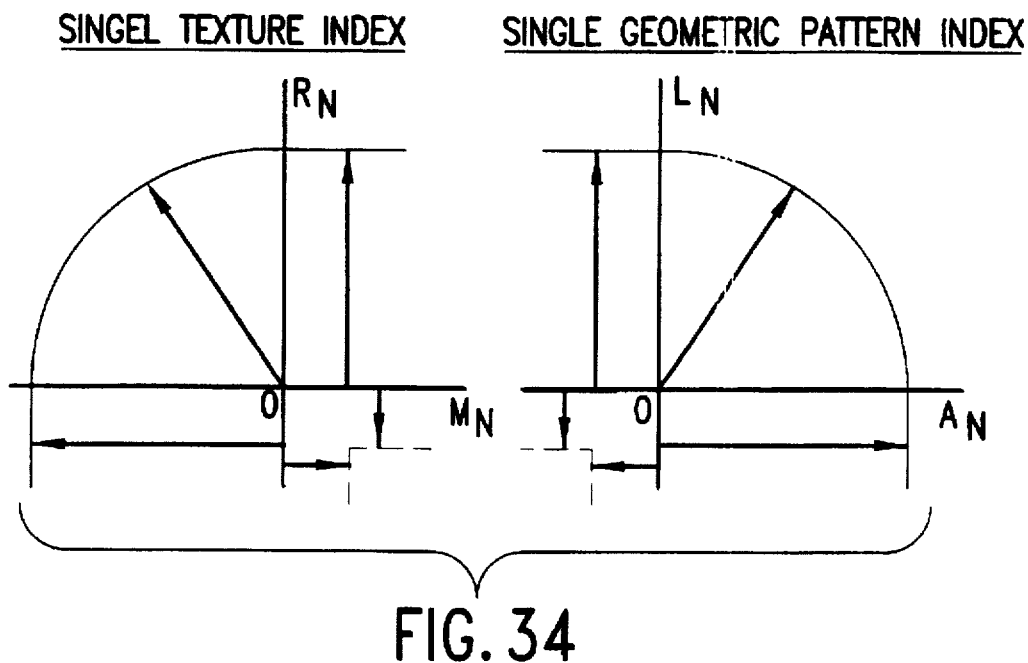
FIG. 34 is an illustration of the definition of the texture index (left) and the geometric-pattern index (right). The texture and geometric-pattern indices (arrows) basically correspond to a distance from the average measures for normal lungs.

These single texture and geometric pattern indices basically correspond to a distance from the average measures for normal lungs, as shown in FIG. 34. Classification schemes with a rule-based method alone, an ANN method alone, and a rule-based plus ANN method in which single texture indices and/or single geometric-pattern indices were applied.

For the rule-based method, the number of suspicious abnormal ROIs that contain a single index greater than a threshold index is determined. Then, if the ratio of the number of abnormal ROIs to the total number of ROIs selected in a chest image is greater than a threshold ratio, the chest image is classified as abnormal with interstitial disease. In the rule-based methods in which either texture measures or geometric-pattern measures are used, the texture index or the geometric-pattern index is used as a single index. In the rule-based method in which the combined analysis of texture and geometric-pattern measures is used, an abnormal lung is classified by logical OR operation, i.e., if a chest image can be classified as abnormal either by texture measures or geometric-pattern measures, the chest image is finally classified as abnormal.

Figure 35:
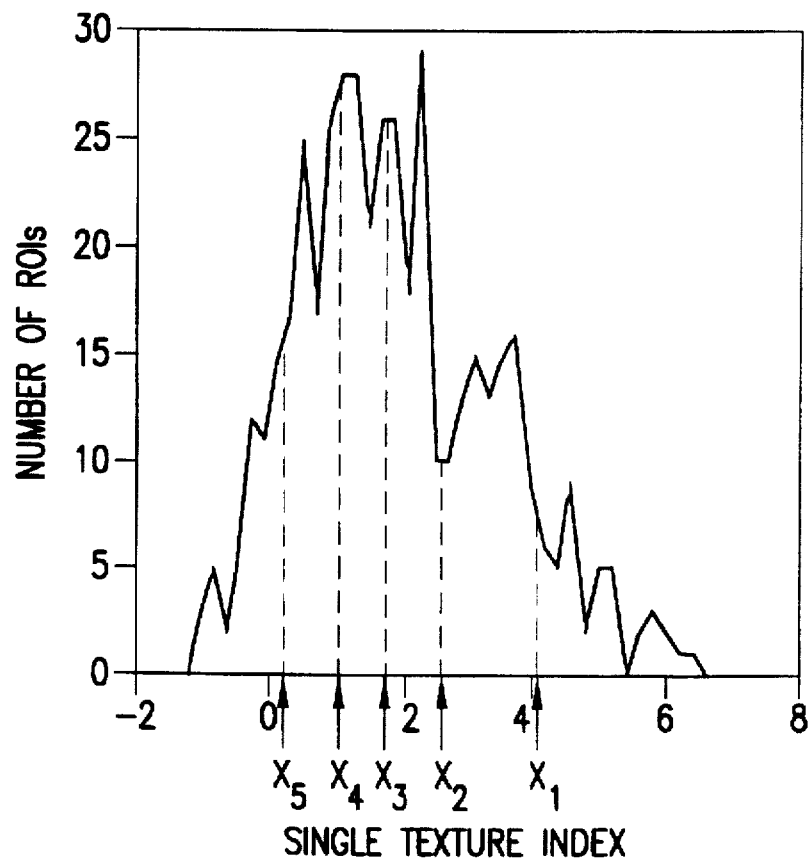
FIG. 35 is a histogram of texture indices obtained from a chest radiograph with interstitial infiltrates. Five input data for the ANN are texture indices $X_1$, $X_2$, $X_3$, $X_4$, and $X_5$ at upper 10, 30, 50, 70, and 90% area of the histogram, respectively.

The inventors also applied artificial neural networks (ANNs) for classification of normal and abnormal lungs with interstitial diseases. In particular, three-layer, feed-forward networks with a back-propagation algorithm (see "Neural Networks A Comprehensive Foundation", Simon Haykin, McMillan College Publishing Co., 1994) were employed. The structure of the ANN includes three hidden units and one output unit which represents the classification result (0=normal, 1=abnormal). The input data for the ANN are selected from a histogram of the single texture indices and/or that of the geometric-pattern indices. For the ANN using texture measures, the histogram of the single texture indices is determined for each chest image, as shown in FIG. 35. Then, five input values for the ANN, $X_1-X_5$ in FIG. 4, are selected from the corresponding single texture indices at the upper 10, 30, 50, 70, and 90% areas of the histogram, respectively. For the ANN using geometric-pattern measures, five single geometric-pattern indices are selected as the input data for the ANN in a similar way. In addition, for the ANN using the combined analysis of texture and geometric-pattern measures, four single texture indices (at the upper 20, 40, 60, and 80% area of the histogram) and three single geometric-pattern indices (at the upper 20, 50, and 80%) are selected as the input to the ANN.

Figure 36:
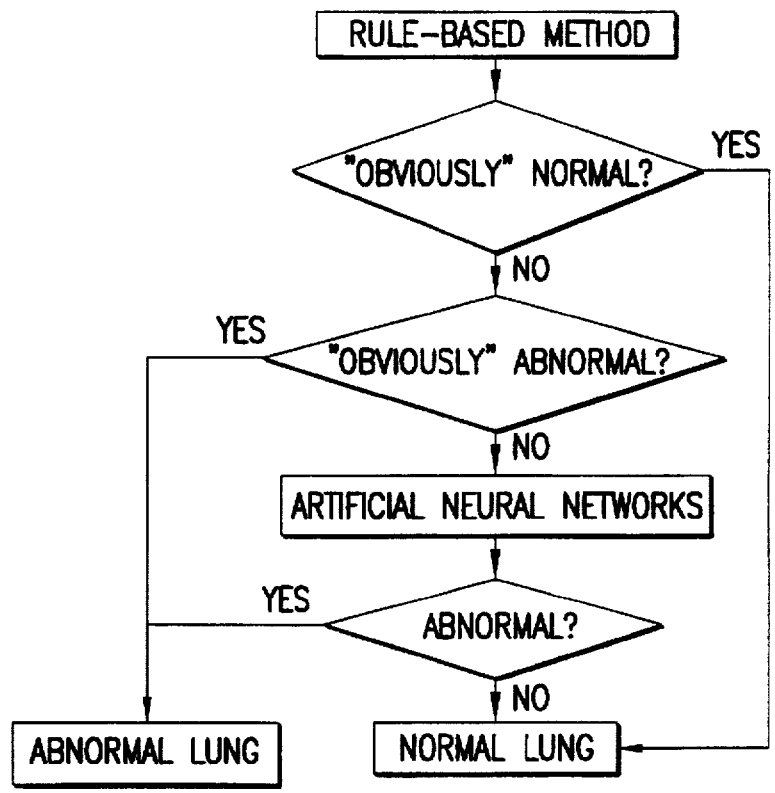
FIG. 36 is a flow chart of the overall classification method with the rule-based plus ANN steps according to the present invention.

The overall method for classification with the rule-based plus ANN method is shown in FIG. 36. First, in step 3600 the rule-based method is employed for identification in step 3602 of obviously normal lungs and in step 3604 of obviously abnormal lungs. Then in step 3606 the ANN is applied for classification in step 3608 of the remaining chest images which were classified as obvious cases by the rule-based method.

For the rule-based plus ANN method based on either texture measures or geometric-pattern measures, a chest image is classified as "obviously" normal if the ratio of the number of abnormal ROIs to the total number of ROIs in the chest image is below the minimum "abnormal" ratio that can be obtained from all abnormal cases in a training data set;

however, the chest image is classified as "obviously" abnormal if the ratio is above the maximum "normal" ratio that can be obtained fro all normal cases in the training data set. The minimum and maximum ratios used for classification of obvious cases are determined from a training data set, as will be discussed hereinafter.

For the rule-based plus ANN method using the combined analysis of texture and geometric-pattern measures, obvious cases are identified by logical AND operation; i.e., if a chest image can be classified as obviously normal by the initial rule-based method using both texture measures and geometric-pattern measures, the chest image is classified as obviously normal. Obviously abnormal cases are classified in a similar way.

For evaluation of the classification performance with various methods, the original database including 100 normal and 100 abnormal cases with interstitial disease was divided into two groups by use of random numbers. One is a data set for training, which includes 50 normal and 50 abnormal cases. Another is a data set for testing, which also includes 50 normal and 50 abnormal cases. Ten pairs of different training and testing data were prepared.

For classification with the rule-based method, the threshold levels of the texture and/or the geometric-pattern indices are determined in such a way as to achieve the best classification performance for a given training data set. In the rule-based plus ANN method, the minimum ratio of the number of abnormal ROIs to the total number of ROIs for all abnormal cases and the maximum ratio of abnormal ROIs for all normal cases are also determined from a training data set. The internal parameters of the ANN are determined from more than 100 iterations of learning for a training data set. These parameters are used for a validation test with a testing data set.

The classification performance is evaluated by ROC analysis (See Invest. Radiol. 21, 720–733 (1986)). For classification with the rule-based method, ROC curves are obtained by changing the threshold level in terms of the ratio of the number of abnormal ROIs to the total number of ROIs. For classification with the ANN method, ROC curves are obtained by changing the threshold level in terms of the ANN output. Finally, the average classification performance for each method is determined by use of ten different training-testing data sets. The statistical significance of differences between ROC curves is determined by application of a two-tailed paired t test to the Az value (the area under ROC curves) of each testing data set.

Figure 37A:
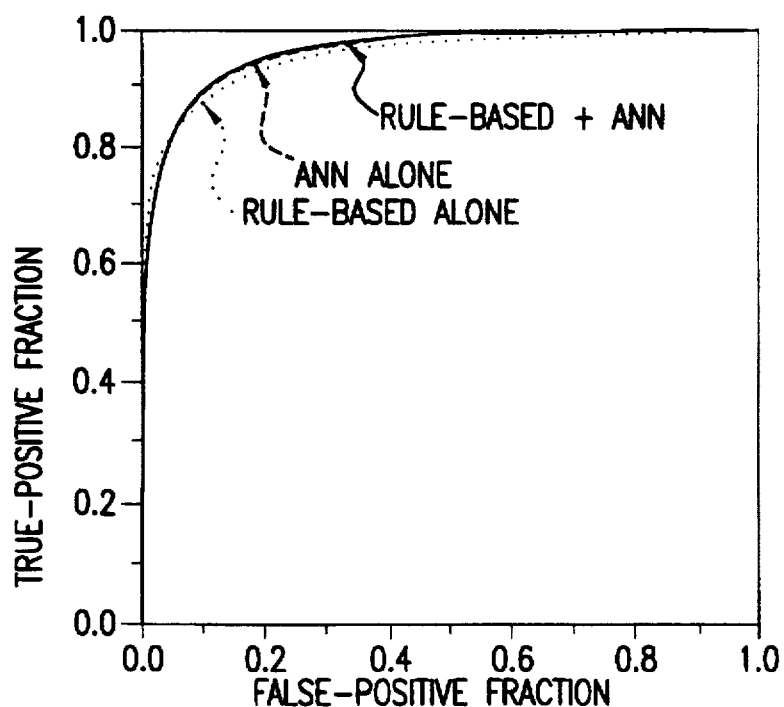
FIGS. 37(a), 37(b) and 37(c) are graphic illustrations, respectively, of ROC curves obtained from various classification methods with use of (a) texture measures, (b) geometric-pattern measures, and (c) a combination of texture and geometric-pattern measures.
Figure 37B:
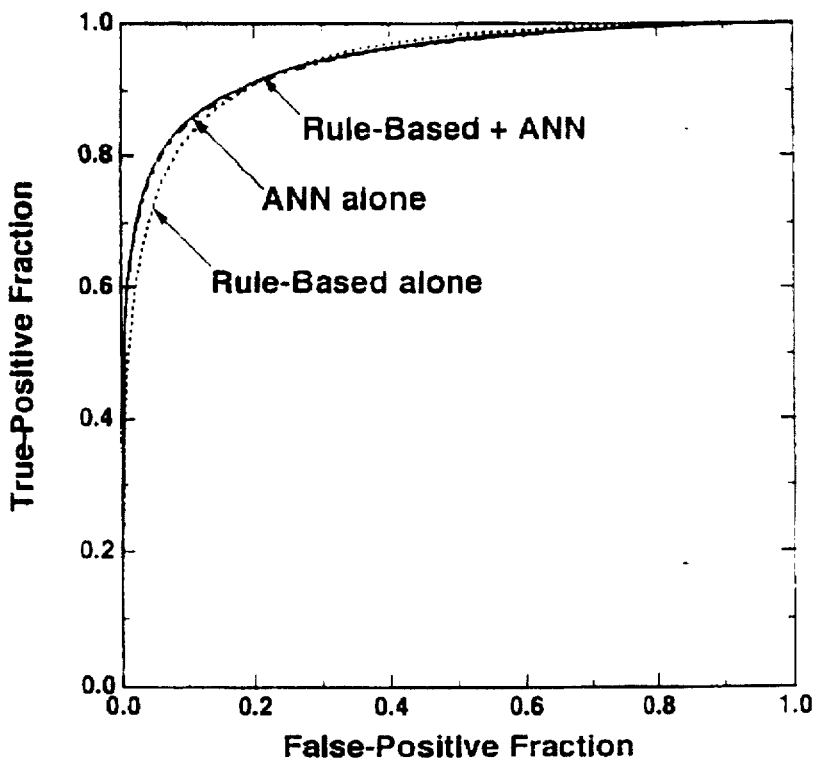
Figure 37C:
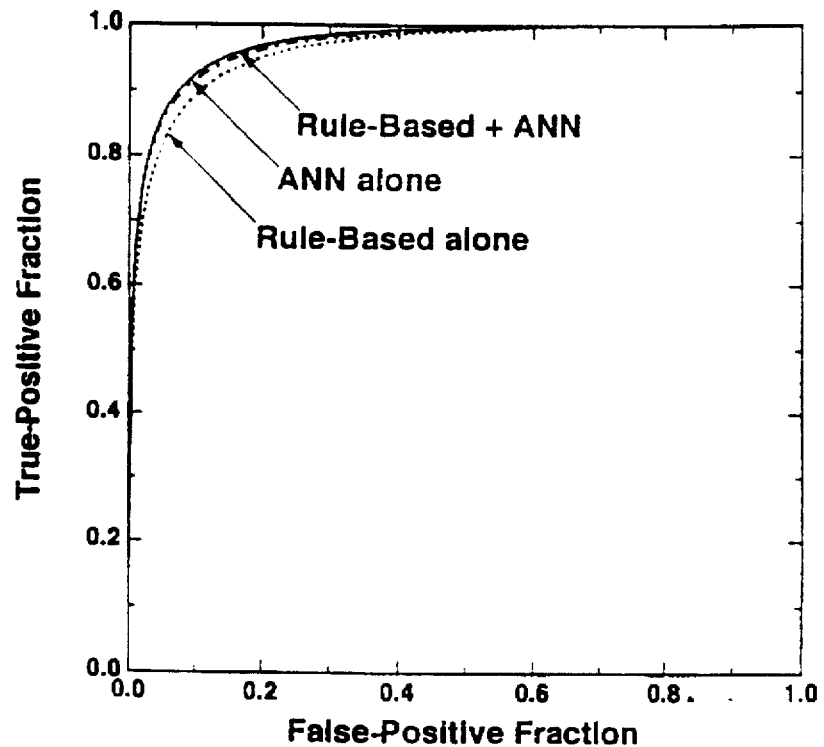

FIG. 37(a) shows ROC curves obtained for classification methods using texture measures with the rule-based method alone, the ANN method alone, and the rule-based plus ANN method. The Az value of 0.958 for the rule-based plus ANN method is larger than that of 0.947 for the rule-based method alone (P<0.05) and 0.957 for the ANN method alone (P<0.20). ROC curves obtained for various classification methods based on geometric pattern measures are shown in FIG. 37(b). The Az value of 0.943 for the rule-based plus ANN method is larger than that of 0.937 for the rule-based method alone (P<0.05) and 0.941 for the ANN method alone (P<0.50). In addition, ROC curves for the combined analysis of texture and geometric-pattern measures are shown in FIG. 37(c). The Az value of 0.966 for the rule-based plus ANN method is larger than that of 0.959 for the rule-based method alone (P<0.05) and 0.965 for the ANN method alone (P<0.10).

It should be noted that the rule-based plus ANN method always improves the classification performance compared with either the rule-based method alone or the ANN method alone, and that the classification performance obtained with the ANN method alone is superior to that with the rule-based method alone. These results indicate that the overall classification performance is improved if the obvious (easy) cases are eliminated initially by the rule-based method and only the remaining uncertain (difficult) cases are classified by the ANN method. This is probably because difficult cases alone can be used more effectively in training of the ANN than all cases including easy cases, thus yielding improved performance.

Table 2 is a summary of the classification performance expressed by the sensitivity at the specificity of 0.900 for various classification schemes in distinguishing between normal and abnormal lungs with interstitial disease.

TABLE 2

|  | Texture Measures | Geometric Pattern Measures | Combination |
| --- | --- | --- | --- |
| Rule-Based | 0.873 | 0.826 | 0.893 |
| ANN | 0.890 | 0.848 | 0.917 |
| Rule-Based + ANN | 0.894 | 0.853 | 0.926 |

Although the sensitivity obtained with the use of texture measures is higher than that for geometric-pattern measures, the combined analysis can improve the sensitivity in comparison with individual analyses for all classification methods. These results suggest that texture analysis and geometric-pattern feature analysis can complement each other. It should be noted that classification with the rule-based plus ANN method by use of the combined analysis of texture and geometric-pattern measures provides the best performance.

When the combined analysis of texture and geometric-pattern measures is used for classification with the rule-based methods, another logical operation can be applied. The inventors tried using the logical AND operation in the rule-based method alone, i.e., if a chest image could be classified as abnormal by the rule-based method with the use of both texture measures and geometric-pattern measures, the chest image was then classified as abnormal. The Az value obtained from the ROC curve was 0.947, and the sensitivity at the specificity of 0.900 was 0.865. This result indicates that the logical AND operation for combined analysis of measures in the rule-based method alone did not improve the classification performance, because the sensitivity obtained from geometric-pattern measures is considerably lower than that obtained from texture measures.

In addition, the inventors examined the logical OR operation for classification of obvious cases in the rule-based plus ANN method. If a chest image could be classified as obviously normal by the rule-based method with the use of either texture measures or geometric-pattern measures, the chest image was classified as obviously normal. A lung was also classified as obviously abnormal by the logical OR operation. The Az value was 0.954, and the sensitivity was 0.907. This result indicates that the logical OR operation for identification of obvious cases did not improve the overall classification performance in the rule-based plus ANN method. This is because the overall classification performance is affected by some false-positives and false-negatives which may be classified incorrectly as obvious cases because of the logical OR operation in the rule-based method. Therefore, it is very important to identify obvious cases conservatively and correctly in the initial rule-based method, and then to classify the remaining difficult cases with the ANN method, when the rule-based plus ANN method is employed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a computerized method for the detection and characterization of disease in an image derived from a chest radiograph, the improvement comprising:

determining a lung top, including the steps of,
- a) obtaining a vertical profile and its first derivative in an upper central area of the image,
- b) identifying candidates for a lung top based on zero-crossings with negative slopes in the first derivative,
- c) selecting as said lung top a first identified candidate closest to the top of the image when the standard deviation of that candidate is below a predetermined threshold, and
- d) when in the preceding step c) the standard deviation is above said predetermined threshold, evaluating another of the identified candidates, including,
- e) evaluating whether the standard deviation of said another candidate is less than a predetermined threshold, and if so, selecting, from between said another candidate and the preceding candidate, as said lung top the candidate with a larger pixel value, and if not, evaluating a cross-correlation between a horizontal profile at the position of the second candidate and a predetermined profile and selecting as said lung top the preceding candidate when the evaluated cross-correlation is less than a predetermined cross-correlation threshold, and
- f) when the cross-correlation is greater than said predetermined cross-correlation threshold, selecting yet another candidate and repeating the preceding step e).

2. The method of claim 1, comprising:

detecting right and left top lung edges, including the steps of,
- a) determining right and left lung angle lines,
- b) establishing right and left search ranges and right and left lung top start search points for starting searching of top lung edges,
- c) placing search ROIs at the start search points,
- d) determining vertical profiles and respective second derivatives in the search ROIs,
- e) determining absolute values of first and second minimum positions in the second derivatives determined in the preceding step,
- f) selecting the position of the first minimum peak position as the top lung edge in each ROI when the ratio of the absolute value of the first minimum peak position to that of the second minimum peak position exceeds a predetermined threshold and otherwise selecting said second minimum peak position as the top lung edge in each ROI when said ratio is less than said predetermined threshold, and
- g) repositioning the right and left search ROIs laterally within the search ranges by a predetermined amount, and
- h) repeating steps d)–g) to detect top lung edges throughout the right and left search ranges.

3. The method of claim 2, wherein:

in step a) of claim 2, said right and left lung angle lines are determined based on minimum pixel value locations in the right and left lungs in two horizontal profiles taken at two vertical positions, in step b) of claim 2 the right and left lung top start search points are established based on the intersection between the right and left lung angle lines with the lung top, and in step g) of claim 2 the right and left search ROIs are repositioned centered vertically on the top lung edges detected in step f) of claim 2.

4. The method of claim 2, comprising:

detecting right and left ribcage edges, including the steps of,
- a) determining a horizontal profile and its second derivative at a predetermined vertical position,
- b) establishing top and bottom search ranges and right and left ribcage edge start search points for starting searching of right and left ribcage edges,
- c) placing ribcage edge search ROIs at the ribcage edge search start points,
- d) determining horizontal profiles and respective second derivatives in the ribcage edge search ROIs,
- e) determining absolute values of first and second minimum positions in the second derivatives determined in the step d),
- f) selecting the position of the first minimum peak position as the ribcage edge in each ROI when the ratio of the absolute value of the first minimum peak position to that of the second minimum peak position exceeds a predetermined threshold and otherwise selecting said second minimum peak position as the ribcage edge in each ROI when said ratio is less than said predetermined threshold, and
- g) repositioning the right and left search ROIs vertically within the search ranges by a predetermined amount, and
- h) repeating steps d)–g) of this claim to detect ribcage edges throughout the top and bottom search ranges.

5. The method of claim 4, wherein:

in step b) of claim 4 the right and left ribcage edge start search points are established based on the location of a minimum peak of the second derivative which is located outside of the respective right and left lung angle lines, and in step g) of claim 4 the repositioned right and left search ROIs are centered at the ribcage edges detected in the preceding step f) of claim 4.

6. The method of claim 4, comprising:

applying a polynomial function to the detected top lung edges and selected upper ribcage edges to produce a smooth top lung edge, applying a polynomial function to selected detected right ribcage edges and selected detected left ribcage edges to produce smooth right and left ribcage edges; and applying a weighting average to overlapping edges of the top lung and the right and left ribcage edges to produce smooth connections between the smooth top lung edge and the smooth right and left ribcage edges, wherein the smooth top lung edges, the smooth right and left ribcage edges, and the smooth connections therebetween define a ribcage boundary.

7. The method of claim 6, comprising:

obtaining a vertical profile and its first derivative through the center of the right lung and identifying a minimum peak position in the first derivative in the lower half of the vertical profile as a lung bottom.

8. The method of claim 7, comprising:

detecting a right hemidiaphragm edge, including the steps of, a) determining right inner and outer horizontal search limits for searching the right hemidiaphragm edge,
b) positioning an initial search ROI at the vertical level of the lung bottom and at a horizontal position determined in relation to the intersection of the lung bottom with the right lung angle line,
c) determining a vertical profile and its first derivative in the search ROI,
d) detecting the location of a minimum in the first derivative determined in the preceding step as the right hemidiaphragm edge in the ROI, and
e) shifting the search ROI a predetermined amount in the horizontal direction to one side of the initial search ROI and to the other side of the initial search ROI and repeating steps c)–e) until a complete set of right hemidiaphragm edges between the right inner and outer search limits is detected, and
f) fitting a polynomial function to the complete set of right hemidiaphragm edges to obtain a smoothed complete right hemidiaphragm edge.

9. The method of claim 8, further comprising:
detecting a left hemidiaphragm edge, including the steps of,
a) determining left inner and outer horizontal search limits and for searching the left hemidiaphragm edge,
b) positioning a left hemidiaphragm edge initial search ROI at a selected location on said image,
c) determining a vertical profile and its first derivative in the search ROI,
d) detecting first and second minimums in the first derivative determined in the preceding step and determining the ratio of the second minimum to the first minimum,
e) determining the location of the first minimum to be a left hemidiaphragm edge within the search ROI and a search start point when the ratio of the second minimum to the first minimum determined in the preceding step is less than a predetermined amount and then repeatedly shifting the search ROI a predetermined amount in the horizontal direction to one side of the start point and to the other side of the search start point with the shifted ROI and determining the hemidiaphragm edge in each ROI to be at the location of the first minimum of the first derivative of a vertical profile taken through each shifted ROI until a complete left hemidiaphragm edge is detected between the left inner and outer horizontal search limits,
f) when in the preceding step e) the ratio of the second minimum to the first minimum is greater than said predetermined amount, determining whether the absolute value of the first and second minimum of the first derivative determined in the preceding step e) is less than a predetermined absolute value amount and if so, determining histograms of the initial search ROIs of the right and left hemidiaphragm edges, comparing pixel values of first peaks of the determined histograms, shifting the search ROI vertically lower a predetermined amount if the pixel value of the first peak of the right diaphragm histogram is greater by a predetermined value than the pixel value of the first peak of the left diaphragm histogram, shifting the search ROI vertically higher a predetermined amount if the pixel value of the first peak of the right diaphragm histogram is less by a predetermined value than the pixel value of the first peak of the left diaphragm histogram, and repeating the preceding step e),
g) when in the preceding step e) the ratio of the second minimum to the first minimum is greater than said predetermined amount and in the preceding step f) the absolute values of the first and second minimums are greater than said predetermined absolute value amount, determining the locations of the first and second minimums to be candidate search start points for determining respective candidate left diaphragm edges, placing start ROIs on the candidate search start points, determining vertical profiles and respective first derivatives of the vertical profiles of the start ROIs placed on the candidate search start points, identifying respective candidate left hemidiaphragm edges in the candidate search ROIs at the locations of the minimums of the first derivatives, repeatedly shifting the start ROIs a predetermined amount to either side of the candidate search start points and for each shifted ROI determining a left hemidiaphragm edge based on the minimum of the first derivative of a vertical profile taken in the shifted ROI until complete sets of first and second candidate left hemidiaphragm edges are detected,
h) determining slopes and standard deviations of the two complete sets of first and second candidate left hemidiaphragm edges determined in the preceding step g), and if both of said complete sets have slopes either larger or smaller than a predetermined slope, determining the complete set having the smaller slope to be the set of left hemidiaphragm edges, and if both of said complete sets do not have either larger or smaller slopes than said predetermined slope, determining the set of left hemidiaphragm edges to be the complete set of first and second candidate left hemidiaphragm edges having the smaller standard deviation, and
i) fitting a polynomial function to the determined set of left hemidiaphragm edges to obtain a smooth complete left diaphragm edge.

10. The method of claim 9, wherein:
in step b) of claim 8 the initial search ROI is positioned at the horizontal position of the intersection of the lung bottom with the right lung angle line shifted towards a midline of the image by a predetermined amount, and
in step e) of claim 8, in step e) of claim 9, and step g) of claim 9 the search ROI is shifted to be centered vertically to the vertical position of the edge detected in the preceding ROI.

11. The method of claim 9, further comprising:
correcting data values derived from an area within the ribcage boundary to relative exposures.

12. The method of claim 11, wherein said correcting step comprises:
converting RMS variations of pixel data values in a regions of interest to relative exposures based on the following relationship, $$RMS_{\Delta \bar{E}} = \frac{RMS_p}{G \cdot C \cdot (\log_{10} e)}$$

where $RMS_p$, G, C correspond to the RMS variation of pixel values in a respective region of interest, the gradient of the film used, and slope of the characteristic curve of the laser scanner, respectively, and $\log_{10} e$ is a conversion factor from natural logarithm to logarithm to base 10.

13. The method of claim 11, further comprising:

correcting the converted RMS variations of pixel data values in inverse relationship to average distributions of RMS variations due to system noise existing in a system employed to convert the radiograph image into digital pixel data values.

14. The method of claim 12, further comprising:

correcting the converted RMS variations of pixel data values in inverse relationship to average distributions of RMS variations due to system noise existing in a system employed to convert the radiograph image into digital pixel data values.

15. The method of claim 14, further comprising:

a) determining a texture index based at least in part on the corrected and converted RMS variations in ROIs in the image;

b) determining a histogram of the texture index;

c) applying values of said histogram, determined in the preceding step b), selected at predetermined upper areas of the histogram as inputs to a trained artificial neural network (ANN) having plural inputs and including a multi-layer, feed-forward network with a back-propagation algorithm, and d) classifying said image as normal or abnormal based on an output of said ANN.

16. The method of claim 14, further comprising:

a) determining a geometric pattern index based on pre-determined geometric pattern measures in ROIs in the image;

b) determining a histogram of the geometric pattern index;

c) applying values of said histogram, determined in the preceding step b), selected at predetermined upper areas of the histogram as inputs to a trained artificial neural network (ANN) having plural inputs and including a multi-layer, feed-forward network with a back-propagation algorithm, and d) classifying said image as normal or abnormal based on an output of said ANN.

17. The method of claim 14, further comprising:

a) determining a texture index based at least in part on the corrected and converted RMS variations in ROIs in the image;

b) determining a geometric pattern index based on pre-determined geometric pattern measures in the ROIs in the image;

c) determining histograms of the texture index and the geometric pattern index;

d) applying values of said histograms, determined in the preceding step c), selected at predetermined upper areas of the histograms as inputs to a trained artificial neural network (ANN) having plural inputs and including a multi-layer, feed-forward network with a back-propagation algorithm, and e) classifying said image as normal or abnormal based on an output of said ANN.

18. The method of claim 14, further comprising:

a) determining a texture index based at least in part on the corrected and converted RMS variations in ROIs in the image;

b) determining the number of ROIs which contain a texture index greater than a predetermined threshold index thereby identifying potentially abnormal ROIs;

c) determining the ratio of the number of ROIs determined in the preceding step c) to total number of ROIs in the image, and if the determined ratio is less than a first predetermined ratio corresponding to the minimum ratio of abnormal ROIs detected in a training set of abnormal images, classifying the image as normal, and if the determined ratio is greater than a second predetermined ratio corresponding to the maximum ratio of abnormal ROIs detected in a training set of normal images, classifying the image as abnormal;

e) for those images which have ratios determined in said preceding step d) greater than said first predetermined ratio and less than said second predetermined ratio, determining a texture index based on the corrected and converted RMS variations;

f) determining a histogram of the texture index;

g) applying values of said histogram, determined in the preceding step f), selected at predetermined upper areas of the histogram as inputs to a trained artificial neural network (ANN) having plural inputs and including a multi-layer, feed-forward network with a back-propagation algorithm, and h) classifying said image as normal or abnormal based on an output of said ANN.

19. The method of claim 14, further comprising:

a) determining a geometric pattern index based on pre-determined geometric pattern measures in ROIs in the image;

b) determining the number of ROIs which contain a geometric pattern index greater than a predetermined threshold index thereby identifying potentially abnormal ROIs;

c) determining the ratio of the number of ROIs determined in the preceding step c) to total number of ROIs in the image, and if the determined ratio is less than a first predetermined ratio corresponding to the minimum ratio of abnormal ROIs detected in a training set of abnormal images, classifying the image as normal, and if the determined ratio is greater than a second predetermined ratio corresponding to the maximum ratio of abnormal ROIs detected in a training set of normal images, classifying the image as abnormal;

e) for an image which have ratios determined in said preceding step d) greater than said first predetermined ratio and less than said second predetermined ratio, determining a histogram of the geometric pattern index;

f) applying values of said histogram, determined in the preceding step e), selected at predetermined upper areas of the histogram as inputs to a trained artificial neural network (ANN) having plural inputs and including a multi-layer, feed-forward network with a back-propagation algorithm, and h) classifying said image as normal or abnormal based on an output of said ANN.

20. The method of claim 14, further comprising:

a) determining a texture index based at least in part on the corrected and converted RMS variations in ROIs in the image;

b) determining a geometric pattern index based on pre-determined geometric pattern measures in said ROIs in said image;

c) determining the number of ROIs which contain a texture index greater than a predetermined threshold index thereby identifying potentially abnormal ROIs, d) determining the number of ROIs which contain a geometric pattern index greater than a predetermined threshold index thereby identifying potentially abnormal ROIs;

e) determining the ratio of the number of ROIs determined in the preceding step c) to total number of ROIs in the image, and if the determined ratio is less than a first predetermined ratio corresponding to the minimum ratio of abnormal ROIs detected in a training set of abnormal images, classifying the image as normal, and if the determined ratio is greater than a second predetermined ratio corresponding to the maximum ratio of abnormal ROIs detected in a training set of normal images, classifying the image as abnormal;

f) determining the ratio of the number of ROIs determined in the preceding step d) to total number of ROIs in the image, and if the determined ratio is less than a first predetermined ratio corresponding to the minimum ratio of abnormal ROIs detected in a training set of abnormal images, classifying the image as normal, and if the determined ratio is greater than a second predetermined ratio corresponding to the maximum ratio of abnormal ROIs detected in a training set of normal images, classifying the image as abnormal;

g) for an image which has ratios determined in at least one of said preceding steps e) and f) to be greater than said first predetermined ratio and less than said second predetermined ratio, determining a histogram of the at least one of the texture index and the geometric pattern index;

h) applying values of said histogram, determined in the preceding step g), selected at predetermined upper areas of the histogram as inputs to a trained artificial neural network (ANN) having plural inputs and including a multi-layer, feed-forward network with a back-propagation algorithm, and i) classifying said image as normal or abnormal based on an output of said artificial neural network.

21. The method of claim 20, wherein:

in step g) of claim 20, histograms of both said texture index and said geometric pattern index are determined; and in step h) of claim 20, values of both of said histograms are applied as inputs to said ANN.

22. In a computerized method for the detection and characterization of disease in an image derived from a chest radiograph, the improvement comprising:

detecting right and left ribcage edges, including the steps of, a) determining a horizontal profile and its second derivative at a predetermined vertical position, b) establishing top and bottom search ranges and right and left ribcage edge start search points for starting searching of right and left ribcage edges, c) placing ribcage edge search ROIs at ribcage edge search start pints, d) determining horizontal profiles and respective second derivatives in the ribcage edge search ROIs, e) determining absolute values of first and second minimum positions in the second derivatives determined in the step d), f) selecting the position of one of the first minimum peak position and the second minimum position as the ribcage edge in each respective ROI, comprising forming the ratio of the absolute value of the first minimum peak position to the absolute value of the second minimum peak position, comparing the formed ratio with a predetermined threshold, selecting the first minimum peak position as the ribcage edge as the ribcage edge in each respective ROI when the ratio of the absolute value of the first minimum peak position to that of the second minimum peak position exceeds said predetermined threshold, and otherwise selecting said second minimum peak position as the ribcage edge in each respective ROI when said ratio is less than said predetermined threshold, and g) repositioning the right and left search ROIs vertically within the search ranges by a predetermined amount, and h) repeating steps d)–g) of this claim to detect ribcage edges throughout the top and bottom search ranges.

23. The method of claim 22, comprising:

detecting right and left lung angle lines, in step b) of claim 22, establishing the right and left ribcage edge start search points based on the location of minimum peaks of the second derivative which are located outside of the respective right and left lung angle lines, and in step g) of claim 22, centering the repositioned right and left search ROIs at the ribcage edges detected in the preceding step f) of claim 22.

24. The method of claim 22, comprising:

applying a polynomial function to the detected top lung edges and selected upper ribcage edges to produce a smooth top lung edge, applying a polynomial function to selected detected right ribcage edges and selected detected left ribcage edges to produce smooth right and left ribcage edges; and applying a weighting average to overlapping edges of the top lung and the right and left ribcage edges to achieve smooth connections between the smooth top lung edge and the smooth right and left ribcage edges, thereby to produce a ribcage boundary defined by the smooth top lung edges, the smooth right and left ribcage edges, and the smooth connections therebetween.

25. In a computerized method for the detection and characterization of disease in an image derived from a chest radiograph, the improvement comprising:

obtaining a vertical profile and its first derivative through the center of the right lung and identifying a minimum peak position in the first derivative in the lower half of the vertical profile as a lung bottom;

detecting a right hemidiaphragm edge, including the steps of, a) determining right inner and outer horizontal search limits for searching the right hemidiaphragm edge, b) positioning an initial search ROI at the vertical level of the lung bottom and at a horizontal position determined in relation to the intersection of the lung bottom with the right lung angle line, c) determining a vertical profile and its first derivative in the search ROI, d) detecting the location of a minimum in the first derivative determined in the preceding step as the right hemidiaphragm edge in the ROI, and e) shifting the search ROI a predetermined amount in the horizontal direction to one side of the initial search ROI and to the other side of the initial search ROI and repeating steps c)–e) until a complete set of right hemidiaphragm edges between the right inner and outer search limits is detected, and f) fitting a polynomial function to the complete set of right hemidiaphragm edges to obtain a smoothed complete right hemidiaphragm edge.

26. The method of claim 25, further comprising:

detecting a left hemidiaphragm edge, including the steps of, a) determining left inner and outer horizontal search limits and for searching the left hemidiaphragm edge,
  b) positioning a left hemidiaphragm edge initial search ROI at a selected location on said image,
  c) determining a vertical profile and its first derivative in the search ROI,
  d) detecting first and second minimums in the first derivative determined in the preceding step and determining the ratio of the second minimum to the first minimum,
  e) determining the location of the first minimum to be a left hemidiaphragm edge within the search ROI and a search start point when the ratio of the second minimum to the first minimum determined in the preceding step is less than a predetermined amount and then repeatedly shifting the search ROI a predetermined amount in the horizontal direction to one side of the start point and to the other side of the search start point with the shifted ROI and determining the hemidiaphragm edge in each ROI to be at the location of the first minimum of the first derivative of a vertical profile taken through each shifted ROI until a complete left hemidiaphragm edge is detected between the left inner and outer horizontal search limits,
  f) when in the preceding step e) the ratio of the second minimum to the first minimum is greater than said predetermined amount, determining whether the absolute value of the first and second minimum of the first derivative determined in the preceding step e) is less than a predetermined absolute value amount and if so, determining histograms of the initial search ROIs of the right and left hemidiaphragm edges, comparing pixel values of first peaks of the determined histograms, shifting the search ROI vertically lower a predetermined amount if the pixel value of the first peak of the right diaphragm histogram is greater by a predetermined value than the pixel value of the first peak of the left diaphragm histogram, shifting the search ROI vertically higher a predetermined amount if the pixel value of the first peak of the right diaphragm histogram is less by a predetermined value than the pixel value of the first peak of the left diaphragm histogram, and repeating the preceding step e),
  g) when in the preceding step e) the ratio of the second minimum to the first minimum is greater than said predetermined amount and in the preceding step f) the absolute values of the first and second minimums are greater than said predetermined absolute value amount, determining the locations of the first and second minimums to be candidate search start points for determining respective candidate left diaphragm edges, placing start ROIs on the candidate search start points, determining vertical profiles and respective first derivatives of the vertical profiles of the start ROIs placed on the candidate search start points, identifying respective candidate left hemidiaphragm edges in the candidate search ROIs at the locations of the minimums of the first derivatives, repeatedly shifting the start ROIs a predetermined amount to either side of the candidate search start points and for each shifted ROI determining a left hemidiaphragm edge based on the minimum of the first derivative of a vertical profile taken in the shifted ROI until complete sets of first and second candidate left hemidiaphragm edges are detected,
  h) determining slopes and standard deviations of the two complete sets of first and second candidate left hemidiaphragm edges determined in the preceding step g), and if both of said complete sets have slopes either larger or smaller than a predetermined slope, determining the complete set having the smaller slope to be the set of left hemidiaphragm edges, and if both of said complete sets do not have either larger or smaller slopes than said predetermined slope, determining the set of left hemidiaphragm edges to be the complete set of first and second candidate left hemidiaphragm edges having the smaller standard deviation, and
  i) fitting a polynomial function to the determined set of left hemidiaphragm edges to obtain a smooth complete left diaphragm edge.

27. The method of claim 26, wherein:

in step b) of claim 25 the initial search ROI is positioned at the horizontal position of the intersection of the lung bottom with the right lung angle line shifted towards a midline of the image by a predetermined amount, and in step e) of claim 25, in step e) of claim 26, and step g) of claim 26 the search ROI is shifted to be centered vertically to the vertical position of the edge detected in the preceding ROI.

* * * * *